United States Patent [19]
Hoshi et al.

[11] Patent Number: 5,574,599
[45] Date of Patent: Nov. 12, 1996

[54] ZOOM LENS AND ZOOMING METHOD

[75] Inventors: Kouji Hoshi; Yoshinori Itoh; Akihiro Nishio, all of Kanagawa-ken, Japan

[73] Assignee: Canon Kabushiki Kaisha, Tokyo, Japan

[21] Appl. No.: 153,024

[22] Filed: Nov. 16, 1993

[30] Foreign Application Priority Data

Nov. 18, 1992 [JP] Japan ................................. 4-333593
Nov. 19, 1992 [JP] Japan ................................. 4-310281
Apr. 14, 1993 [JP] Japan ................................. 5-111058

[51] Int. Cl.$^6$ ................................. G02B 15/14
[52] U.S. Cl. ................................. 359/689; 359/683
[58] Field of Search ................................. 359/683, 689, 359/676, 686

[56] References Cited

U.S. PATENT DOCUMENTS 4,936,661  6/1990  Betensky et al. .............. 350/423
5,218,478  6/1993  Itoh ............................... 359/692
5,274,504  12/1993  Itoh ............................... 359/676

FOREIGN PATENT DOCUMENTS 63-25613   2/1988   Japan .
63-271214  11/1988  Japan .
64-72114   3/1989   Japan .
2238417    9/1990   Japan .
2238418    9/1990   Japan .

*Primary Examiner*—Scott J. Sugarman
*Attorney, Agent, or Firm*—Fitzpatrick, Cella, Harper & Scinto

[57] ABSTRACT

A zoom lens comprising, from front to rear, a first lens unit of negative refractive power, a second lens unit of positive refractive power and a third lens unit of negative refractive power, wherein during zooming from the wide-angle end to the telephoto end, at least the second lens unit and the third lens unit move axially forward, and the following conditions are satisfied:

$$0.5 < |f_1|/\sqrt{f_W \cdot f_T} < 0.9$$

$$0.40 < f_2/\sqrt{f_W \cdot f_T} < 0.51$$

$$0.7 < |f_3|/\sqrt{f_W \cdot f_T} < 1.1$$

where $f_W$ and $f_T$ are the shortest and longest focal lengths of the entire system, respectively, $f_1$ is the focal length of the first lens unit, $f_2$ is the focal length of the second lens unit, and $f_3$ is the focal length of the third lens unit.

35 Claims, 39 Drawing Sheets

FIG.9(A)(1)
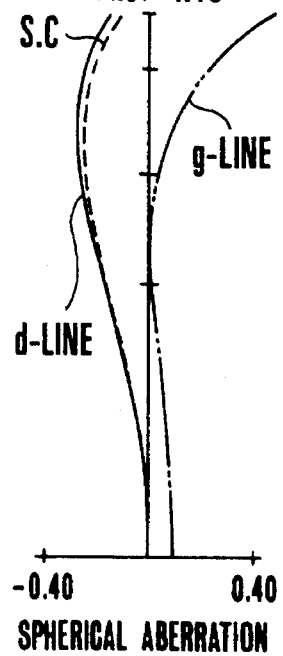
FIG.9(A)(2)
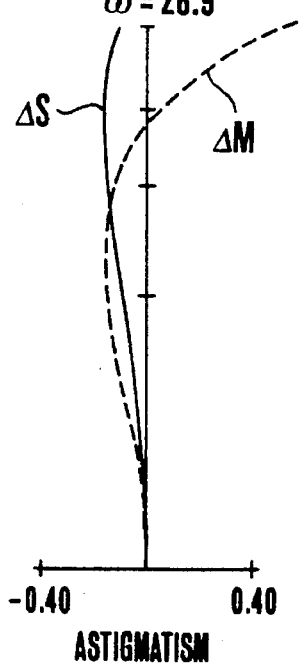
FIG.9(A)(3)
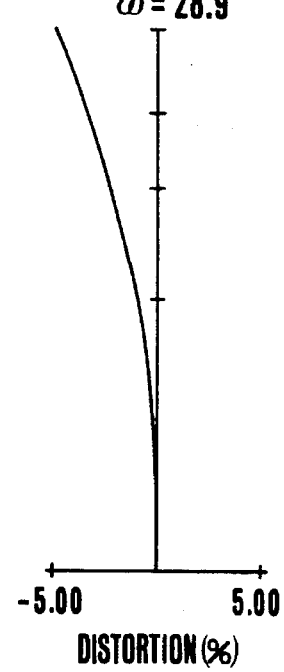
FIG.9(B)(1)
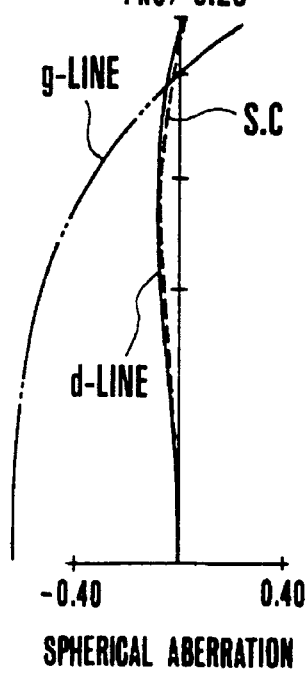
FIG.9(B)(2)
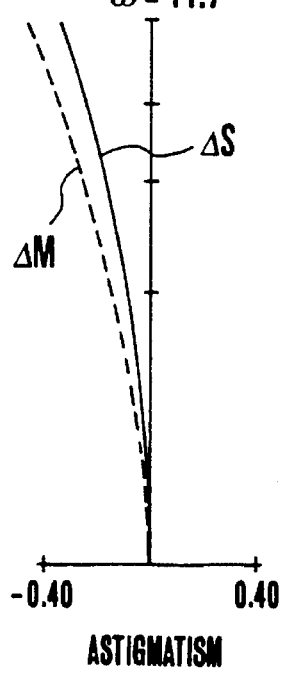
FIG.9(B)(3)
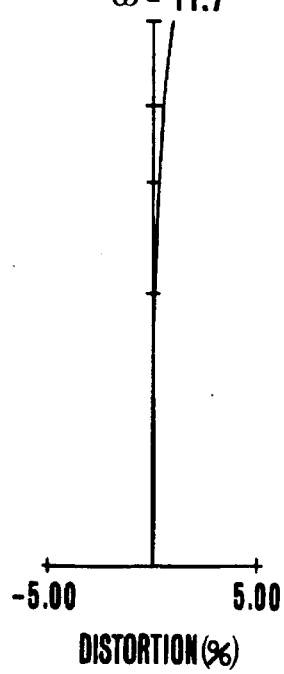

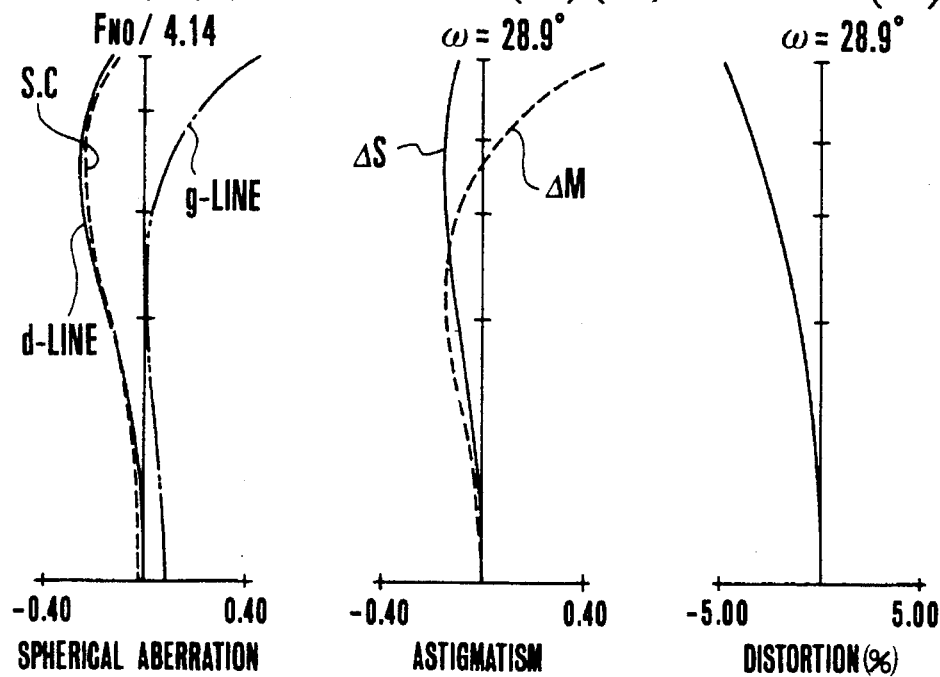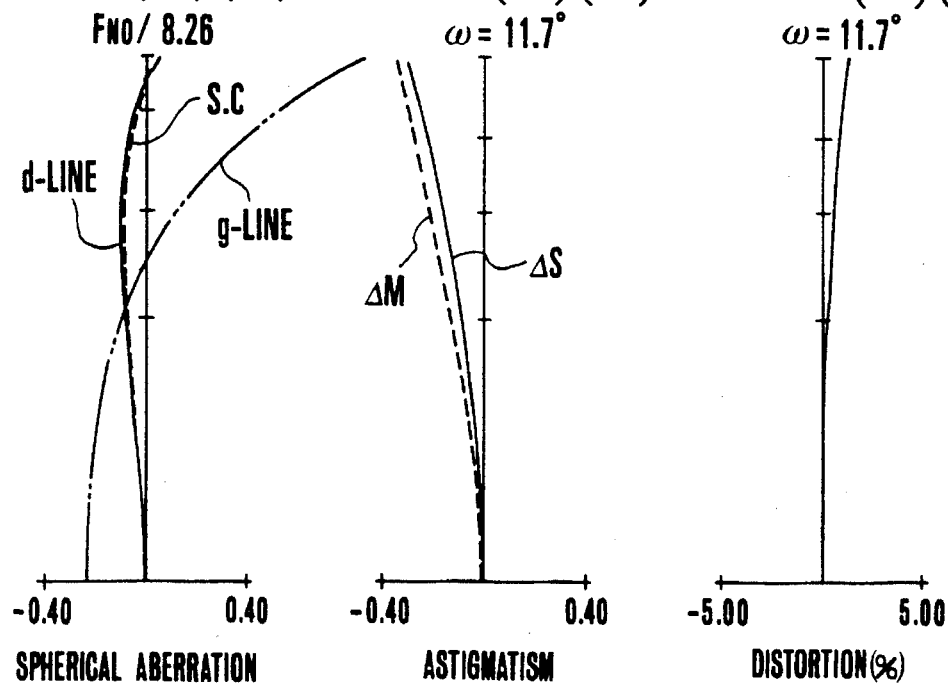

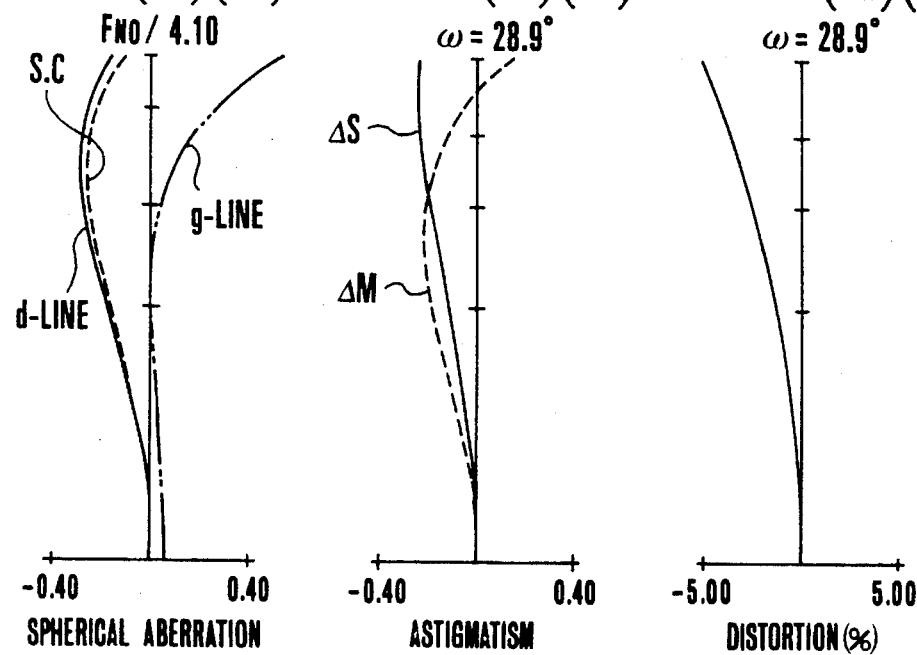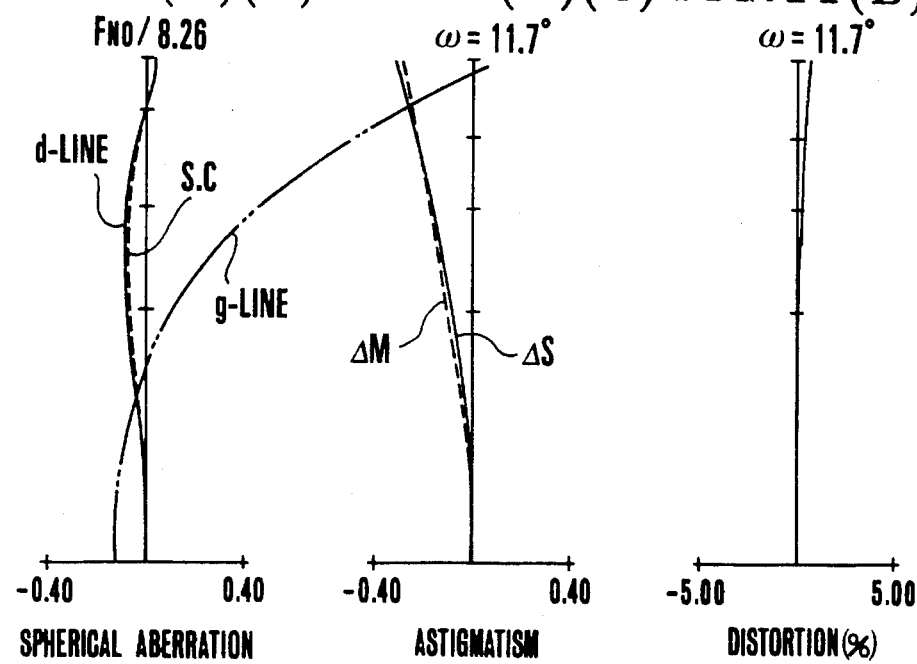

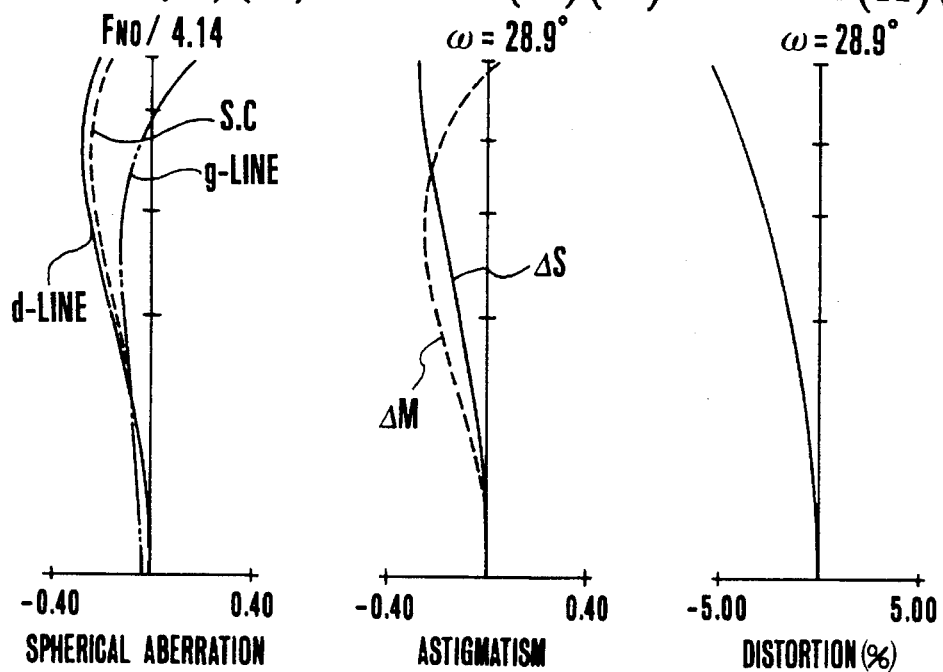
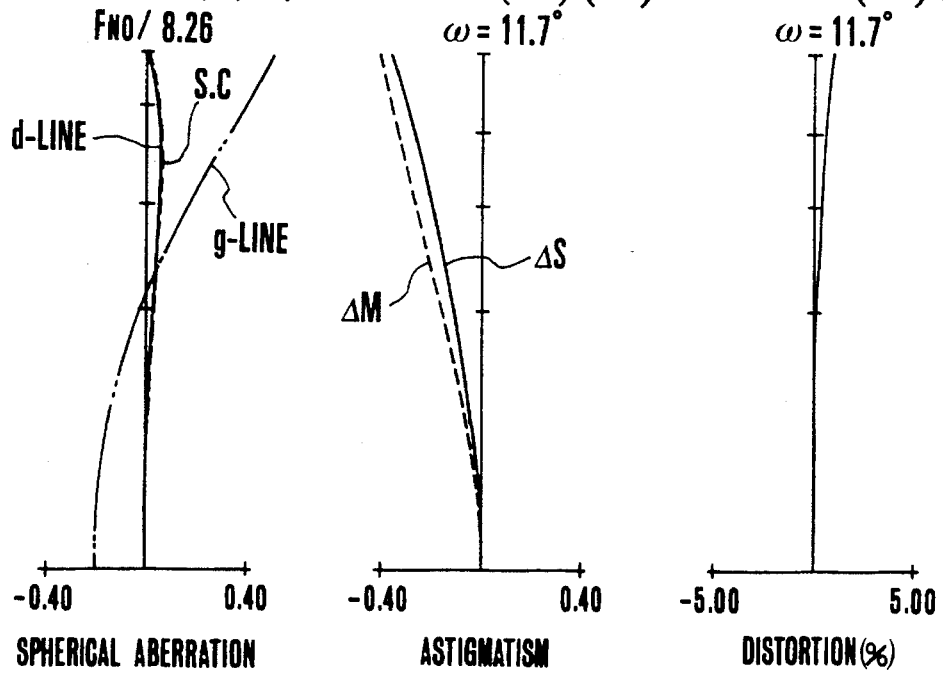

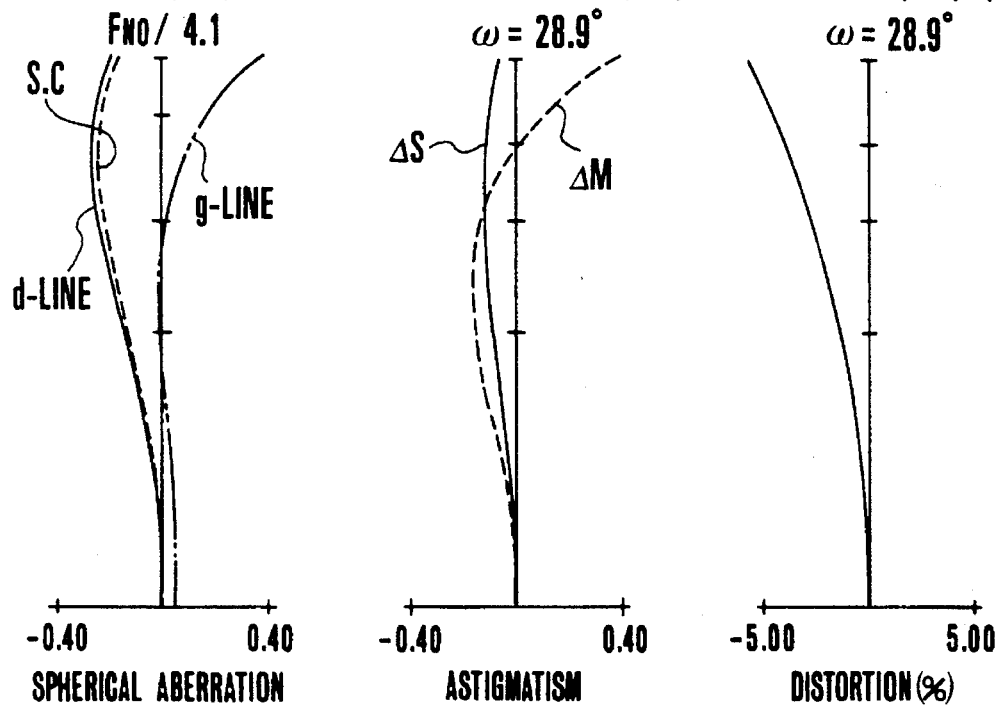
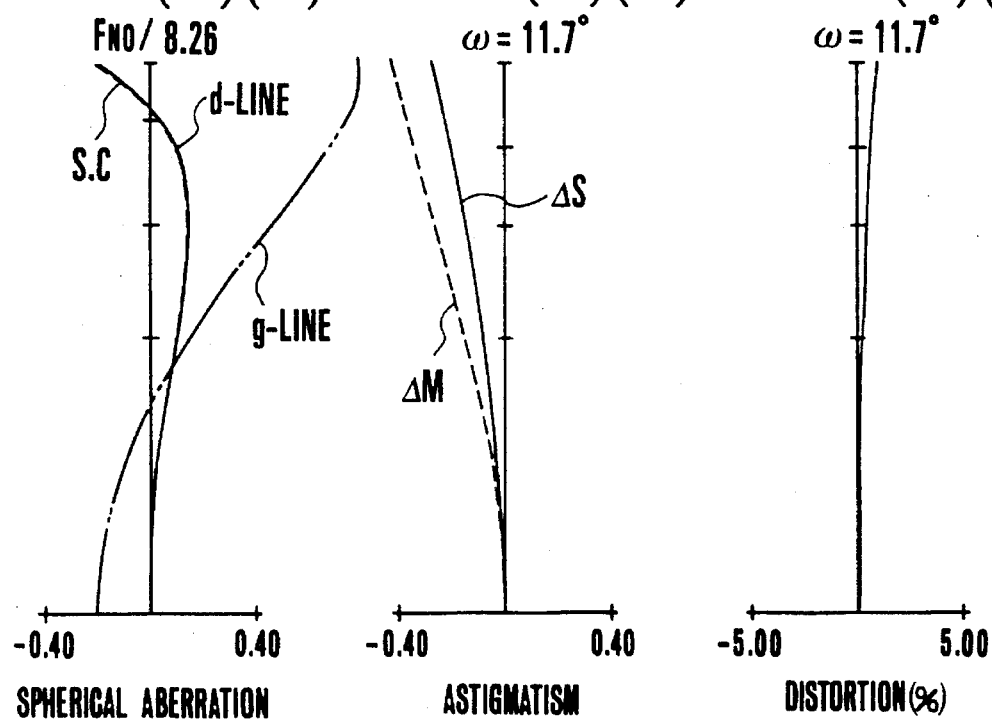

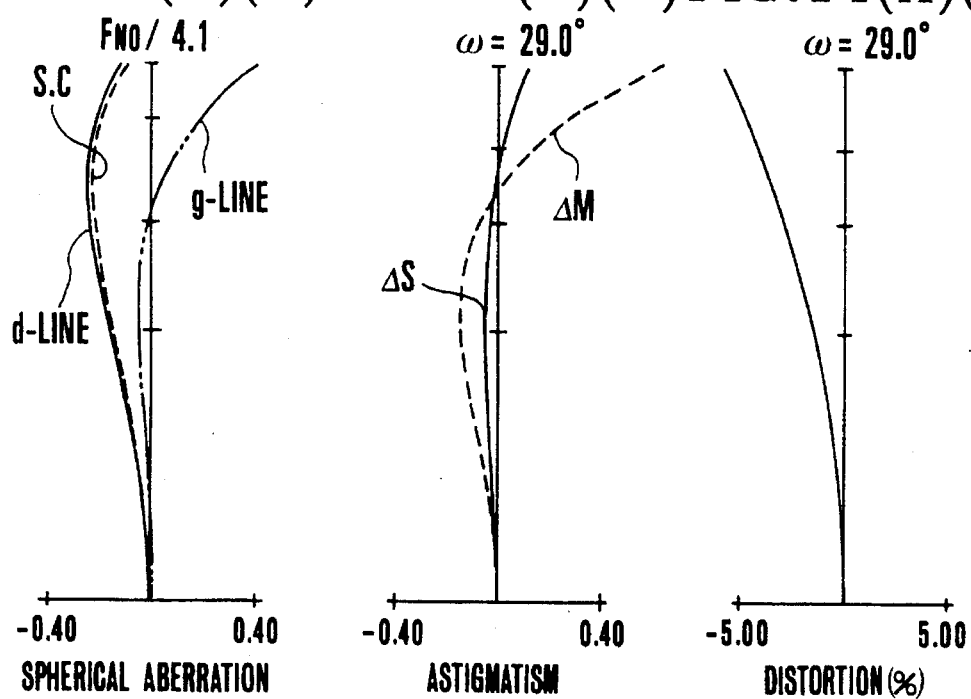
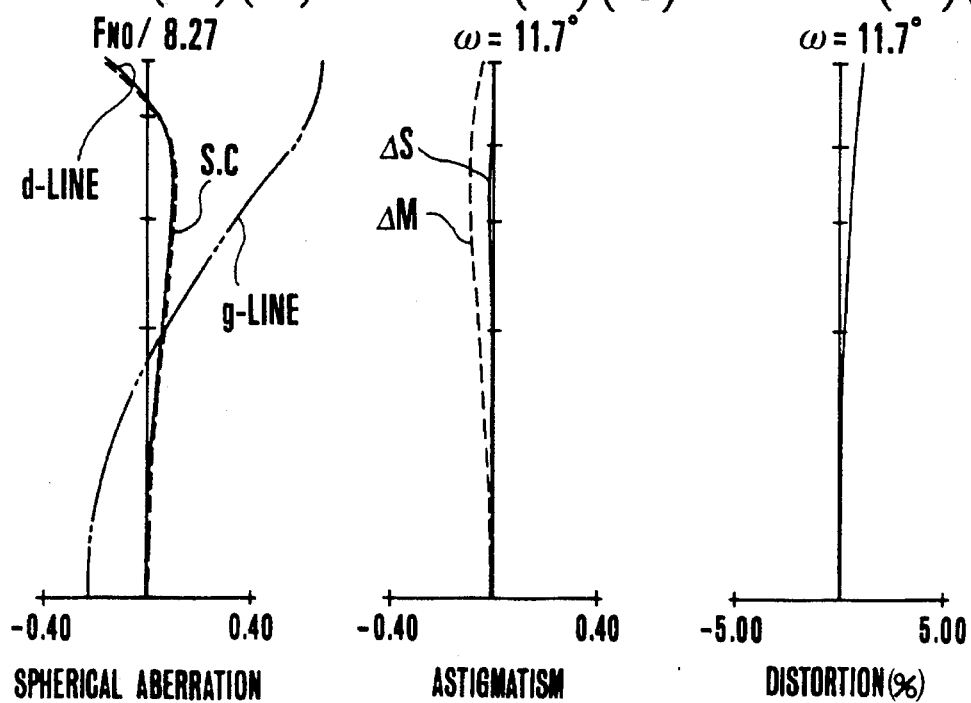

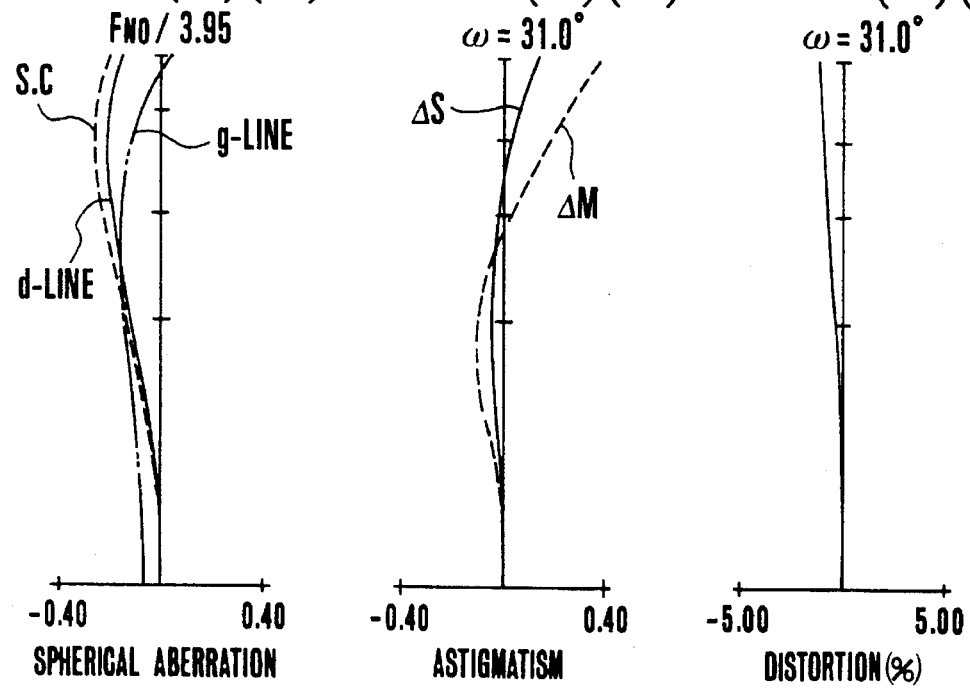
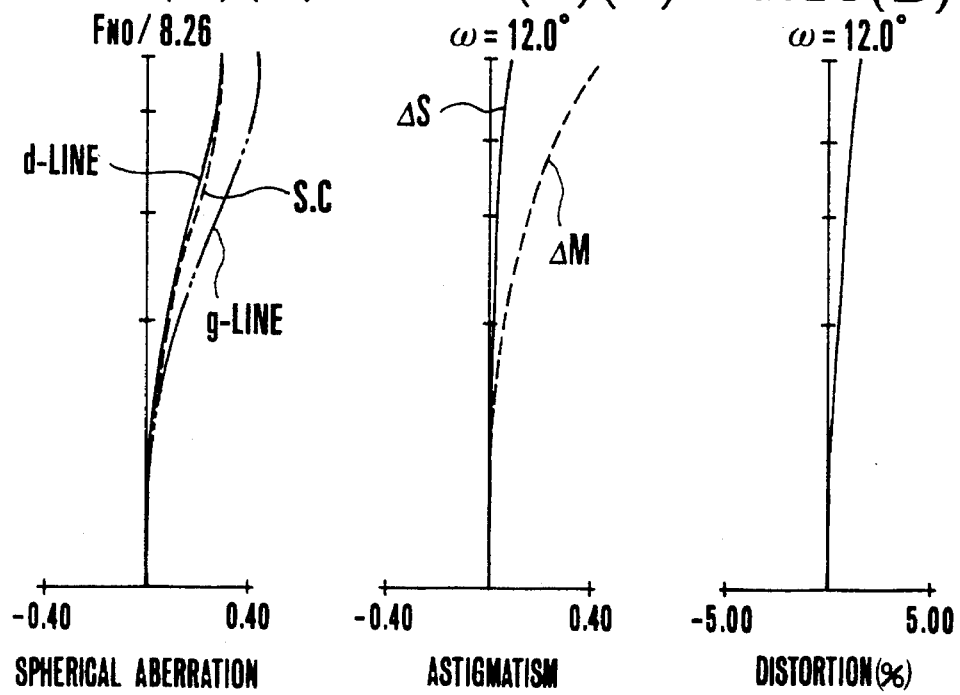

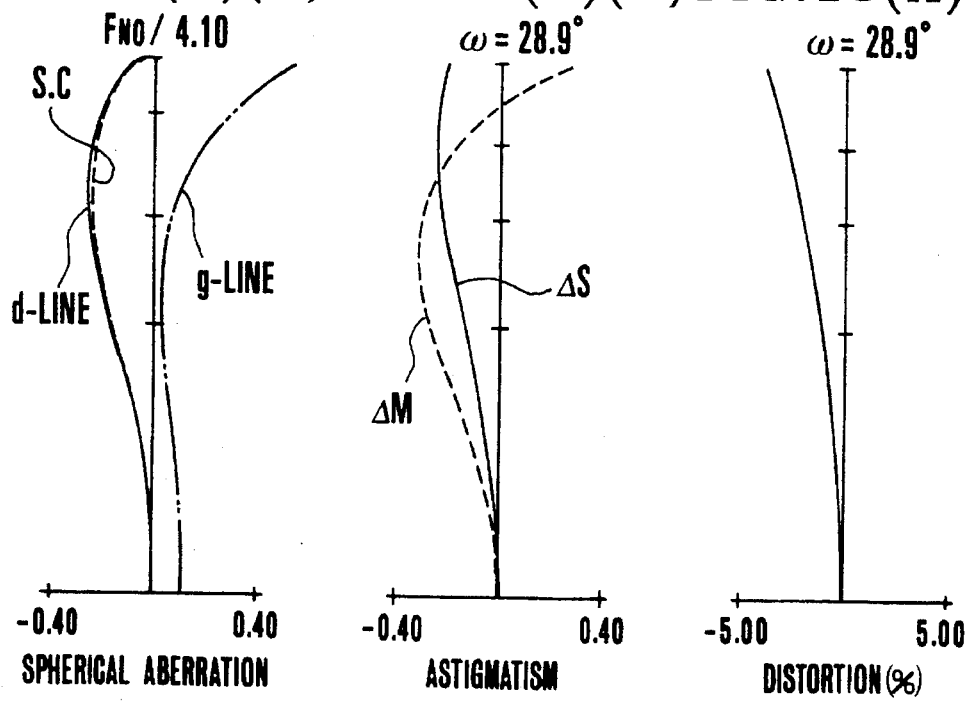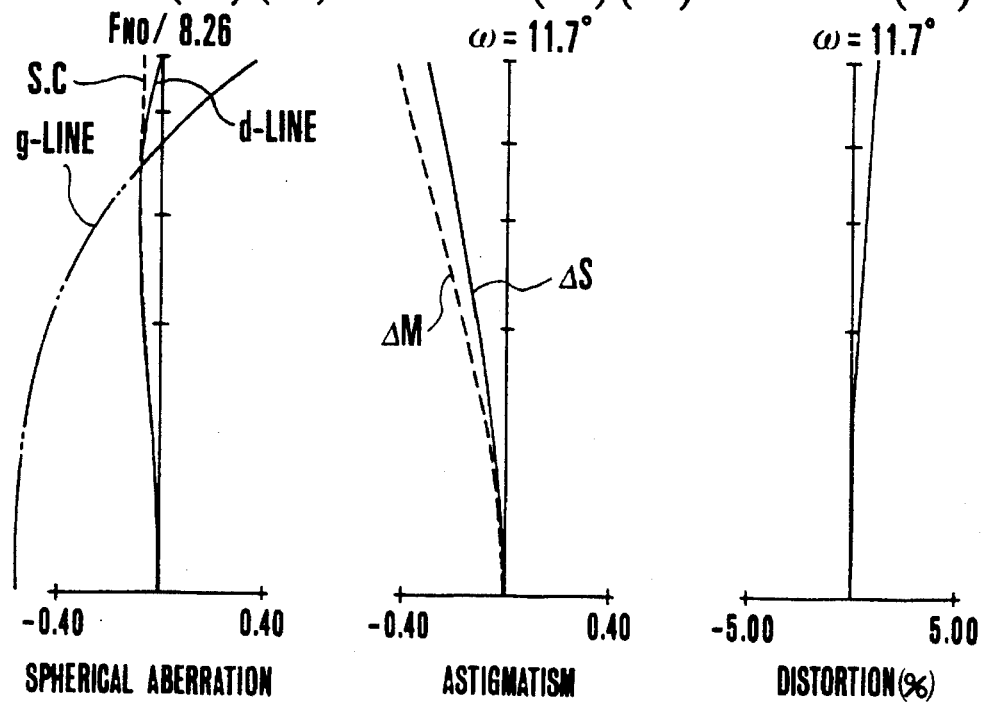

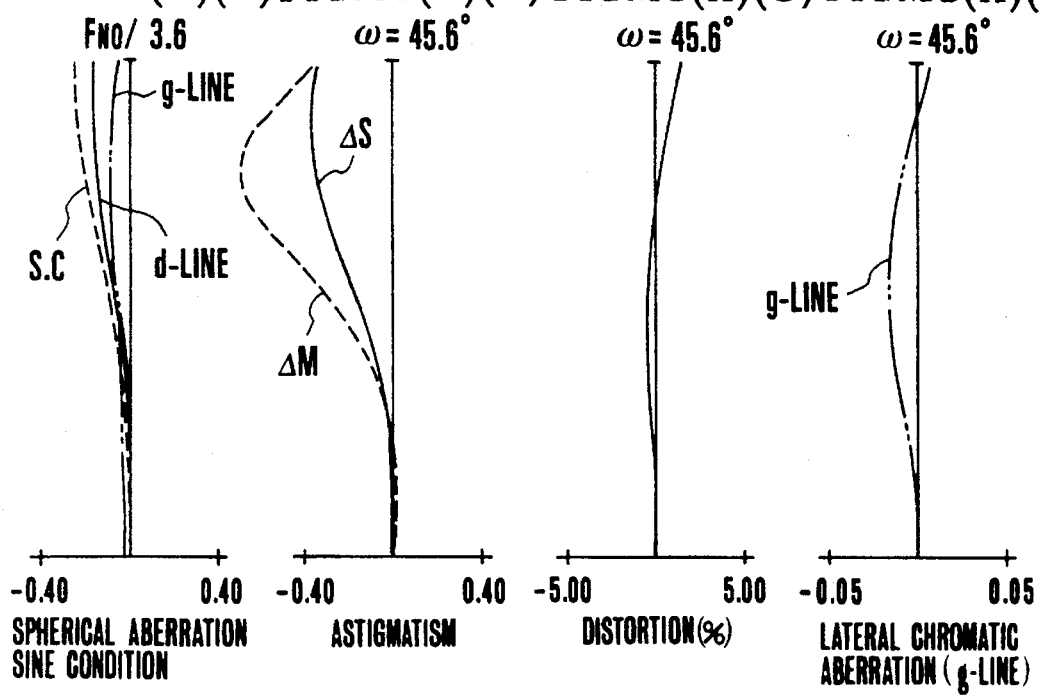
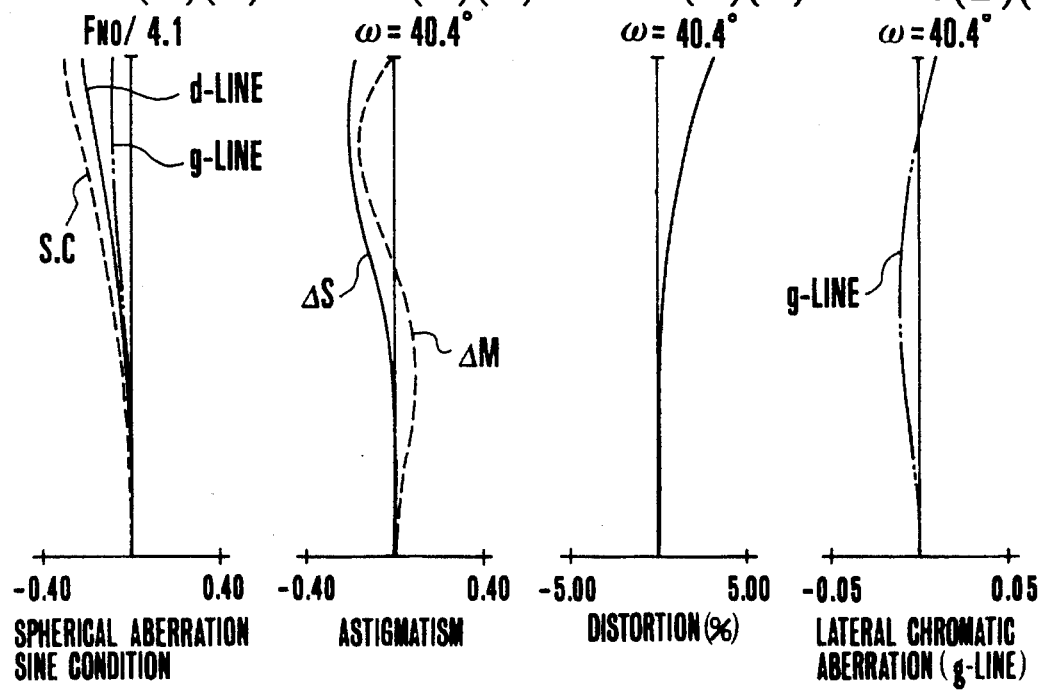

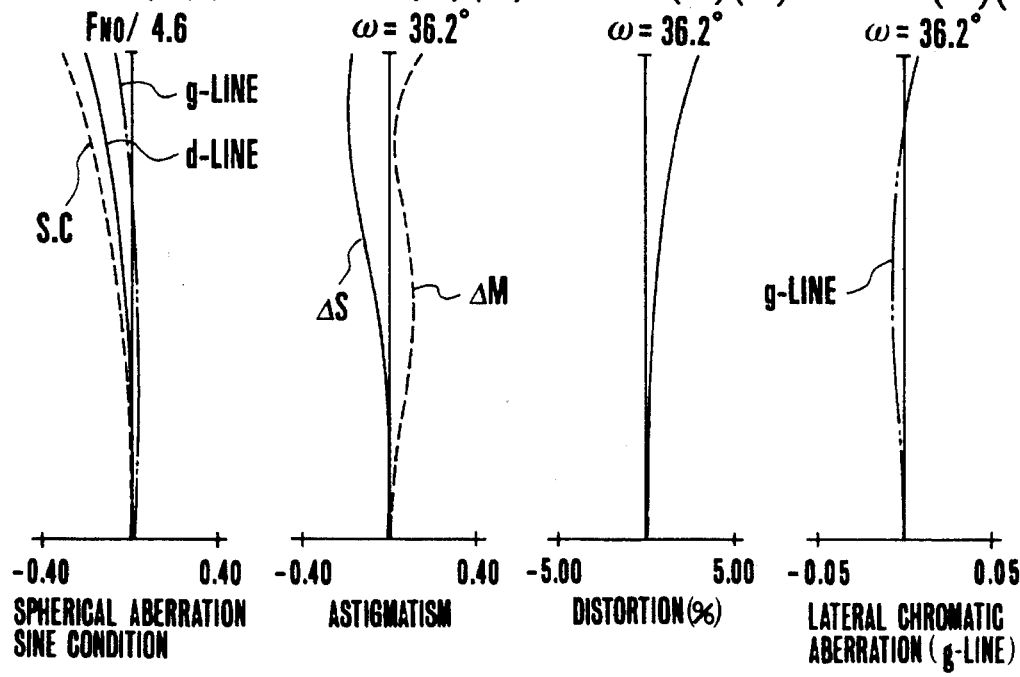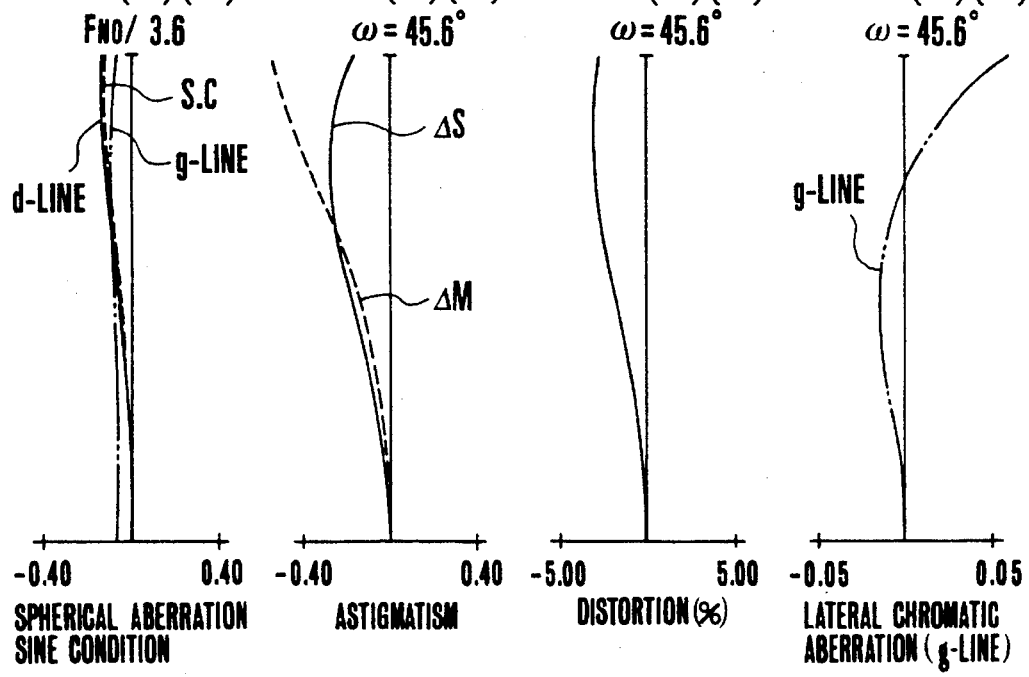

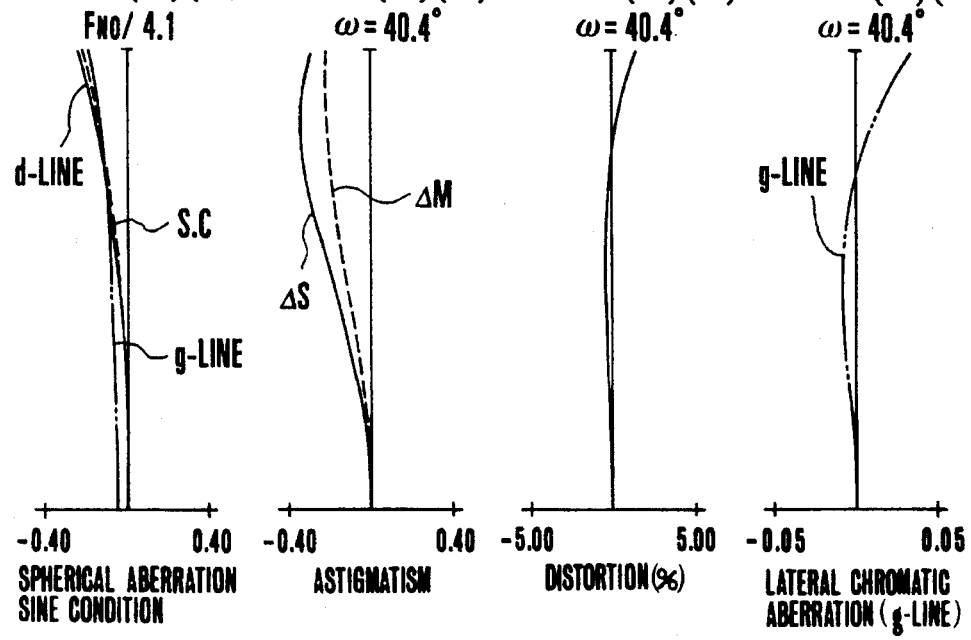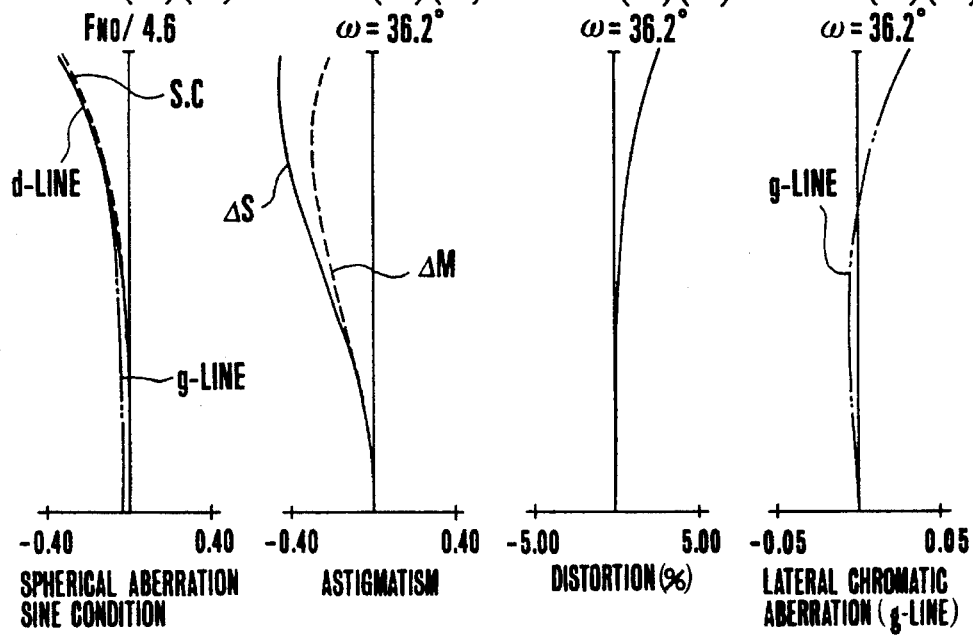

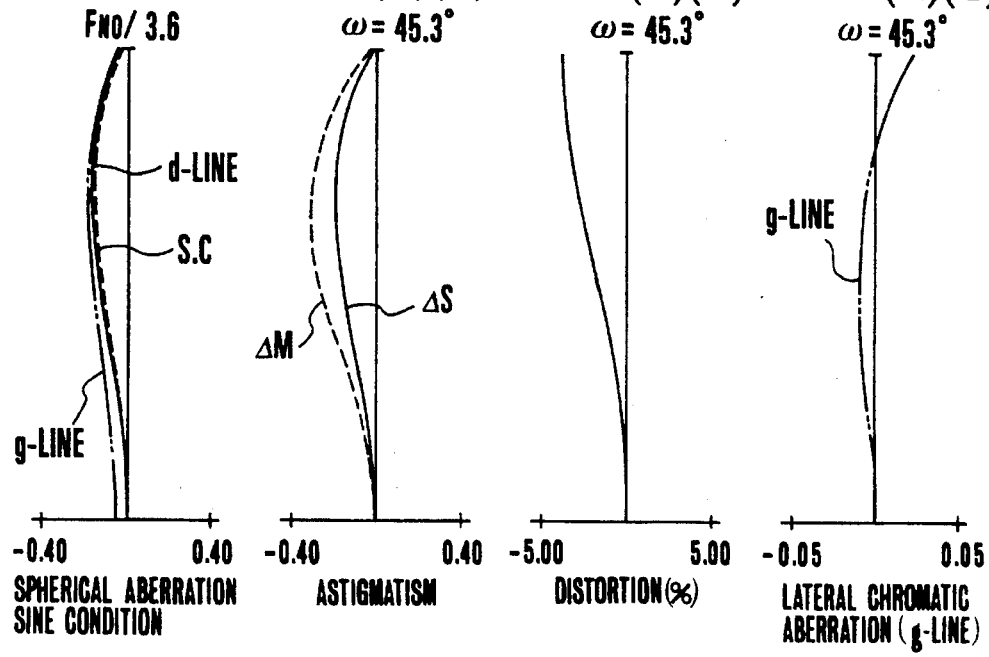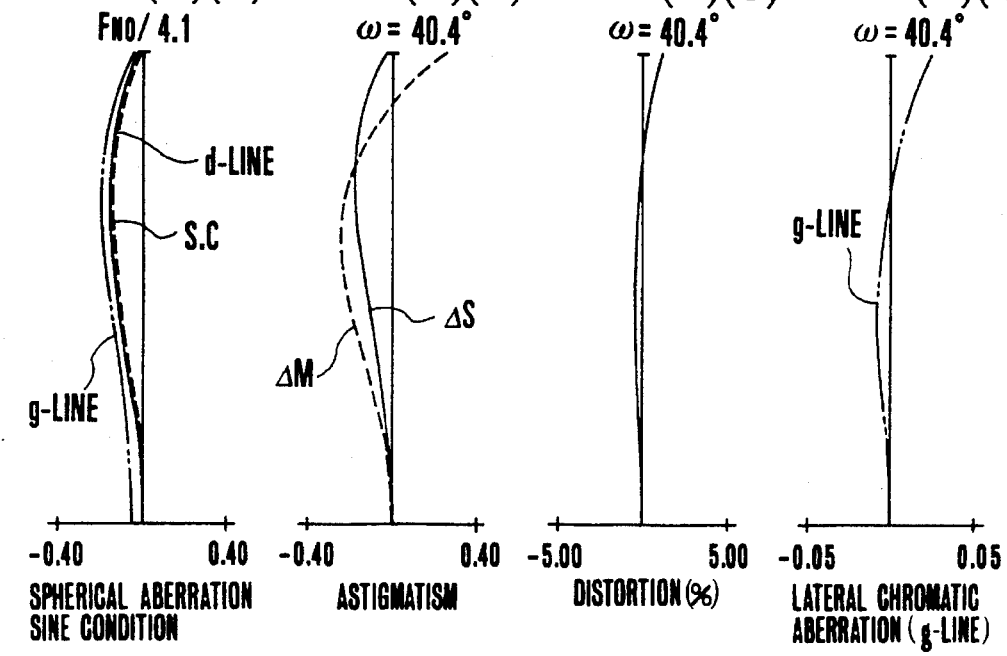

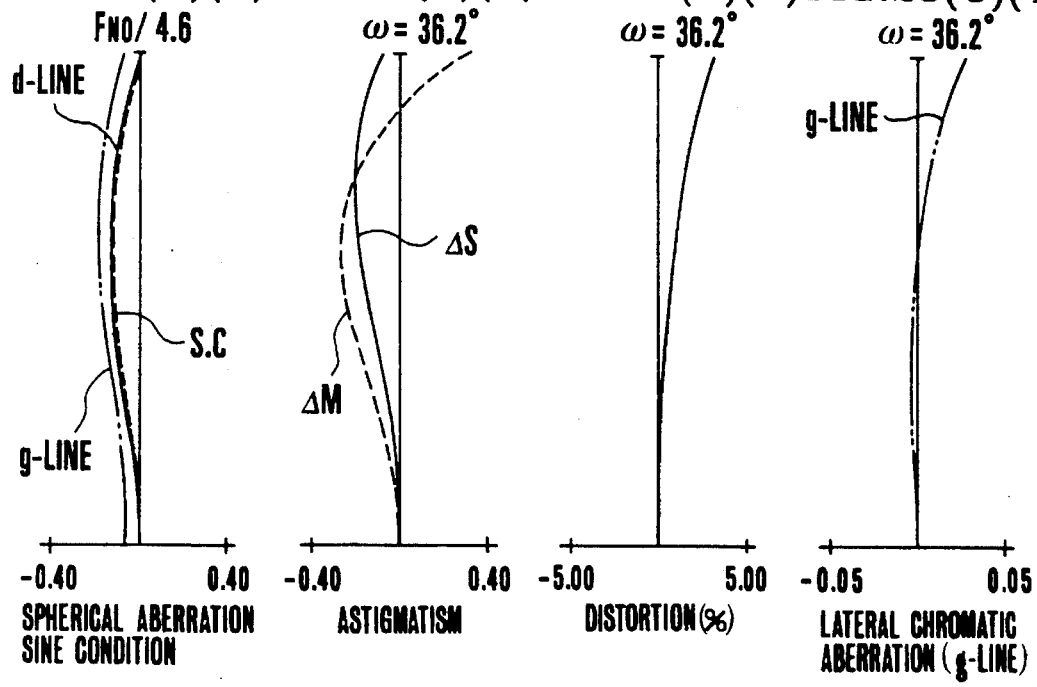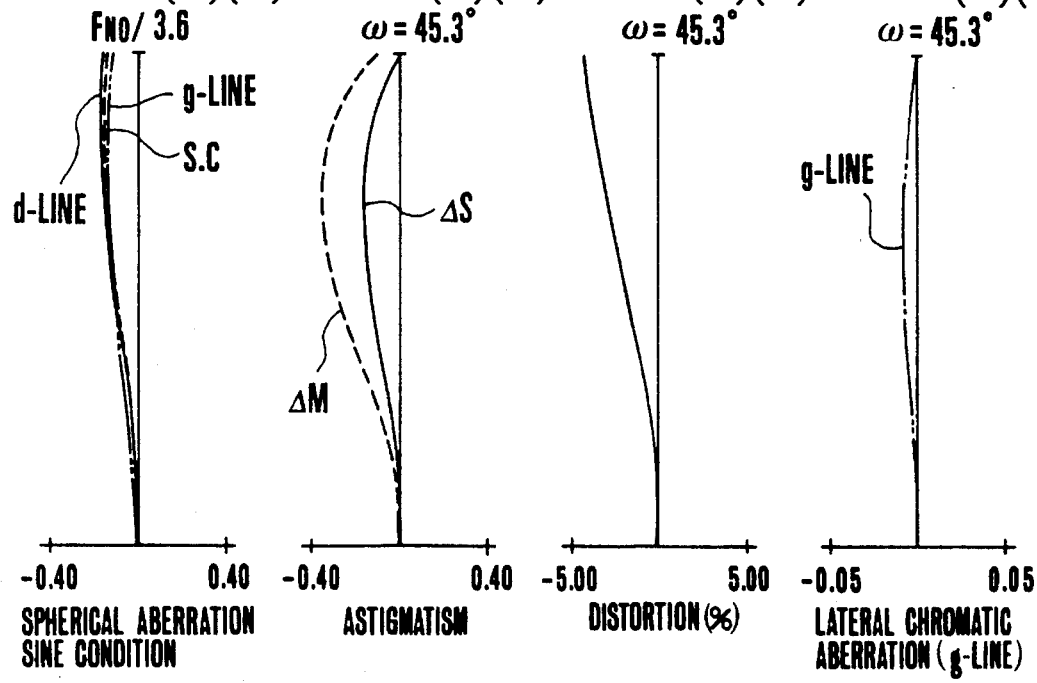

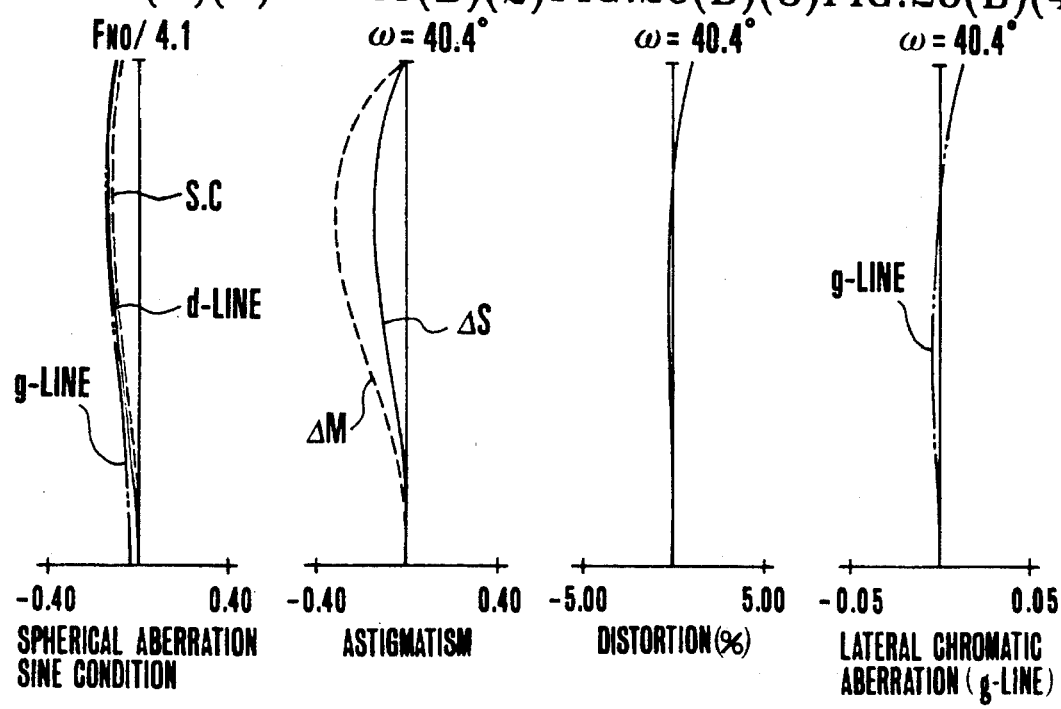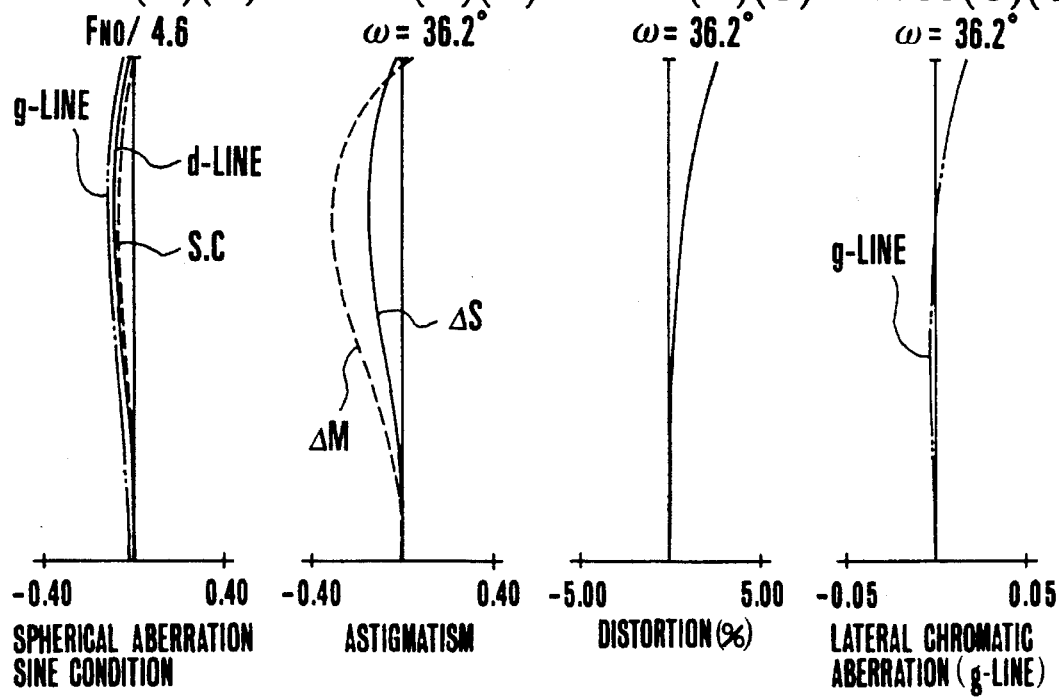

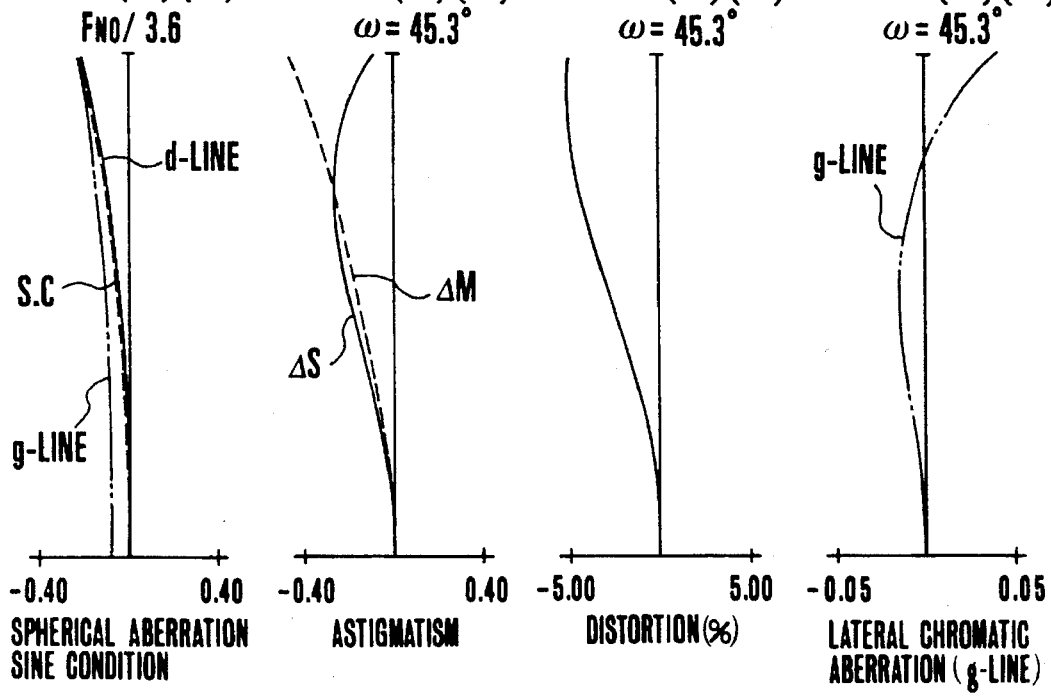
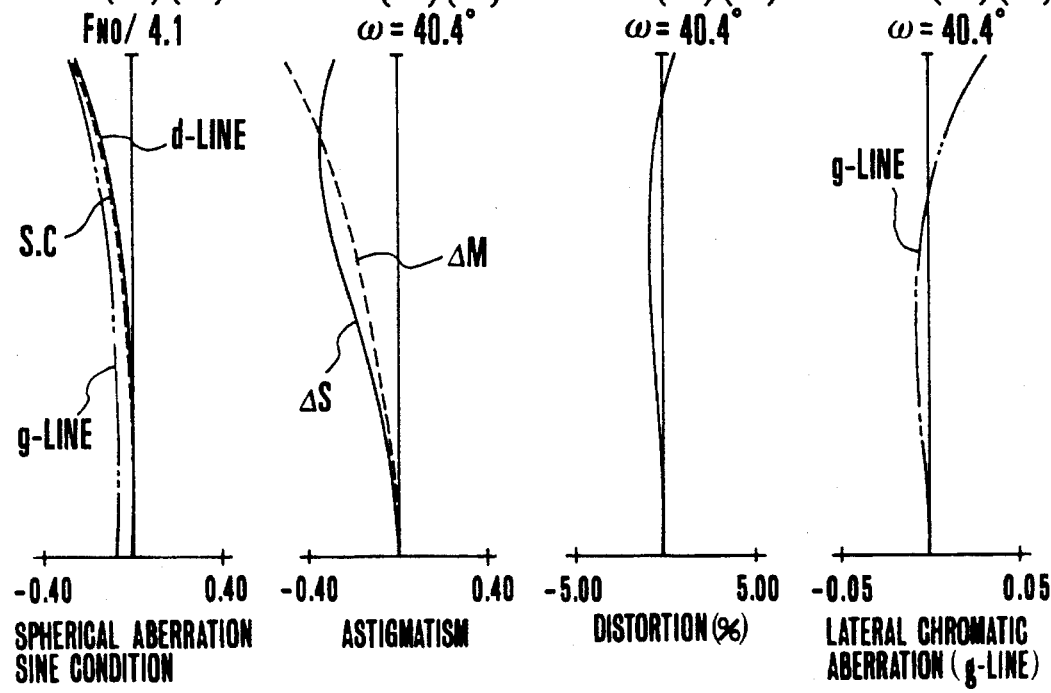

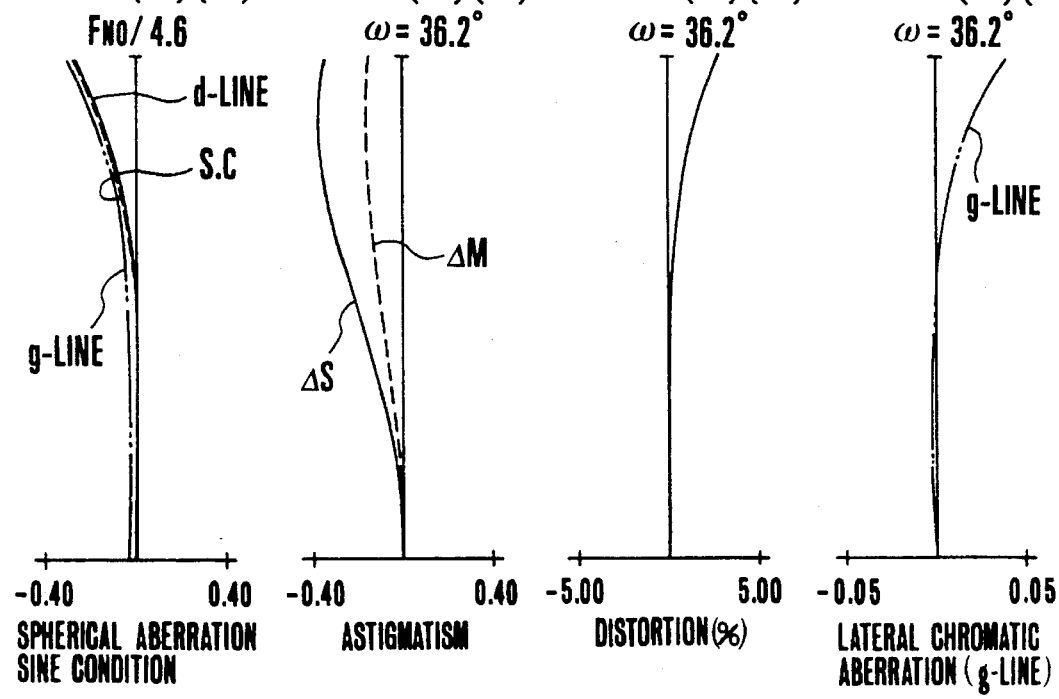
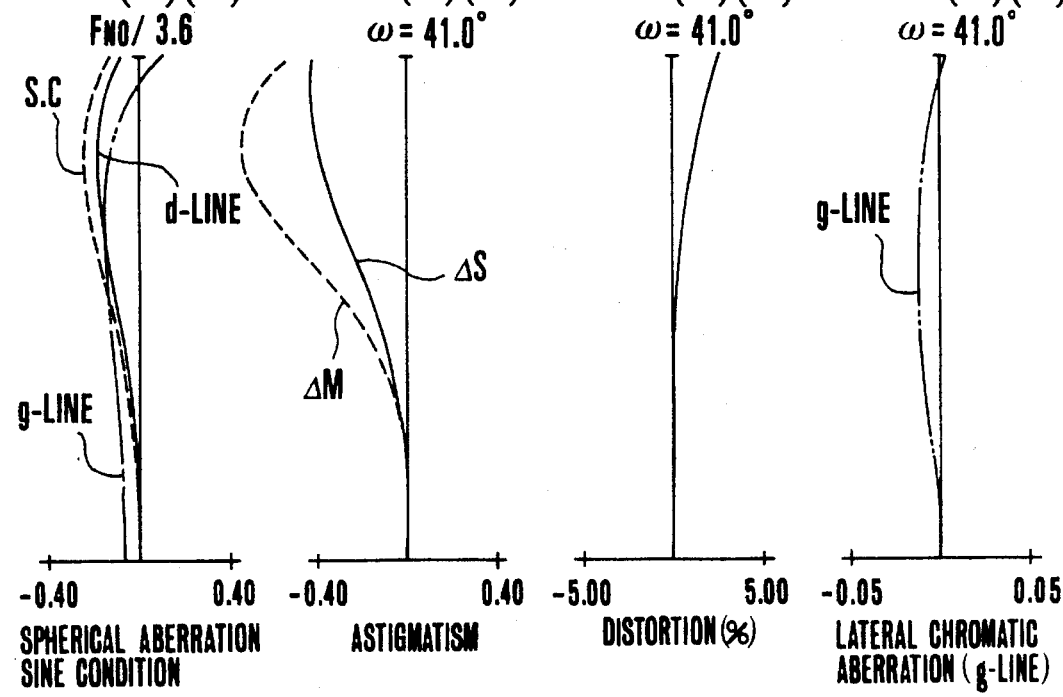

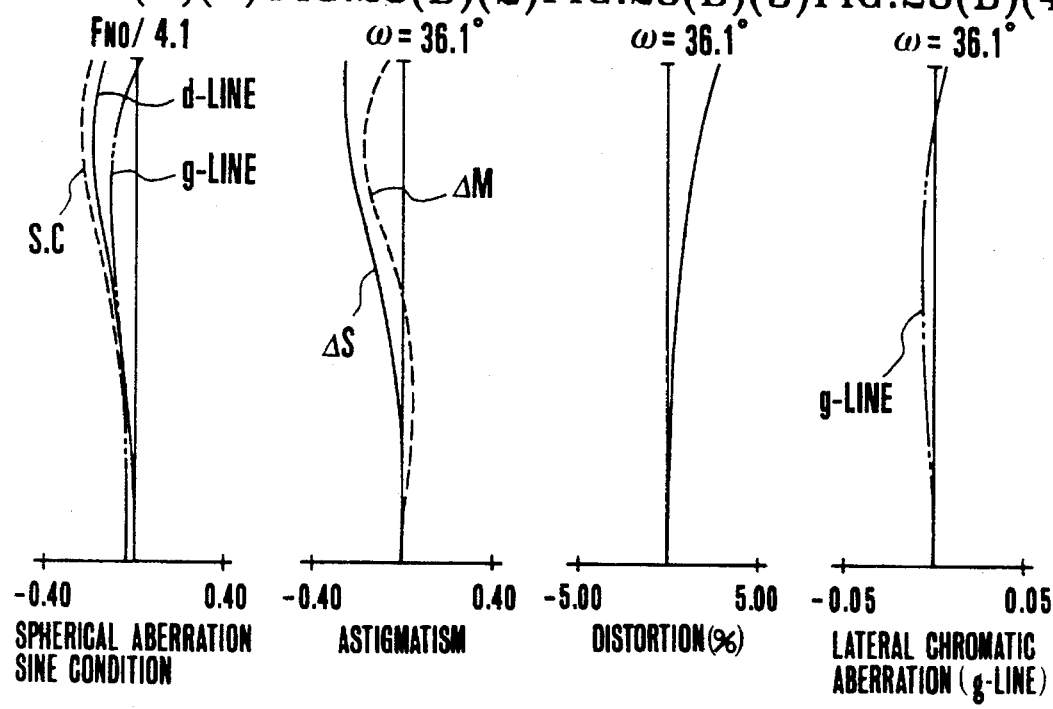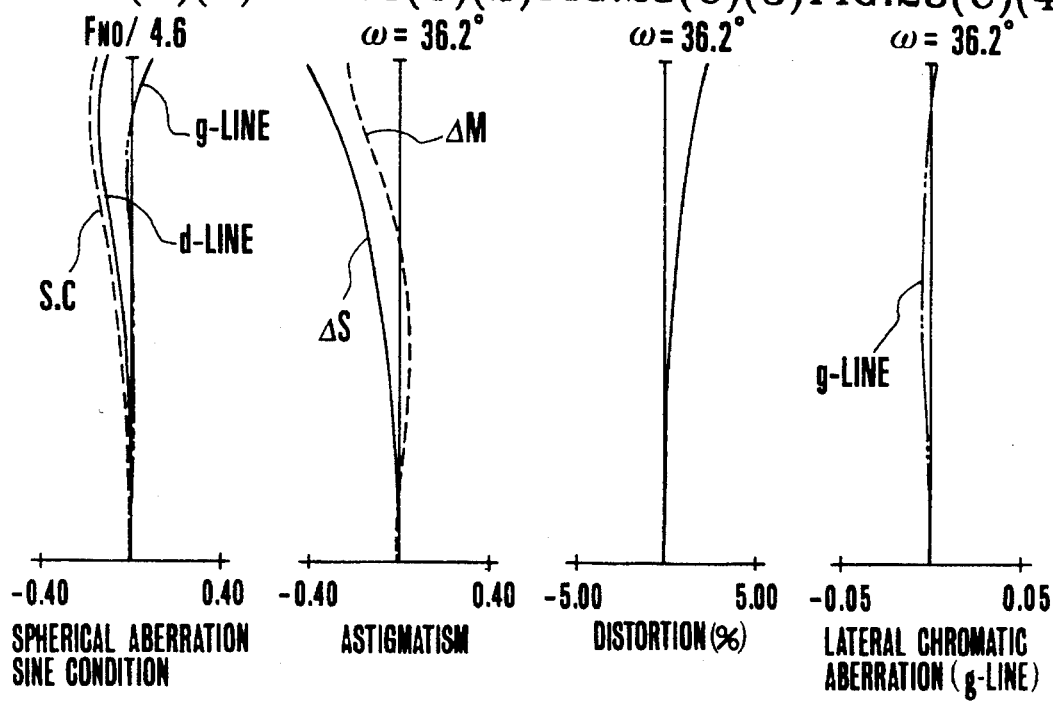

F I G. 32(A)
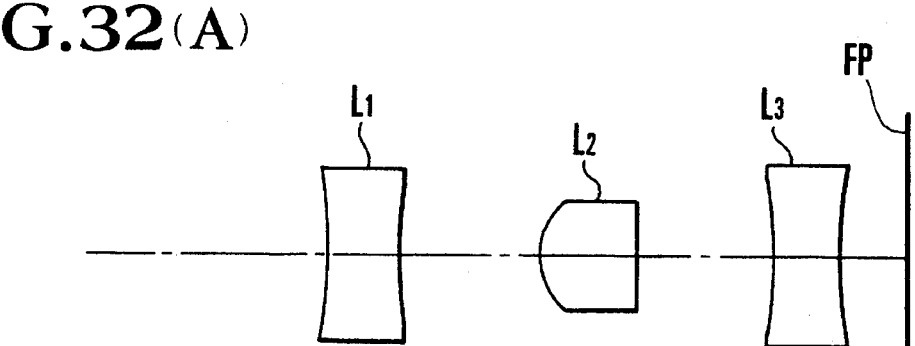
F I G. 32(B)
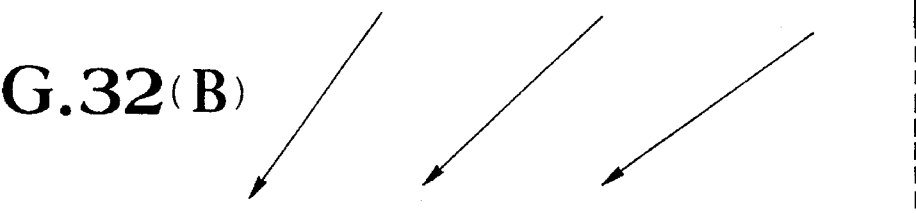
F I G. 32(C)
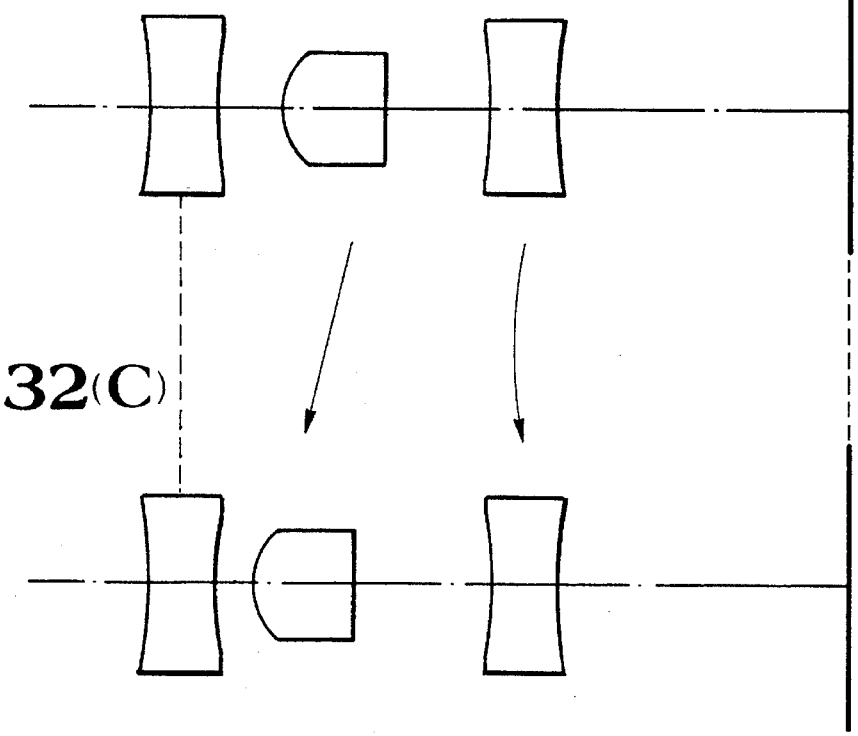

ZOOM LENS AND ZOOMING METHOD

BACKGROUND OF THE INVENTION

1. Field of the Invention

This invention relates to zoom lenses suited to be used in photographic cameras or video cameras and, more particularly, to a zoom lens which has a front lens unit of negative refractive power, or is of the so-called "negative lead" type, while still permitting minimization of the size of the lens system to be achieved.

2. Description of the Related Art

The zoom lenses of the negative lead type with size at a minimum have been disclosed in Japanese Laid-Open Patent Applications No. Sho 63-25613 and No. Hei 2-238417, for example. Each of these zoom lenses comprises, from front to rear, a first lens unit of negative refractive power, a second lens unit of positive refractive power and a third lens unit of negative refractive power, with zooming being performed by varying the separations between the lens units. The use of such a type has made it possible to realize a minimization of size over the minus-plus form of the 2-unit type zoom lens which had so far been well known.

The zoom lenses each composed of three lens units having negative, positive and negative refractive powers are described also in Japanese Laid-Open Patent Applications No. Sho 63-271214, No. Sho 64-72114 and No. Hei 2-238418 and U.S. Pat. No. 4,936,661.

However, the above-described conventional examples of the minus-plus-minus form of the 3-unit type zoom lens, despite the total length of the entire lens system being shortened from that of the minus-plus form of the 2-unit type zoom lens, have the disadvantage that they are bulky from the point of view of the outer diameter of the lens.

Meanwhile, with the negative lead type of zoom lens it is, in general, relatively easy to increase the maximum image angle. For this reason, it is expected to be used as the lens system for the panorama photography in recent years.

To achieve widening of the image angle to 90° or more in such a manner that the optical performance is maintained well over the entire area of the image frame, however, it is necessary to set forth proper rules of design of the lens units in terms of the refractive power arrangement, etc. If these rules are improper, the variation with zooming of aberrations is caused to increase. The resultant aberrations could not be corrected well even if the number of lens elements is increased, making it difficult to obtain a high optical performance throughout the entire zooming range.

In such zoom lenses, on the other hand, there has been a growing demand for a much desired increase of the zoom ratio. But, to keep the positions of the three lens units at a high accuracy as they move in differential relation to one another, the mounting mechanism for the lens units and the zooming mechanism tend to become complex in structure and large in size.

SUMMARY OF THE INVENTION

An aspect of the present invention is to provide a zoom lens of the negative lead type having a high range with good performance.

Another aspect of the invention is to provide a zoom lens which is not only short in the total length but also shortened in the outer diameter.

A further aspect of the invention is to provide a zoom lens of widened image angle, while still maintaining high image quality.

A still further aspect of the invention is to extend the zooming range of the conventional 3-unit type of zoom lens or its modified type of zoom lens.

These and other aspects of the invention will become apparent from the following description of the embodiments of the invention.

BRIEF DESCRIPTION OF THE DRAWINGS

FIGS. 9(A)(1)–9(A)(3) and 9(B)(1)–9(B)(3) are graphic representations of the various aberrations of the numerical example 1.

FIGS. 10(A)(1)–10(A)(3) and 10(B)(1)–10(B)(3) are graphic representations of the various aberrations of the numerical example 2.

FIGS. 11(A)(1)–11(A)(3) and 11(B)(1)–11(B)(3) are graphic representations of the various aberrations of the numerical example 3.

FIGS. 12(A)(1)–12(A)(3) and 12(B)(1)–12(B)(3) are graphic representations of the various aberrations of the numerical example 4.

FIGS. 13(A)(1)–13(A)(3) and 13(B)(1)–13(B)(3) are graphic representations of the various aberrations of the numerical example 5.

FIGS. 14(A)(1)–14(A)(3) and 14(B)(1)–14(B)(3) are graphic representations of the various aberrations of the numerical example 6.

FIGS. 15(A)(1)–15(A)(3) and 15(B)(1)–15(B)(3) are graphic representations of the various aberrations of the numerical example 7.

FIGS. 16(A)(1)–16(A)(3) and 16(B)(1)–16(B)(3) are graphic representations of the various aberrations of the numerical example 8.

FIGS. 23(A)(1)–23(A)(4), 23(B)(1)–23(B)(4), and 23(C)(1)–23(C)(4) are graphic representations of the aberrations of the numerical example 9.

FIGS. 24(A)(A)(1)–24(A)(4), 24(B)(1)–24(B)(4), and 24(C)(1)–24(C)(4) are graphic representations of the aberrations of the numerical example 10.

FIGS. 25(A)(1)–25(A)(4), 25(B)(1)–25(B)(4), and 25(C)(1)–25(C)(4) are graphic representations of the aberrations of the numerical example 11.

FIGS. 26(A)(1)–26(A)(4), 26(B)(1)–26(B)(4), and 26(C)(1)–26(C)(4) are graphic representations of the aberrations of the numerical example 12.

FIGS. 27(A)(1)–27(A)(4), 27(B)(1)–27(B)(4), and 27(C)(1)–27(C)(4) are graphic representations of the aberrations of the numerical example 13.

FIGS. 28(A)(1)–28(A)(4), 28(B)(1)–28(B)(1), and 28(C)(1)–20(C)(4) are graphic representations of the aberrations of the numerical example 14.

FIGS. 32(A), 32(B) and 32(C) are diagrams of the paraxial refractive power arrangement of the numerical example 18 of the invention.

DETAILED DESCRIPTION OF THE PREFERRED EMBODIMENTS

Figure 1:
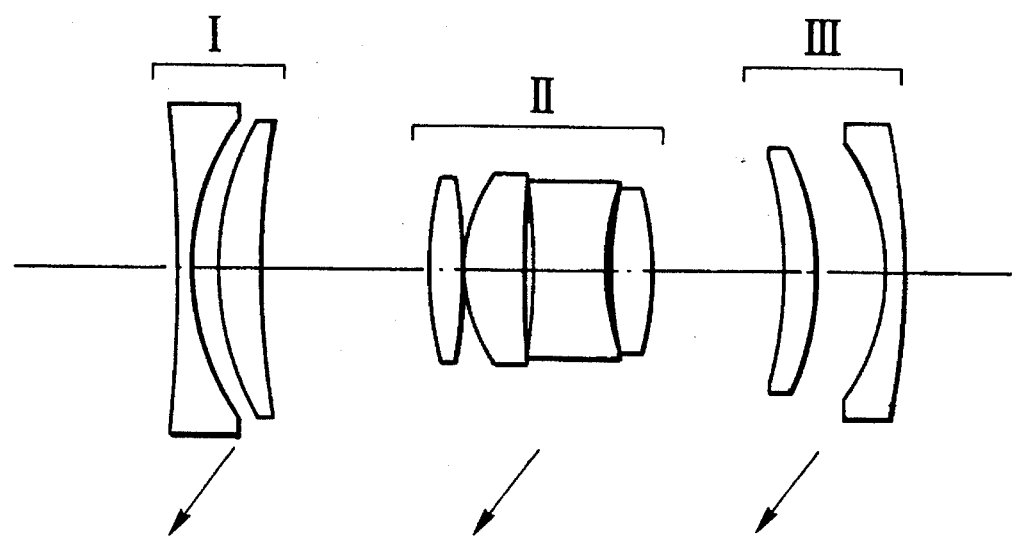
FIG. 1 is a lens block diagram of the numerical example 1 of the invention.
Figure 2:
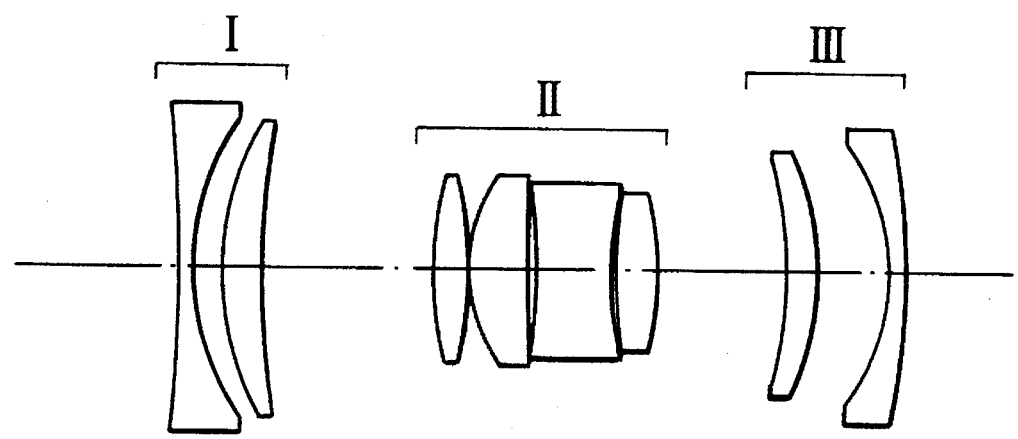
FIG. 2 is a lens block diagram of the numerical example 2 of the invention.
Figure 3:
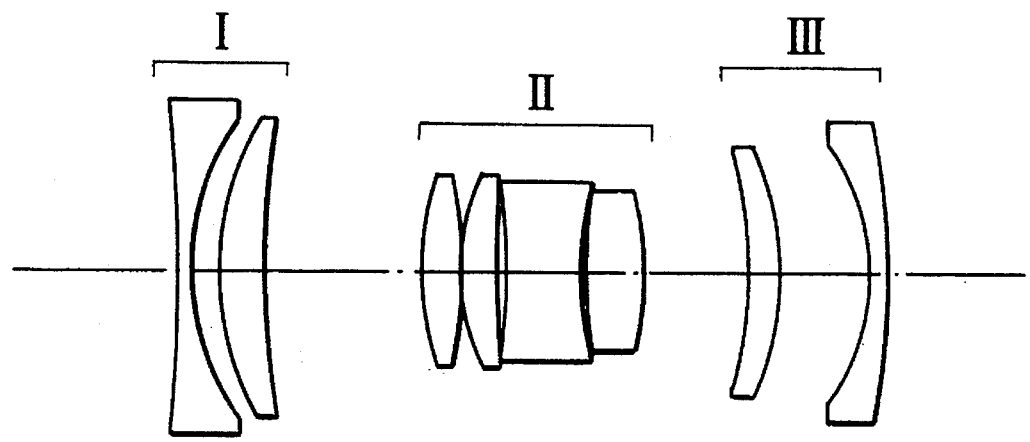
FIG. 3 is a lens block diagram of the numerical example 3 of the invention.
Figure 4:
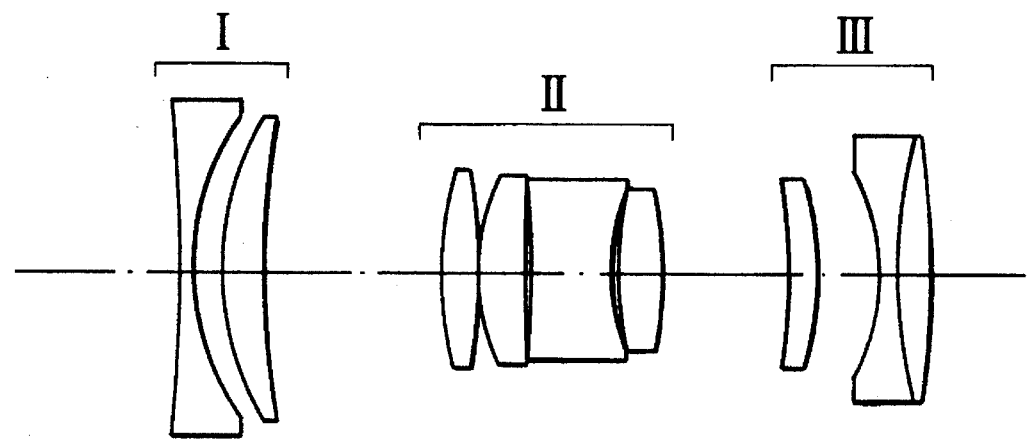
FIG. 4 is a lens block diagram of the numerical example 4 of the invention.
Figure 5:
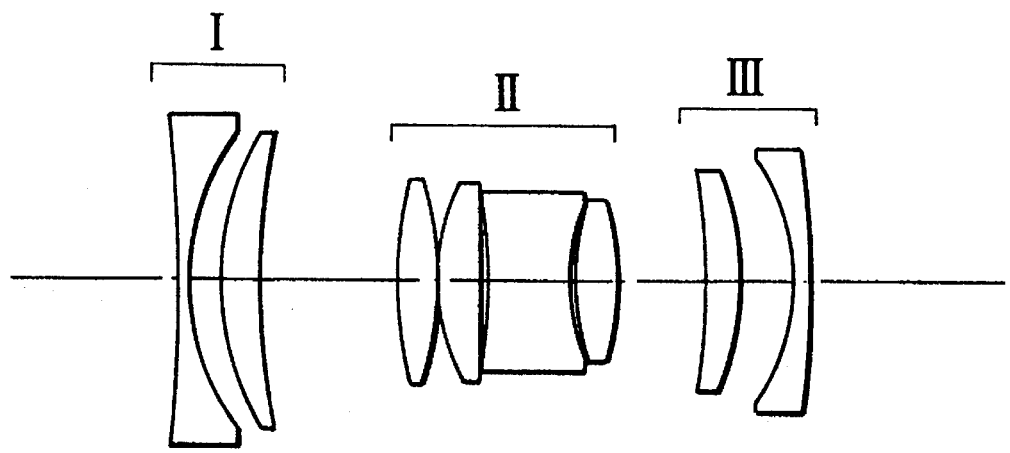
FIG. 5 is a lens block diagram of the numerical example 5 of the invention.
Figure 6:
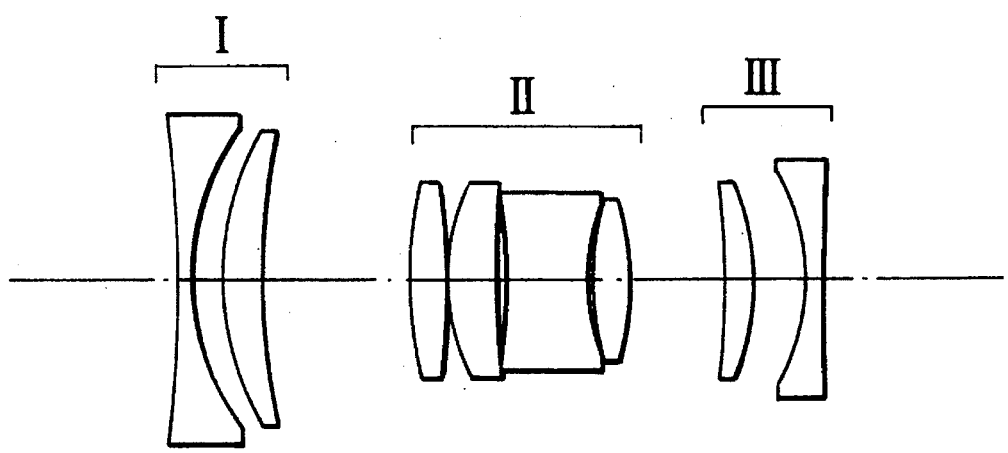
FIG. 6 is a lens block diagram of the numerical example 6 of the invention.
Figure 7:
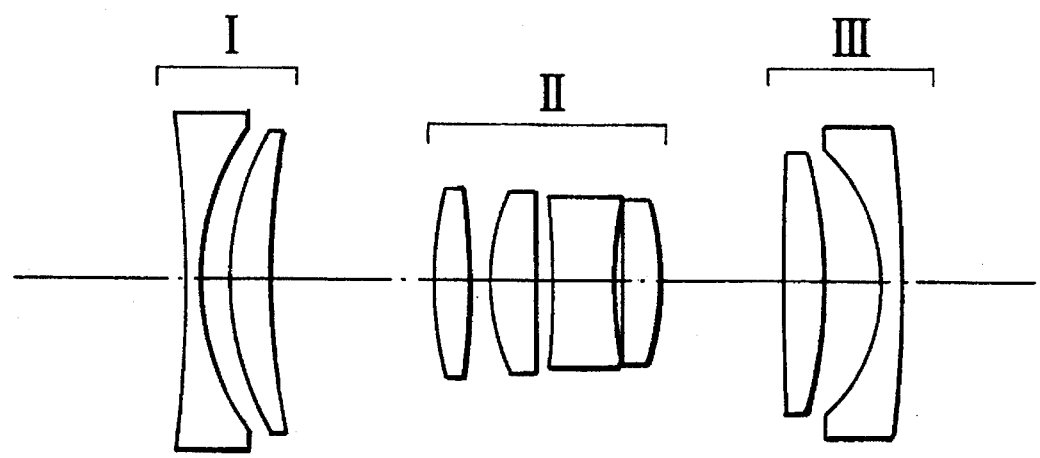
FIG. 7 is a lens block diagram of the numerical example 7 of the invention.
Figure 8:
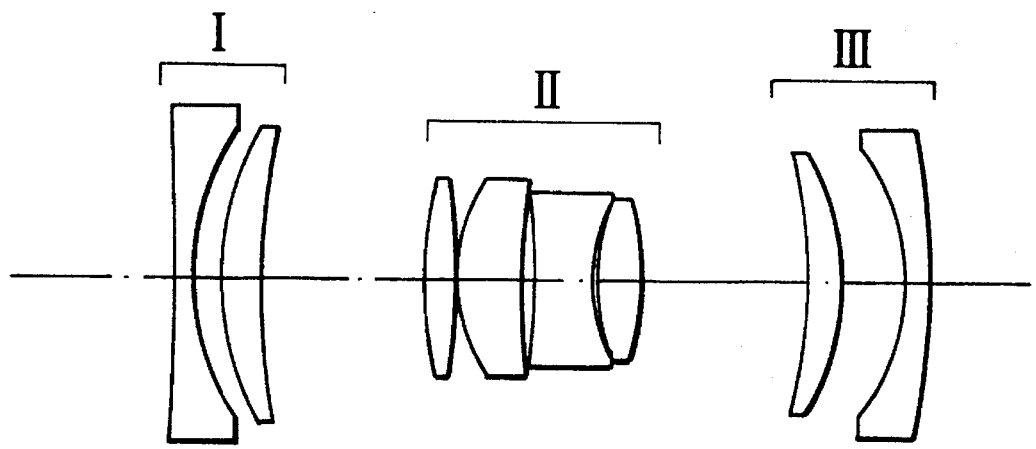
FIG. 8 is a lens block diagram of the numerical example 8 of the invention.
Figure 17A:
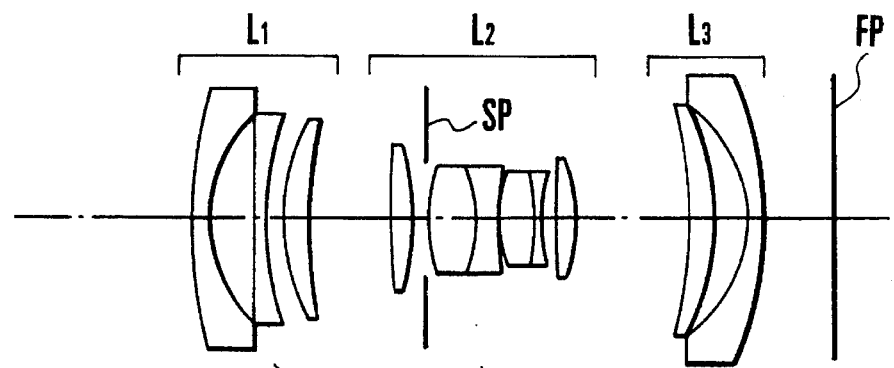
FIGS. 17(A), 17(B) and 17(C) are lens block diagrams of the numerical example 9 of the invention.
Figure 17B:
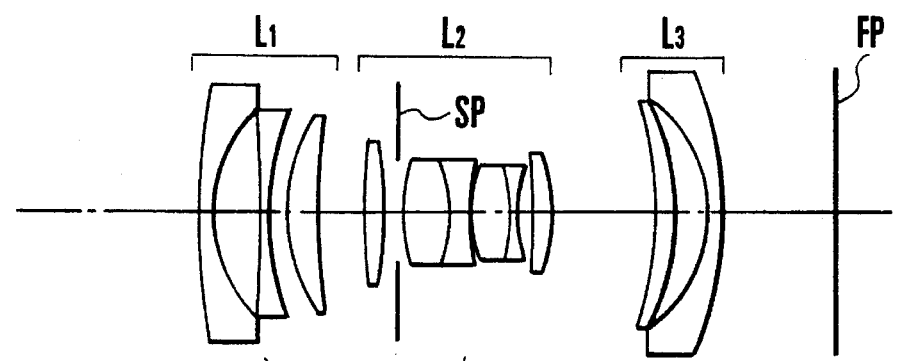
Figure 17C:
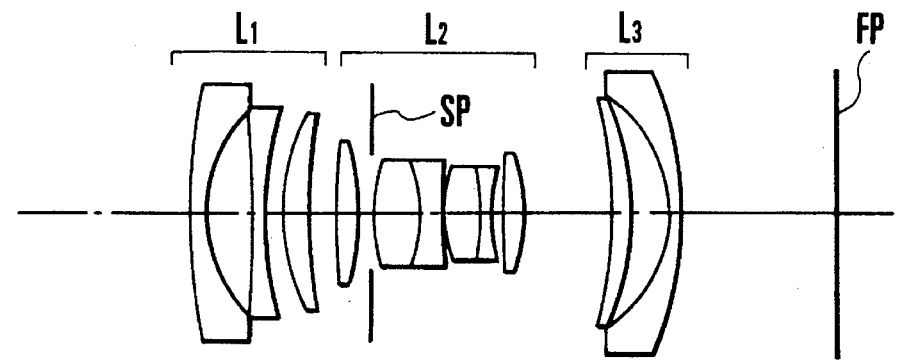
Figure 18A:
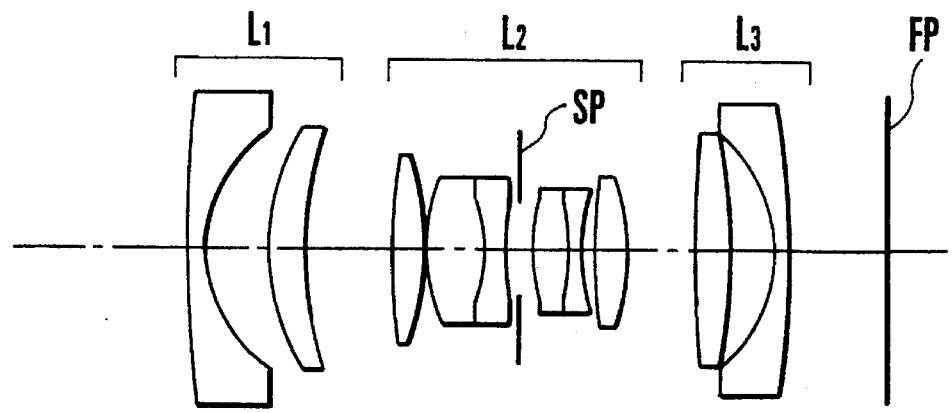
FIGS. 18(A), 18(B) and 18(C) are lens block diagrams of the numerical example 10 of the invention.
Figure 18B:
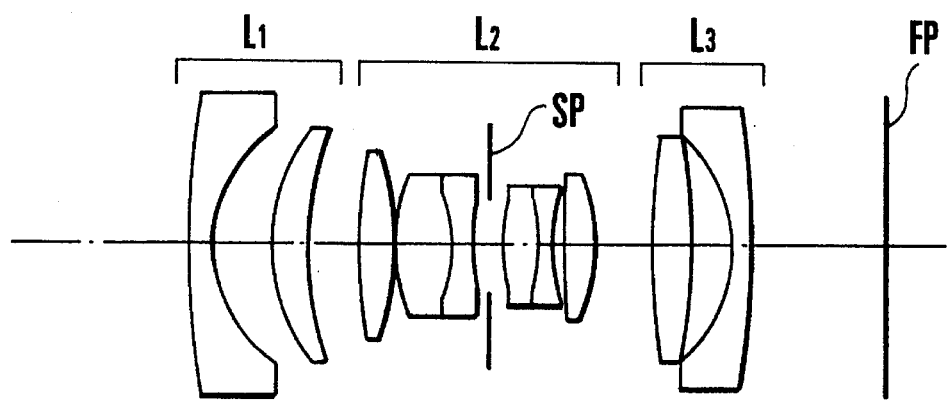
Figure 18C:
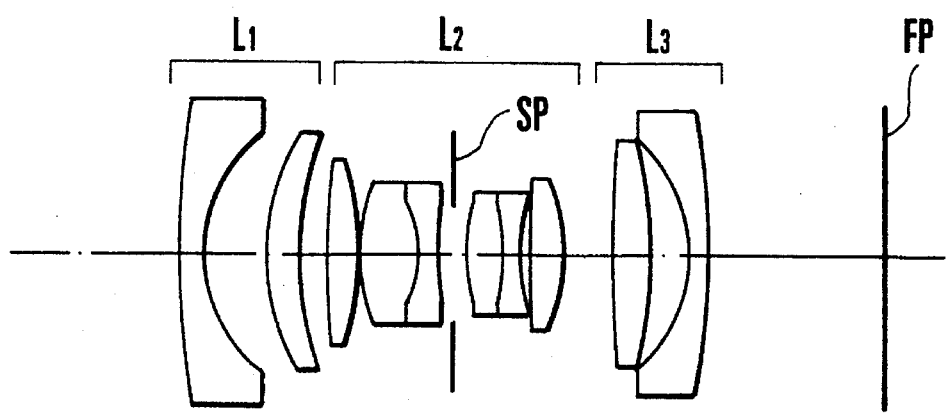
Figure 19A:
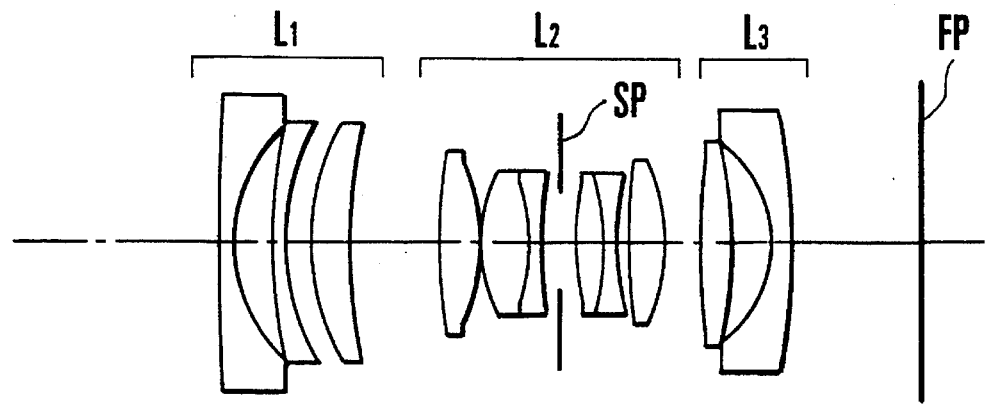
FIGS. 19(A), 19(B) and 19(C) are lens block diagrams of the numerical example 11 of the invention.
Figure 19B:
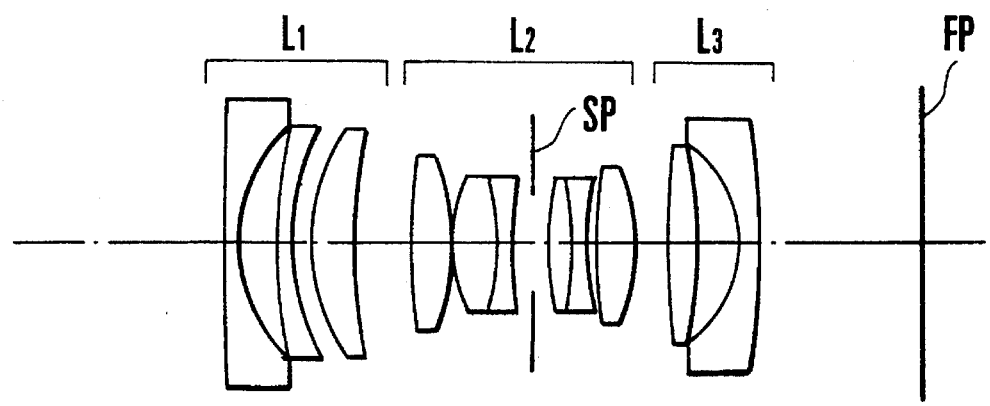
Figure 19C:
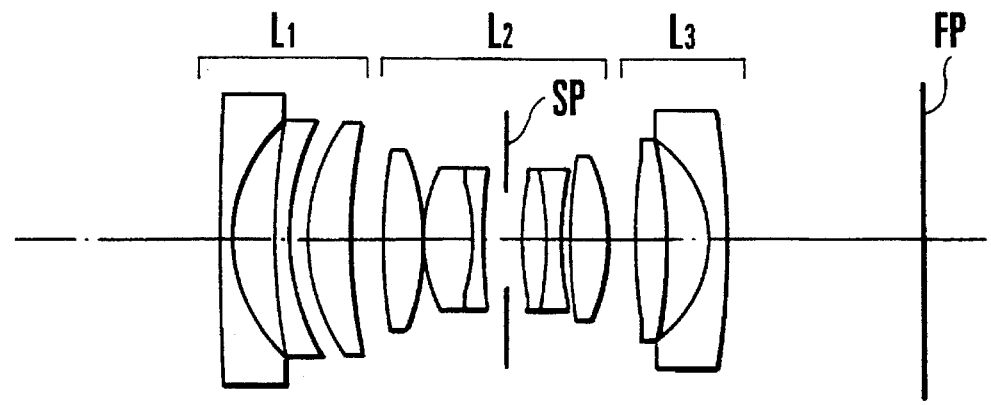
Figure 20A:
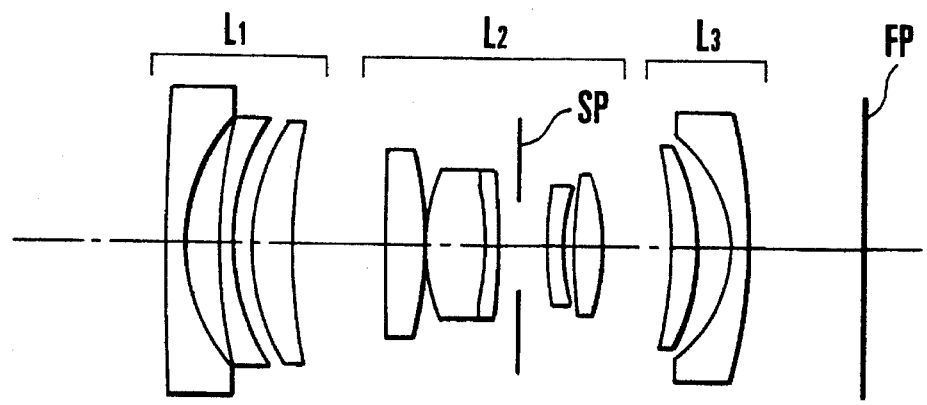
FIGS. 20(A), 20(B) and 20(C) are lens block diagrams of the numerical example 12 of the invention.
Figure 20B:
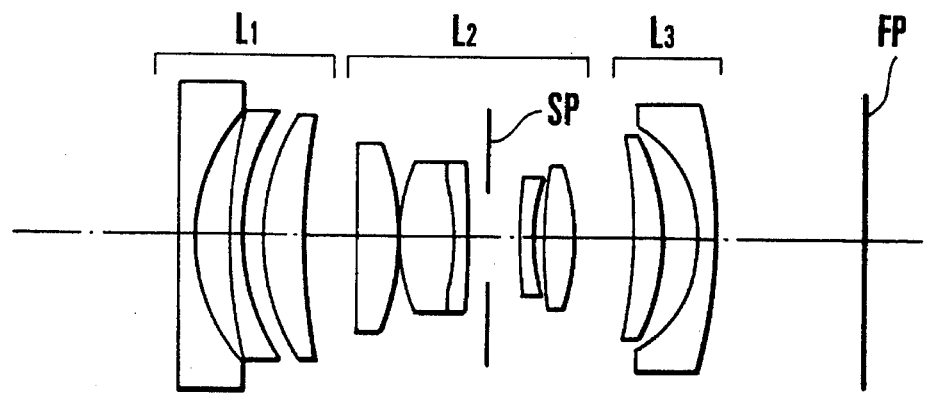
Figure 20C:
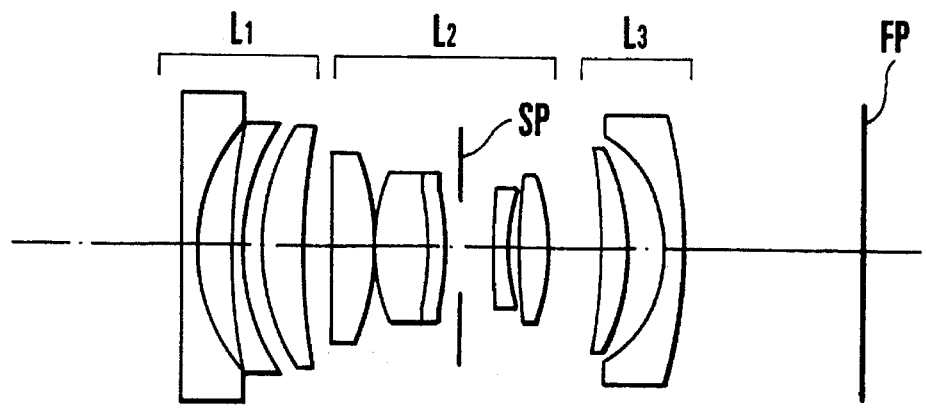
Figure 21A:
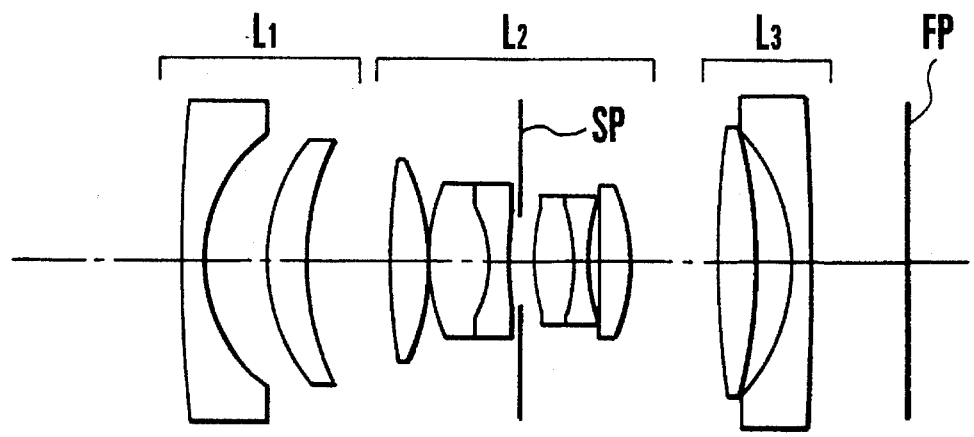
FIGS. 21(A), 21(B) and 21(C) are lens block diagrams of the numerical example 13 of the invention.
Figure 21B:
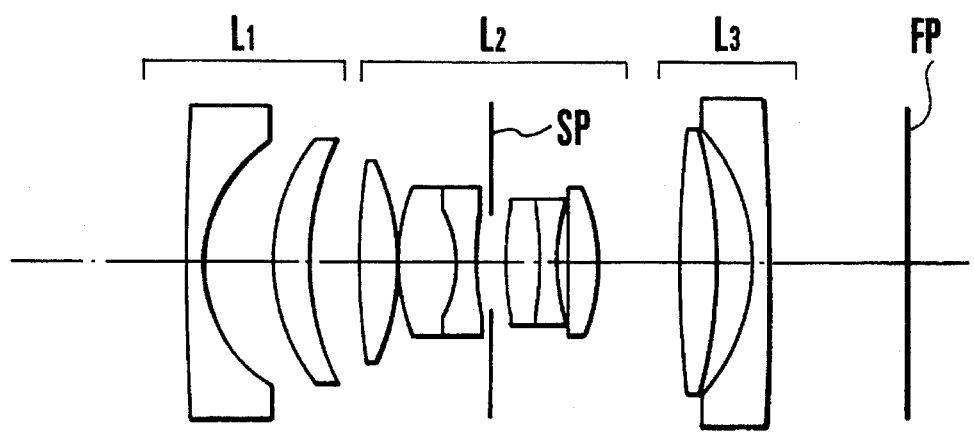
Figure 21C:
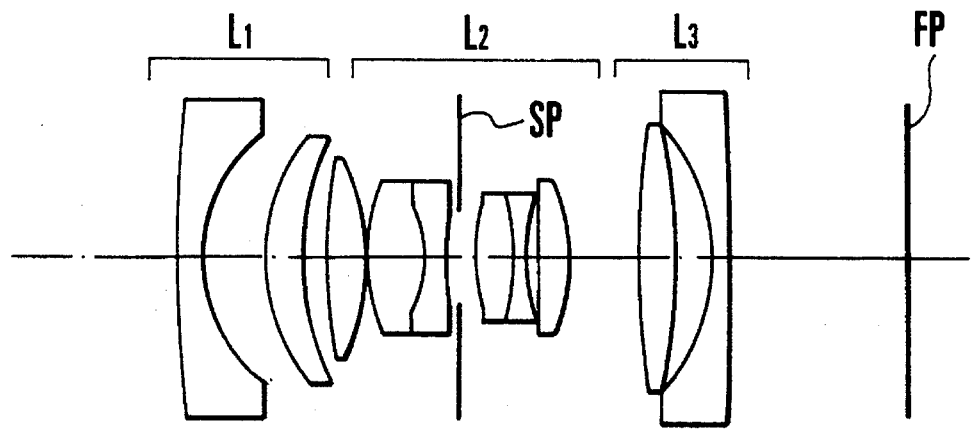
Figure 22A:
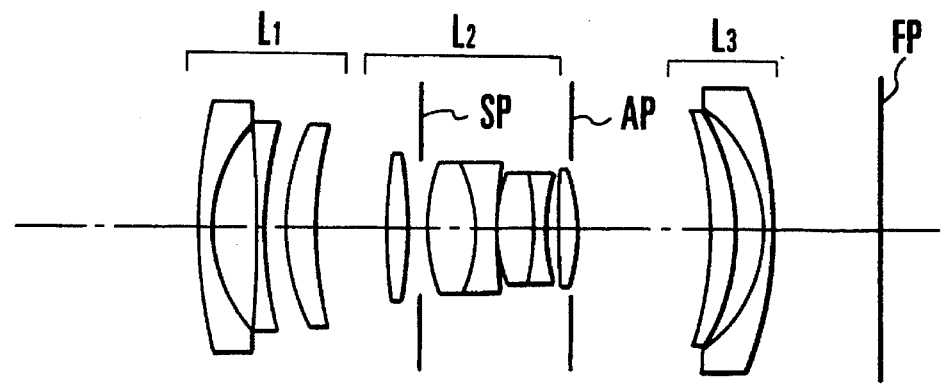
FIGS. 22(A), 22(B) and 22(C) are lens block diagrams of the numerical example 14 of the invention.
Figure 22B:
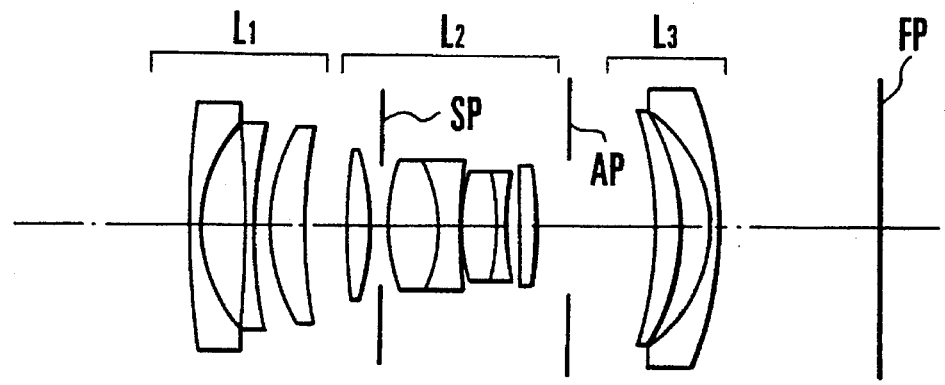
Figure 22C:
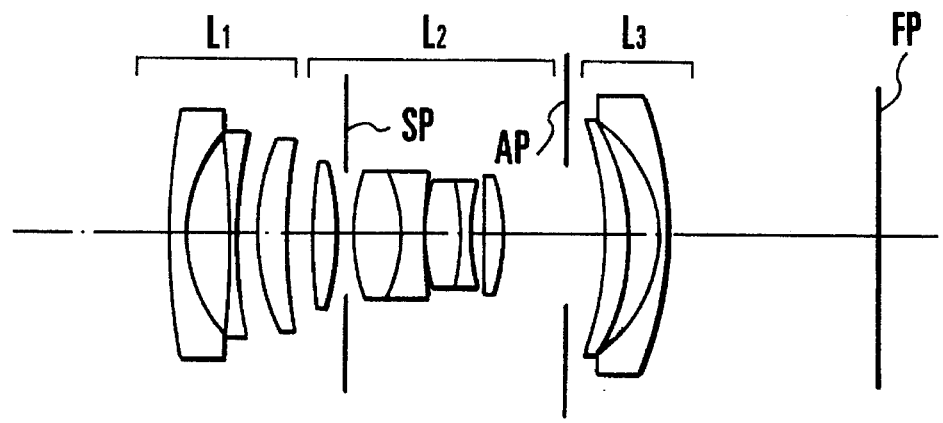

According to an embodiment of the present invention, to reduce the outer diameter of the zoom lens and also to shorten the physical length thereof, the following constructions (i) or (ii), or both of them, are, employed.

(i) A zoom lens comprises, from front to rear, a first lens unit of negative refractive power, a second lens unit of positive refractive power and a third lens unit of negative refractive power, wherein, when these three lens units are moved to effect zooming from a wide-angle end to a telephoto end, at least both the second and third lens units are moved forward, and at least one of the following conditions is satisfied, thereby reducing the outer diameter of the lens and obtaining good optical performance:

$$0.50 < |f_1|/\sqrt{f_W \cdot f_T} < 0.90 \tag{1}$$

$$0.40 < |f_2|/\sqrt{f_W \cdot f_T} < 0.51 \tag{2}$$

$$0.70 < |f_3|/\sqrt{f_W \cdot f_T} < 1.10 \tag{3}$$

$$0.40 < l_{1W}/f_W < 0.80 \tag{4}$$

$$0.21 < l_{2W}/f_W < 0.37 \tag{5}$$

$$0.55 < l_{12W}/f_W < 0.92 \tag{6}$$

where $f_W$: the overall focal length in the wide-angle end of the entire lens system;

$f_T$: the overall focal length in the telephoto end of the entire lens system;

$f_i$: the focal length of the i-th lens unit;

$l_{1W}$: the axial air separation between the first lens unit and the second lens unit in the wide-angle end;

$l_{2W}$: the axial air separation between the second lens unit and the third lens unit in the wide-angle end; and $f_{12W}$: the overall focal length of the first lens unit and the second lens unit in the wide-angle end.

(ii) A zoom lens comprises, from front to rear, a first lens unit of negative refractive power, a second lens unit of positive refractive power and a third lens unit of negative refractive power, wherein, when these three lens units are moved to effect zooming from a wide-angle end to a telephoto end, at least both the second and third lens unit are moved forward, and at least one of the following conditions is satisfied, thereby minimizing the physical length:

$$1.0 < |f_3|/|f_1| < 2.0 \tag{7}$$

$$0 < (e_{1W} - e_{1T})/(e_{2W} - e_{2T}) < 10.0 \tag{8}$$

$$1.0 < (f_{12T}/f_{12W})/\sqrt{f_T/f_W} < 2.0 \tag{9}$$

where $e_{1W}$, $e_{2W}$, $e_{1T}$ and $e_{2T}$ are respectively the principal point intervals between the first lens unit and the second lens unit and between the second lens unit and the third lens unit in the wide-angle end and the telephoto end, $f_{12W}$ and $f_{12T}$ are respectively the overall focal lengths of the first lens unit and the second lens unit in the wide-angle end and the telephoto end, $f_1$ and $f_3$ are respectively the focal lengths of the first lens unit and the third lens unit, and $f_W$ and $f_T$ are respectively the focal lengths of the entire lens system in the wide-angle end and the telephoto end. It should be noted that the upper limit of the inequalities of condition (9) may be expanded up to "3.0".

FIGS. 1 to 8 are longitudinal section views of numerical examples 1 to 8 of an embodiment of the zoom lens according to the invention. In these figures, I denotes the first lens unit of negative refractive power, II the second lens unit of positive refractive power and III the third lens unit of negative refractive power. The arrows show the loci of motion of the lens units during zooming from the wide-angle end to the telephoto end. The term "lens unit" used herein should be taken as including one lens element.

In the zoom lenses of the numerical examples 1 to 8 of this embodiment, both the second lens unit II and the third lens unit III are made to move toward the object side. Further, these zoom lenses are made up by satisfying the above-stated conditions (1) to (6). The technical significance of each of these conditions (1) to (6) is explained below.

The inequalities of condition (1) are concerned with the focal length of the first lens unit for the intermediate region of the range of variation of the focal length (zooming range) of the entire lens system. When the lower limit is exceeded, as this means that the negative refractive power of the first lens unit is too strong, the telephoto ratio on the telephoto side becomes too large, so the total length for the telephoto end of the entire system comes to increase greatly. When the negative refractive power of the first lens unit is weak beyond the upper limit, the range of variation of the separation between the first lens unit and the second lens unit has to increase in order to obtain a predetermined zoom ratio, causing the total length of the entire system to become large.

The inequalities of condition (2) are concerned with the refractive power of the second lens unit. When the lower limit is exceeded, as this means that the refractive power is too strong, the aberrations vary to a large extent with zooming. Particularly on the telephoto side, the spherical aberration becomes difficult to correct well. When the refractive power of the second lens unit is weak beyond the upper limit, the entire lens system becomes long in the total length both at the wide-angle and telephoto ends.

The inequalities of condition (3) are concerned with the refractive power of the third lens unit. When the refractive power is strong beyond the lower limit, the movement of the third lens unit gives a larger contribution to the zooming effect. In other words, the characteristic feature of the plus-minus form of the 2-unit type emerges, so the back focal distance becomes short and the outer diameter of the third lens unit increases. When the upper limit is exceeded, the converse feature or the minus-plus form of the 2-unit type emerges, so the back focal distance becomes long. Thus, the entire lens tends to be large in the total length.

The inequalities of condition (4) are concerned with the axial air separation between the first lens unit and the second lens unit in the wide-angle end. When the lower limit is exceeded, as this means that the separation between the first lens unit and the second lens unit is too short, the zooming effect of the second lens unit becomes so small as to intensify the tendency to the plus-minus form of the 2-unit type. Thus, the back focal distance becomes short and the outer diameter of the third lens unit increases. When the upper limit is exceeded, the outer diameter of the first lens unit becomes large in a case where a stop is disposed within the second lens unit.

The inequalities of condition (5) are concerned with the axial air separation between the second lens unit and the third lens unit in the wide-angle end. When the air separation between the second lens unit and the third lens unit is small beyond the lower limit, the result approaches the minus-plus form of the 2-unit zoom type, so the back focal distance becomes long. Thus, the entire lens systems tends to become long in the total length. When the separation between the second lens unit and the third lens unit is long beyond the upper limit, the back focal distance becomes short and the outer diameter of the third lens unit increases largely.

The inequalities of condition (6) are concerned with the ratio of the overall focal length of the first lens unit and second lens unit in the wide-angle end to the shortest focal length of the entire system. When the lower limit is exceeded, the back focal distance becomes short and the outer diameter of the third lens unit increases greatly. When the upper limit is exceeded, the total length tends to become long.

Besides these, in the invention it is recommended to set forth the form and the construction and arrangement of the lens elements as follows: The first lens unit comprises, from front to rear, at least one negative lens having a concave surface facing the image side and at least one positive lens having a convex surface facing the object side. The second lens unit includes at least two lens surfaces having convex surfaces facing the object side and at least one lens surface having a convex surface facing the image side. Again, the frontmost lens in the second lens unit is a positive lens. The third lens unit includes at least one lens surface having a concave surface facing the object side.

Next, the technical significances of the above-stated conditions (7), (8) and (9) are explained.

The inequalities of condition (7) are concerned with the ratio of the refractive powers of the first lens unit and the third lens unit. When the lower limit is exceeded, as this means that the refractive power of the third lens unit is too strong, the back focal distance becomes short and the outer diameter of the third lens unit increases greatly. When the upper limit is exceeded, the entire lens tends to become long in the total length.

The inequalities of condition (8) are concerned with the ratio of the ranges of variation of the separations between the successive two of the lens units. When the upper limit is exceeded, the range of variation of the separation between the second lens unit and the third lens unit becomes small, while the range of variation of the separation between the first lens unit and the second lens unit becomes large. Therefore, the entire lens tends to become long in the total length. As is more desirable, the upper limit is altered to "6.0". When the lower limit is exceeded, although this is advantageous for minimizing the size, the total zooming movement of the third lens unit becomes long and the variation of the aberrations with zooming becomes difficult to correct.

The inequalities of condition (9) are concerned with the ratio of the variation of the overall focal length of the first lens unit and the second lens unit to the variation of the focal length of the entire lens system. When the lower limit is exceeded, the zooming effect of the second lens unit becomes weak. Conversely, the refractive power of the third lens unit becomes strong for zooming purpose and the total zooming movement becomes long, causing it difficult to correct the variation of the aberrations with zooming. When the upper limit is exceeded, the zooming effect of the second lens unit becomes strong and the total length of the entire lens becomes long.

It is to be noted in the invention that the focusing provision may be made in the first lens unit as has commonly been used in the prior art, but any of the rear focus methods such as that known in Japanese Laid-Open Patent Application No. Sho 64-74521 can be used as well.

Next, numerical examples 1 to 8 of the invention are shown. In the numerical data for these examples 1 to 8, Ri is the radius of curvature of the i-th lens surface when counted from the object side; Di is the i-th lens thickness or air separation when counted from the object side; and Ni and vi are respectively the refractive index and Abbe number of the glass of the i-th lens element when counted from the object side.

The values of the factors in the above-stated conditions (1) to (9) for the numerical examples 1 to 8 are listed in Table-1.

| Numerical Example 1 | | |
|---|---|---|
| $f_W = 39.2$ | Fno. = 1:4.13–8.26 | $2\omega = 57.8°$–$23.3°$ |
| R1 = −141.207 | D1 = 1.35 | N1 = 1.78590  v1 = 44.2 |
| R2 = 21.077 | D2 = 2.53 | |
| R3 = 24.944 | D3 = 3.20 | N2 = 1.80518  v2 = 25.4 |
| R4 = 76.172 | D4 = Variable | |
| R5 = 44.548 | D5 = 2.70 | N3 = 1.48749  v3 = 70.2 |
| R6 = −44.548 | D6 = 0.15 | |
| R7 = 16.700 | D7 = 4.80 | N4 = 1.48749  v4 = 70.2 |
| R8 = 76.076 | D8 = 0.77 | |
| R9 = −59.744 | D9 = 5.86 | N5 = 1.84666  v5 = 23.9 |
| R10 = 19.546 | D10 = 0.44 | |
| R11 = 31.964 | D11 = 3.46 | N6 = 1.69895  v6 = 30.1 |

-continued

| | | | |
|---|---|---|---|
| R12 = −31.964 | D12 = Variable | | |
| R13 = −32.895 | D13 = 2.50 | N7 = 1.74077 | ν7 = 27.8 |
| R14 = −21.063 | D14 = 5.91 | | |
| R15 = −16.850 | D15 = 1.20 | N8 = 1.71300 | ν8 = 53.8 |
| R16 = −17.379 | | | |

| Variable | Focal Length | | |
|---|---|---|---|
| Separation | 39.16 | 50.00 | 104.74 |
| D4 | 21.83 | 14.53 | 0.80 |
| D12 | 12.46 | 11.08 | 6.64 |

Numerical Example 2

$f_W = 39.1$  Fno. = 1:4.14–8.26  $2\omega = 57.9°–23.3°$

| | | | |
|---|---|---|---|
| R1 = −139.371 | D1 = 1.35 | N1 = 1.79952 | ν1 = 4.22 |
| R2 = 21.524 | D2 = 2.47 | | |
| R3 = 25.407 | D3 = 3.20 | N2 = 1.80518 | ν2 = 25.4 |
| R4 = 81.567 | D4 = Variable | | |
| R5 = 46.286 | D5 = 2.70 | N3 = 1.48749 | ν3 = 70.2 |
| R6 = −46.286 | D6 = 0.15 | | |
| R7 = 16.812 | D7 = 4.75 | N4 = 1.51633 | ν4 = 64.2 |
| R8 = 72.069 | D8 = 0.76 | | |
| R9 = −64.911 | D9 = 5.90 | N5 = 1.84666 | ν5 = 23.9 |
| R10 = 19.241 | D10 = 0.48 | | |
| R11 = 32.267 | D11 = 3.54 | N6 = 1.69895 | ν6 = 30.1 |
| R12 = −32.267 | D12 = Variable | | |
| R13 = −33.112 | D13 = 2.50 | N7 = 1.69895 | ν7 = 30.1 |
| R14 = −20.889 | D14 = 5.95 | | |
| R15 = −16.995 | D15 = 1.20 | N8 = 1.71300 | ν8 = 53.8 |
| R16 = −72.147 | | | |

| Variable | Focal Length | | |
|---|---|---|---|
| Separation | 39.15 | 50.00 | 104.75 |
| D4 | 21.80 | 14.51 | 0.80 |
| D12 | 12.16 | 10.77 | 6.35 |

Numerical Example 3

$f_W = 39.1$  Fno. = 1:4.1–8.26  $2\omega = 57.9°–23.3°$

| | | | |
|---|---|---|---|
| R1 = −159.966 | D1 = 1.30 | N1 = 1.78590 | ν1 = 44.2 |
| R2 = 20.336 | D2 = 2.35 | | |
| R3 = 23.700 | D3 = 3.20 | N2 = 1.80518 | ν2 = 25.4 |
| R4 = 64.799 | D4 = Variable | | |
| R5 = 24.353 | D5 = 3.40 | N3 = 1.48749 | ν3 = 70.2 |
| R6 = −57.202 | D6 = 0.15 | | |
| R7 = 17.397 | D7 = 2.50 | N4 = 1.51633 | ν4 = 64.2 |
| R8 = 72.203 | D8 = 0.70 | | |
| R9 = −77.604 | D9 = 5.87 | N5 = 1.84666 | ν5 = 23.9 |
| R10 = 17.779 | D10 = 0.68 | | |
| R11 = 38.717 | D11 = 5.11 | N6 = 1.76182 | ν6 = 26.5 |
| R12 = −38.717 | D12 = Variable | | |
| R13 = −37.892 | D13 = 2.50 | N7 = 1.62004 | ν7 = 36.3 |
| R14 = −23.128 | D14 = 7.13 | | |
| R15 = −18.594 | D15 = 1.25 | N8 = 1.71300 | ν8 = 53.8 |
| R16 = −83.629 | | | |

| Variable | Focal Length | | |
|---|---|---|---|
| Separation | 39.15 | 50.01 | 104.75 |
| D4 | 20.09 | 13.07 | 0.80 |
| D12 | 11.21 | 10.43 | 5.85 |

Numerical Example 4

$f_W = 39.1$  Fno. = 1:4.14–8.26  $2\omega = 57.9°–23.4°$

| | | | |
|---|---|---|---|
| R1 = −137.670 | D1 = 1.35 | N1 = 1.79952 | ν1 = 42.2 |
| R2 = 22.270 | D2 = 2.78 | | |
| R3 = 26.333 | D3 = 3.20 | N2 = 1.80518 | ν2 = 25.4 |
| R4 = 79.737 | D4 = Variable | | |
| R5 = 30.649 | D5 = 2.80 | N3 = 1.51633 | ν3 = 64.2 |
| R6 = −62.659 | D6 = 0.15 | | |
| R7 = 19.637 | D7 = 3.80 | N4 = 1.51633 | ν4 = 64.2 |

-continued

| | | | |
|---|---|---|---|
| R8 = 151.584 | D8 = 0.65 | | |
| R9 = −59.244 | D9 = 6.50 | N5 = 1.80518 | ν5 = 25.4 |
| R10 = 20.064 | D10 = 0.53 | | |
| R11 = 36.108 | D11 = 3.69 | N6 = 1.68893 | ν6 = 31.1 |
| R12 = −36.108 | D12 = Variable | | |
| R13 = −59.123 | D13 = 2.50 | N7 = 1.51633 | ν7 = 64.2 |
| R14 = −21.628 | D14 = 5.29 | | |
| R15 = −16.174 | D15 = 1.10 | N8 = 1.71300 | ν8 = 53.8 |
| R16 = 59.696 | D16 = 2.70 | N9 = 1.66680 | ν9 = 33.0 |
| R17 = −87.613 | | | |

| Variable | Focal Length | | |
|---|---|---|---|
| Separation | 39.13 | 50.00 | 104.75 |
| D4 | 22.49 | 14.28 | 0.80 |
| D12 | 10.27 | 10.18 | 6.52 |

Numerical Example 5

$f_W = 39.1$  Fno. = 1:4.1–8.26  $2\omega = 57.9°–23.4°$

| | | | |
|---|---|---|---|
| R1 = −97.492 | D1 = 1.40 | N1 = 1.77250 | ν1 = 49.6 |
| R2 = 21.817 | D2 = 2.46 | | |
| R3 = 25.643 | D3 = 3.50 | N2 = 1.69895 | ν2 = 30.1 |
| R4 = 129.338 | D4 = Variable | | |
| R5 = 44.270 | D5 = 2.80 | N3 = 1.51633 | ν3 = 64.2 |
| R6 = −44.270 | D6 = 0.15 | | |
| R7 = 16.584 | D7 = 3.86 | N4 = 1.51823 | ν4 = 59.0 |
| R8 = 107.728 | D8 = 0.58 | | |
| R9 = −75.058 | D9 = 7.02 | N5 = 1.84666 | ν5 = 23.9 |
| R10 = 18.796 | D10 = 0.56 | | |
| R11 = 37.364 | D11 = 3.00 | N6 = 1.69895 | ν6 = 30.1 |
| R12 = −37.364 | D12 = Variable | | |
| R13 = −40.954 | D13 = 2.50 | N7 = 1.66680 | ν7 = 33.0 |
| R14 = −19.368 | D14 = 4.52 | | |
| R15 = −15.498 | D15 = 1.40 | N8 = 1.69680 | ν8 = 55.5 |
| R16 = −116.729 | | | |

| Variable | Focal Length | | |
|---|---|---|---|
| Separation | 39.14 | 56.67 | 104.54 |
| D4 | 22.02 | 11.18 | 0.85 |
| D12 | 9.29 | 8.13 | 4.77 |

Numerical Example 6

$f_W = 39.0$  Fno. = 1:4.1–8.27  $2\omega = 58°–23.3°$

| | | | |
|---|---|---|---|
| R1 = −103.674 | D1 = 1.40 | N1 = 1.74320 | ν1 = 49.3 |
| R2 = 20.567 | D2 = 2.61 | | |
| R3 = 24.451 | D3 = 3.60 | N2 = 1.69895 | ν2 = 30.1 |
| R4 = 103.654 | D4 = Variable | | |
| R5 = 42.474 | D5 = 3.00 | N3 = 1.51633 | ν3 = 64.2 |
| R6 = −42.474 | D6 = 0.30 | | |
| R7 = 17.057 | D7 = 3.85 | N4 = 1.51633 | ν4 = 64.2 |
| R8 = 58.696 | D8 = 0.85 | | |
| R9 = −62.761 | D9 = 6.80 | N5 = 1.84666 | ν5 = 23.9 |
| R10 = 19.768 | D10 = 0.46 | | |
| R11 = 33.572 | D11 = 3.00 | N6 = 1.69895 | ν6 = 30.1 |
| R12 = −33.572 | D12 = Variable | | |
| R13 = −57.073 | D13 = 2.50 | N7 = 1.60342 | ν7 = 38.0 |
| R14 = −20.411 | D14 = 4.28 | | |
| R15 = −16.114 | D15 = 1.10 | N8 = 1.60311 | ν8 = 60.7 |
| R16 = 376.813 | | | |

| Variable | Focal Length | | |
|---|---|---|---|
| Separation | 39.00 | 56.32 | 104.82 |
| D4 | 22.09 | 11.69 | 0.84 |
| D12 | 10.06 | 8.00 | 4.47 |

Numerical Example 7

$f_W = 36.0$  Fno. = 1:3.95–8.26  $2\omega = 62°–24°$

| | | | |
|---|---|---|---|
| R1 = −118.409 | D1 = 1.30 | N1 = 1.80610 | ν1 = 41.0 |
| R2 = 22.211 | D2 = 2.19 | | |

-continued

| | | | |
|---|---|---|---|
| R3 = 24.158 | D3 = 4.00 | N2 = 1.74077 | ν2 = 27.8 |
| R4 = 87.982 | D4 = Variable | | |
| R5 = 34.227 | D5 = 3.00 | N3 = 1.51633 | ν3 = 64.2 |
| R6 = −59.768 | D6 = 1.70 | | |
| R7 = 17.949 | D7 = 4.00 | N4 = 1.51742 | ν4 = 52.4 |
| R8 = −501.981 | D8 = 1.41 | | |
| R9 = −43.400 | D9 = 5.00 | N5 = 1.84666 | ν5 = 23.9 |
| R10 = 28.338 | D10 = 0.62 | | |
| R11 = 173.359 | D11 = 3.00 | N6 = 1.69895 | ν6 = 30.1 |
| R12 = −32.551 | D12 = Variable | | |
| R13 = 771.944 | D13 = 3.50 | N7 = 1.68893 | ν7 = 31.1 |
| R14 = −35.790 | D14 = 4.39 | | |
| R15 = −15.346 | D15 = 1.40 | N8 = 1.71300 | ν8 = 53.8 |
| R16 = −138.628 | | | |

| Variable Separation | Focal Length | | |
|---|---|---|---|
| | 36.04 | 54.55 | 101.81 |
| D6 | 23.20 | 12.20 | 1.20 |
| D14 | 13.23 | 9.92 | 6.92 |

Numerical Example 8 f = 39.1–104.7    Fno. = 1:4.1–8.26    2ω = 57.9°–23.3°

| | | | |
|---|---|---|---|
| R1 = −171.489 | D1 = 1.30 | N1 = 1.78590 | ν1 = 44.2 |
| R2 = 20.726 | D2 = 2.71 | | |
| R3 = 24.590 | D3 = 3.20 | N2 = 1.80518 | ν2 = 25.4 |
| R4 = 68.864 | D4 = Variable | | |
| R5 = 46.910 | D5 = 2.70 | N3 = 1.48749 | ν3 = 70.2 |
| R6 = −47.708 | D6 = 0.15 | | |
| R7 = 16.847 | D7 = 5.27 | N4 = 1.51633 | ν4 = 64.2 |
| R8 = 74.377 | D8 = 0.78 | | |
| R9 = −62.237 | D9 = 5.19 | N5 = 1.84666 | ν5 = 23.9 |
| R10 = 19.121 | D10 = 0.46 | | |
| R11 = 31.255 | D11 = 3.20 | N6 = 1.68893 | ν6 = 31.1 |
| R12 = −31.255 | D12 = Variable | | |
| R13 = −34.517 | D13 = 2.50 | N7 = 1.74077 | ν7 = 27.8 |
| R14 = −21.169 | D14 = 5.31 | | |
| R15 = −16.837 | D15 = 1.25 | N8 = 1.71300 | ν8 = 53.8 |
| R16 = −73.193 | | | |

| Variable Separation | Focal Length | | |
|---|---|---|---|
| | 39.14 | 49.97 | 104.74 |
| D4 | 21.04 | 13.81 | 0.79 |
| D12 | 13.83 | 12.54 | 7.13 |

TABLE 1

| Conditions | Numerical Examples | | | | | | | |
|---|---|---|---|---|---|---|---|---|
| | 1 | 2 | 3 | 4 | 5 | 6 | 7 | 8 |
| (1) $\dfrac{\|f_1\|}{\sqrt{f_W \cdot f_T}}$ | 0.823 | 0.824 | 0.781 | 0.820 | 0.808 | 0.813 | 0.869 | 0.813 |
| (2) $\dfrac{f_2}{\sqrt{f_W \cdot f_T}}$ | 0.470 | 0.468 | 0.458 | 0.460 | 0.455 | 0.465 | 0.498 | 0.469 |
| (3) $\dfrac{\|f_3\|}{\sqrt{f_W \cdot f_T}}$ | 0.931 | 0.922 | 0.922 | 0.830 | 0.894 | 0.922 | 0.949 | 0.959 |
| (4) $\dfrac{l_{1W}}{f_W}$ | 0.557 | 0.557 | 0.513 | 0.575 | 0.563 | 0.566 | 0.644 | 0.537 |
| (5) $\dfrac{l_{2W}}{f_W}$ | 0.318 | 0.311 | 0.286 | 0.262 | 0.237 | 0.258 | 0.367 | 0.353 |
| (6) $\dfrac{f_{12W}}{f_W}$ | 0.770 | 0.768 | 0.779 | 0.734 | 0.736 | 0.748 | 0.840 | 0.781 |
| (7) $\|f_3\|/\|f_1\|$ | 1.13 | 1.12 | 1.18 | 1.01 | 1.11 | 1.13 | 1.09 | 1.18 |
| (8) $\dfrac{e_{1W} - e_{1T}}{e_{2W} - e_{2T}}$ | 3.61 | 3.61 | 3.60 | 5.78 | 4.69 | 3.80 | 3.48 | 3.02 |
| (9) $\dfrac{f_{12T}}{f_{12W}} / \sqrt{\dfrac{f_T}{f_W}}$ | 1.02 | 1.02 | 1.02 | 1.02 | 1.03 | 1.02 | 1.02 | 1.01 |

Another embodiment is next described wherein the image angle is widened.

A wide-angle zoom lens comprises, from front to rear, a first lens unit of negative refractive power, a second lens unit of positive refractive power and a third lens unit of negative refractive power, the separations between these lens units being all varied to effect zooming, wherein, letting the focal length of the first lens unit be denoted by $f_1$, the shortest and longest focal lengths of the entire system by $f_W$ and $f_T$ respectively, and the diagonal length of the effective area of the image frame by Y, the following conditions are satisfied:

$$0.8 < |f_1|/\sqrt{f_W \cdot f_T} < 1.3 \tag{10}$$

$$0.4 < \sqrt{f_W \cdot f_T}/Y < 0.8 \tag{11}$$

FIGS. 17(A), 17(B) and 17(C) to FIGS. 22(A), 22(B) and 22(C) are longitudinal section views of numerical examples 9 to 14 of zoom lenses to be described later. FIGS. 23(A)(1)–23(A)(4), 23(B)(1)–23(B)(4) and 23(C)(1)–23(C)(4) are aberration curves of the numerical example 9 in the wide-angle end, at a medium angle and in the telephoto end. FIGS. 24(A)(1)–24(A)(4), 24(B)(1)–24(B)(4) and 24(C)(1)–24(C)(4) are aberration curves of the numerical example 10 in the wide-angle end, at a medium angle and in the telephoto end. FIGS. 25(A)(1)–25(A)(4), 25(B)(1)–25(B)(4) and 25(C)(1)–25(C)(4) are aberration curves of the numerical example 11 in the wide-angle end, at a medium angle and in the telephoto end. FIGS. 26(A)(1)–26(A)(4), 26(B)(1)–26(B)(4) and 26(C)(1)–26(C)(4) are aberration curves of the numerical example 12 in the wide-angle end, at a medium angle and in the telephoto end. FIGS. 27(A)(1)–27(A)(4), 27(B)(1)–27(B)(4) and 27(C)(1)–27(C)(4) are aberration curves of the numerical example 13 in the wide-angle end, at a medium angle and in the telephoto end. FIGS. 28(A), 28(B) and 28(C) are aberration curves of the numerical example 14 in the wide-angle end, at a medium angle and in the telephoto end.

Of the lens block diagrams of FIGS. 17(A), 17(B) and 17(C) to FIGS. 22(A), 22(B) and 22(C), the ones of FIGS. 17(A), 18(A), 19(A), 20(A), 21(A) and 22(A) are in the wide-angle end, the ones of FIGS. 17(B), 18(B), 19(B), 20(B), 21(B) and 22(B) are at the medium angle, and the ones of FIGS. 17(C), 18(C), 19(C), 20(C), 21(C) and 22(C) are in the telephoto end. In these figures, L1 denotes the first lens unit of negative refractive power; L2 the second lens unit of positive refractive power; and L3 the third lens unit of negative refractive power. SP stands for the aperture stop, and FP for the image plane.

In this embodiment, zooming from the wide-angle end to the telephoto end is performed in such a manner that, the first lens unit moves axially while depicting a locus convex toward the image side and both the second lens unit and the third lens unit move axially forward, as indicated by the arrows, while depicting linear or non-linear loci, so that the air separation between the first lens unit and the second lens unit decreases and the air separation between the second lens unit and the third lens unit decreases.

Within this framework, the above-stated conditions (10) and (11) are considered when designing each lens unit. Thus, the requirements of shortening the total length of the entire lens with the zoom ratio kept at a predetermined value and of increasing the maximum image angle to 90° or thereabout are simultaneously fulfilled.

Incidentally, focusing is performed by moving the first lens unit.

The technical significance of each of the above-stated conditions (10) and (11) is explained below.

The inequalities of condition (10) are concerned with the ratio of the focal length of the first lens unit to the focal length of the entire system at a medium angle in the range of variation of the focal length (or at the medium zooming position), and have an aim chiefly to maintain good optical performance over the entire zooming range, while still permitting the shortening of the total length of the entire lens to be achieved.

When the lower limit of the condition (10) is exceeded, as this means that the negative refractive power of the first lens unit is too strong, the telephoto ratio for the telephoto side becomes large, causing the total length of the entire lens to increase on the telephoto side and also causing the variation with zooming of the aberrations to increase greatly.

When the negative refractive power of the first lens unit is weak beyond the upper limit, the aberrations are easy to correct, but the required amount of movement for the predetermined zoom ratio of the first lens unit becomes large, causing the total length of the entire lens to increase objectionably.

The inequalities of condition (11) are concerned with the ratio of the focal length of the entire system at the medium angle in the range of variation of the focal length (at the medium zooming position) to the image size, or the angle of field of view, and have an aim chiefly to increase the maximum image angle with the zoom ratio kept at the predetermined value.

When the lower limit of the condition (11) is exceeded, as this means that the focal length for the telephoto side is too short, the predetermined zoom ratio becomes difficult to realize. When the focal length for the telephoto side is too long, as exceeding the upper limit, the separation for the wide-angle end between the first lens unit and the second lens unit becomes wide. To increase the maximum image angle, therefore, the diameter of the front lens element increases objectionably.

In this embodiment, to increase the maximum image angle to 90° or more and obtain good optical performance throughout the entire zooming range, it is preferred to satisfy the following conditions:

$$0.4 < |f_1|/Y < 0.7 \tag{12}$$

$$0.2 < |f_2/f_3| < 0.8 \tag{13}$$

where $f_2$ and $f_3$ are the focal lengths of the second lens unit and the third lens unit, respectively.

The inequalities of condition (12) are concerned with the ratio of the focal length of the first lens unit to the image size, and have an aim chiefly to shorten the total length of the entire lens with the maintenance of the predetermined zoom ratio.

When the negative refractive power of the first lens unit is too strong as exceeding the lower limit of the condition (12), the total length for the telephoto side of the entire lens becomes long. When the negative refractive power of the first lens unit is too weak as exceeding the upper limit, the maximum image angle becomes difficult to increase under the condition that the predetermined zoom ratio is secured.

The inequalities of condition (13) are concerned with the ratio of the focal lengths of the second lens unit and the third lens unit, and have an aim chiefly to secure the predetermined back focal distance and zoom ratio.

When the negative refractive power of the third lens unit is too weak as exceeding the lower limit of the condition (13), the telephoto type comes to collapse, making it difficult to shorten the total length of the entire lens with the zoom ratio secured at the predetermined value. When the negative refractive power of the third lens unit is too strong as exceeding the upper limit, the back focal distance for the wide-angle end becomes short and the diameter of the rear lens element increases objectionably.

It is to be noted in the present embodiment that the optical performance is maintained in good balance over the entire area of the image frame when the stop is positioned within the second lens unit, and asphere is applied to at least one lens surface on the object side of the stop.

Also, in the present embodiment, zooming may be otherwise performed by moving the second lens unit and the third lens unit non-linearly, while the first lens unit remains stationary. Focusing may be otherwise performed by moving either the second lens unit or the third lens unit.

In the zoom lens in the present embodiment, the first lens unit for the numerical examples 9, 11, 12 and 14 is constructed from three lenses, i.e., a meniscus-shaped negative lens having a convex surface facing the object side, a negative lens and a meniscus-shaped positive lens having a convex surface facing the object side. For the numerical examples 10 and 13, the first lens unit is constructed from two lenses, i.e., a meniscus-shaped negative lens having a convex surface facing the object side and a meniscus-shaped positive lens having a convex surface facing the object side.

Again, in the numerical example 10, the rear surface of the positive lens in the first lens unit is made aspherical.

The second lens unit for the numerical examples 9, 10, 11, 13 and 14 is constructed from six lenses, i.e., a positive lens whose surfaces both are convex and having a strong refracting surface facing the image side, a cemented lens composed of a positive lens and a negative lens, a cemented lens composed of a positive lens and a negative lens, and a positive lens.

For the numerical example 12, the second lens unit is constructed from five lenses, i.e., a positive lens, a cemented lens composed of a positive lens and a negative lens, a negative lens and a positive lens.

The third lens unit for the numerical examples 9 to 14 is constructed from two lenses, i.e., a positive lens and a negative lens having a strong negative refracting surface facing the object side.

Next, the numerical data for the examples 9 to 14 are shown, where Ri is the radius of curvature of the i-th lens surface when counted from the object side; Di is the i-th lens thickness or air separation when counted from the object side; and Ni and νi are respectively the refractive index and Abbe number of the glass of the i-th lens element when counted from the object side.

The values of the factors in the above-stated conditions (10) to (13) for the numerical examples 9 to 14 are listed in Table-2.

The aspherical shape is expressed in the ordinates with an X axis in the axial direction and an H axis in the direction perpendicular to the optical axis, the direction in which light advances being taken as positive, by the following equation:

$$X = \frac{(1/R)H^2}{1+\sqrt{1-(H/R)^2}} + AH^2 + BH^4 + CH^6 + DH^8 + EH^{10}$$

where R is the radius of the osculating sphere, and A, B, C, D and E are the aspheric coefficients.

Numerical Example 9 f = 21.3–29.5   Fno. = 1:3.6–4.6   2ω = 91.2°–72.4°

| | | | |
|---|---|---|---|
| R1 = 69.48 | D1 = 1.30 | N1 = 1.83400 | ν1 = 37.2 |
| R2 = 14.49 | D2 = 4.45 | | |
| R3 = −1660.67 | D3 = 1.20 | N2 = 1.58313 | ν2 = 59.4 |
| R4 = 33.96 | D4 = 1.72 | | |
| R5 = 19.42 | D5 = 2.50 | N3 = 1.80518 | ν3 = 25.4 |
| R6 = 42.54 | D6 = Variable | | |
| R7 = 56.58 | D7 = 2.20 | N4 = 1.60738 | ν4 = 56.8 |
| R8 = −33.38 | D8 = 1.24 | | |
| R9 = (Stop) | D9 = 0.46 | | |
| R10 = 17.88 | D10 = 4.60 | N5 = 1.63930 | ν5 = 44.9 |
| R11 = −13.01 | D11 = 2.10 | N6 = 1.80610 | ν6 = 41.0 |
| R12 = 53.04 | D12 = 0.25 | | |
| R13 = 26.08 | D13 = 3.30 | N7 = 1.69680 | ν7 = 55.5 |
| R14 = −22.28 | D14 = 1.00 | N8 = 1.80518 | ν8 = 25.4 |
| R15 = 16.65 | D15 = 1.15 | | |
| R16 = 215.06 | D16 = 2.10 | N9 = 1.66680 | ν9 = 33.0 |
| R17 = −16.91 | D17 = Variable | | |
| R18 = −41.97 | D18 = 2.20 | N10 = 1.69895 | ν10 = 30.1 |
| R19 = −24.59 | D19 = 3.59 | | |
| R20 = −13.08 | D20 = 1.00 | N11 = 1.71300 | ν11 = 53.8 |
| R21 = −35.54 | | | |

| Variable | Focal Length | | |
|---|---|---|---|
| Separation | 21.30 | 25.55 | 29.50 |
| D6 | 7.56 | 4.54 | 2.63 |
| D17 | 11.31 | 10.01 | 8.71 |

| R4: Aspheric | A = 0 | D = 2.49 × 10⁻⁹ |
|---|---|---|
| | B = −2.38 × 10⁻⁶ | E = −9.68 × 10⁻¹² |
| | C = −1.83 × 10⁻⁷ | |

Numerical Example 10 f = 21.4–29.6   Fno. = 1:3.6–4.6   2ω = 91.2°–72.4°

| | | | |
|---|---|---|---|
| R1 = 136.29 | D1 = 1.64 | N1 = 1.80400 | ν1 = 46.6 |
| R2 = 12.62 | D2 = 5.95 | | |
| R3 = 18.86 | D3 = 3.28 | N2 = 1.78472 | ν2 = 25.7 |
| R4 = 29.62 | D4 = Variable | | |
| R5 = 88.19 | D5 = 2.90 | N3 = 1.58313 | ν3 = 59.4 |
| R6 = −24.77 | D6 = 0.25 | | |
| R7 = 18.49 | D7 = 5.04 | N4 = 1.63930 | ν4 = 44.9 |
| R8 = −13.46 | D8 = 1.89 | N5 = 1.80610 | ν5 = 41.0 |
| R9 = 36.27 | D9 = 1.39 | | |
| R10 = 20.69 (Stop) | D10 = 1.13 | | |
| R11 = 20.80 | D11 = 3.32 | N6 = 1.62299 | ν6 = 58.2 |
| R12 = −19.82 | D12 = 1.26 | N7 = 1.80518 | ν7 = 25.4 |
| R13 = 19.92 | D13 = 1.01 | | |
| R14 = 111.24 | D14 = 2.90 | N8 = 1.64769 | ν8 = 33.8 |
| R15 = −17.72 | D15 = Variable | | |
| R16 = 130.36 | D16 = 3.15 | N9 = 1.80518 | ν9 = 25.4 |
| R17 = −55.73 | D17 = 4.05 | | |
| R18 = −13.96 | D18 = 1.51 | N10 = 1.77250 | ν10 = 49.6 |
| R19 = −81.13 | | | |

| Variable | Focal Length | | |
|---|---|---|---|
| Separation | 21.17 | 25.44 | 29.58 |
| D4 | 8.09 | 4.80 | 2.57 |
| D15 | 6.12 | 5.38 | 4.63 |

| R4: Aspheric | A = 0 | D = −2.33 × 10⁻¹⁰ |
|---|---|---|
| | B = −9.67 × 10⁻⁶ | E = 2.92 × 10⁻¹⁴ |
| | C = −6.17 × 10⁻⁸ | |

Numerical Example 11 f = 21.4–29.5   Fno. = 1:3.6–4.6   2ω = 90.6°–72.4°

| | | | |
|---|---|---|---|
| R1 = 359.46 | D1 = 1.39 | N1 = 1.83400 | ν1 = 37.2 |
| R2 = 14.53 | D2 = 3.25 | | |
| R3 = 48.81 | D3 = 1.26 | N2 = 1.69680 | ν2 = 55.5 |
| R4 = 20.87 | D4 = 1.89 | | |
| R5 = 19.17 | D5 = 3.78 | N3 = 1.80518 | ν3 = 25.4 |
| R6 = 63.71 | D6 = Variable | | |
| R7 = 50.13 | D7 = 3.40 | N4 = 1.51633 | ν4 = 64.2 |
| R8 = −24.69 | D8 = 0.25 | | |
| R9 = 15.73 | D9 = 4.16 | N5 = 1.58313 | ν5 = 59.4 |
| R10 = −18.99 | D10 = 1.13 | N6 = 1.80610 | ν6 = 41.0 |
| R11 = 70.65 | D11 = 1.89 | | |
| R12 = (Stop) | D12 = 1.26 | | |
| R13 = 29.68 | D13 = 2.27 | N7 = 1.51633 | ν7 = 64.2 |
| R14 = −27.29 | D14 = 1.26 | N8 = 1.80518 | ν8 = 25.4 |

-continued

| | | | |
|---|---|---|---|
| R15 = 22.30 | D15 = 1.01 | | |
| R16 = 75.19 | D16 = 3.15 | N9 = 1.66680 | v9 = 33.0 |
| R17 = −18.70 | D17 = Variable | | |
| R18 = 262.09 | D18 = 2.52 | N10 = 1.64769 | v10 = 33.8 |
| R19 = −39.83 | D19 = 3.87 | | |
| R20 = −10.44 | D20 = 1.51 | N11 = 1.71300 | v11 = 53.8 |
| R21 = −59.56 | | | |

| Variable | Focal Length | | |
|---|---|---|---|
| Separation | 21.42 | 25.50 | 29.48 |
| D6 | 7.07 | 4.21 | 2.21 |
| D17 | 3.40 | 3.08 | 2.75 |

| R9: Aspheric | A = 0 | D = 9.07 × 10⁻¹⁰ |
|---|---|---|
| | B = −3.64 × 10⁻⁶ | E = 0 |
| | C = −3.08 × 10⁻⁷ | |

Numerical Example 12 f = 21.4–29.5   Fno. = 1:3.6–4.6   $2\omega = 90.6°$–$72.4°$

| | | | |
|---|---|---|---|
| R1 = 462.84 | D1 = 1.39 | N1 = 1.83400 | v1 = 37.2 |
| R2 = 16.56 | D2 = 3.36 | | |
| R3 = 46.27 | D3 = 1.26 | N2 = 1.69680 | v2 = 55.5 |
| R4 = 20.33 | D4 = 1.88 | | |
| R5 = 20.44 | D5 = 4.03 | N3 = 1.80518 | v3 = 25.4 |
| R6 = 76.19 | D6 = Variable | | |
| R7 = −2143.42 | D7 = 3.78 | N4 = 1.51633 | v4 = 64.2 |
| R8 = −27.09 | D8 = 0.25 | | |
| R9 = 18.30 | D9 = 5.29 | N5 = 1.58313 | v5 = 59.4 |
| R10 = −22.63 | D10 = 1.13 | N6 = 1.80518 | v6 = 25.4 |
| R11 = −91.98 | D11 = 2.02 | | |
| R12 = (Stop) | D12 = 2.90 | | |
| R13 = 88.01 | D13 = 1.26 | N7 = 1.80518 | v7 = 25.4 |
| R14 = 19.53 | D14 = 1.01 | | |
| R15 = 84.29 | D15 = 2.90 | N8 = 1.63930 | v8 = 44.9 |
| R16 = −20.06 | D16 = Variable | | |
| R17 = −47.55 | D17 = 2.52 | N9 = 1.64769 | v9 = 33.8 |
| R18 = −22.68 | D18 = 3.39 | | |
| R19 = −12.03 | D19 = 1.51 | N10 = 1.71300 | v10 = 53.8 |
| R20 = −51.94 | | | |

| Variable | Focal Length | | |
|---|---|---|---|
| Separation | 21.42 | 25.52 | 29.48 |
| D6 | 8.60 | 4.99 | 2.50 |
| D16 | 6.05 | 5.57 | 5.08 |

| R9: Aspheric | A = 0 | D = 7.04 × 10⁻¹⁰ |
|---|---|---|
| | B = −1.82 × 10⁻⁵ | E = 0 |
| | C = −2.14 × 10⁻⁷ | |

Numerical Example 13 f = 21.4–29.5   Fno. = 1:3.6–4.6   $2\omega = 90.6°$–$72.4°$

| | | | |
|---|---|---|---|
| R1 = 181.65 | D1 = 1.64 | N1 = 1.80400 | v1 = 46.6 |
| R2 = 13.07 | D2 = 5.82 | | |
| R3 = 16.81 | D3 = 3.28 | N2 = 1.80518 | v2 = 25.4 |
| R4 = 23.28 | D4 = Variable | | |
| R5 = 63.88 | D5 = 3.15 | N3 = 1.58313 | v3 = 59.4 |
| R6 = −23.56 | D6 = 0.25 | | |
| R7 = 18.49 | D7 = 5.04 | N4 = 1.63930 | v4 = 44.9 |
| R8 = −12.55 | D8 = 1.89 | N5 = 1.80610 | v5 = 41.0 |
| R9 = 28.91 | D9 = 1.39 | | |
| R10 = 20.69 (Stop) | D10 = 1.13 | | |
| R11 = 21.37 | D11 = 3.32 | N6 = 1.69680 | v6 = 55.5 |
| R12 = −26.39 | D12 = 1.26 | N7 = 1.80518 | v7 = 25.4 |
| R13 = 18.26 | D13 = 1.01 | | |
| R14 = 227.69 | D14 = 2.77 | N8 = 1.66680 | v8 = 33.0 |
| R15 = −17.94 | D15 = Variable | | |
| R16 = 126.60 | D16 = 3.15 | N9 = 1.68893 | v9 = 31.1 |
| R17 = −47.91 | D17 = 3.49 | | |
| R18 = −17.61 | D18 = 1.51 | N10 = 1.71300 | v10 = 53.8 |
| R19 = −449.15 | | | |

| Variable | Focal Length | | |
|---|---|---|---|
| Separation | 21.42 | 25.51 | 29.48 |
| D4 | 7.55 | 4.53 | 2.43 |
| D15 | 8.21 | 7.39 | 6.57 |

| R5: Aspheric | A = 0 | D = −9.73 × 10⁻¹⁰ |
|---|---|---|
| | B = −1.1 × 10⁻⁶ | E = 0 |
| | C = 1.24 × 10⁻⁷ | |

Numerical Example 14 f = 24.9–34.0   Fno. = 1:3.6–4.6   $2\omega = 82.0°$–$72.4°$

| | | | |
|---|---|---|---|
| R1 = 71.73 | D1 = 1.24 | N1 = 1.83400 | v1 = 37.2 |
| R2 = 14.23 | D2 = 3.76 | | |
| R3 = −199.96 | D3 = 1.02 | N2 = 1.58313 | v2 = 59.4 |
| R4 = 48.96 | D4 = 1.76 | | |
| R5 = 19.67 | D5 = 2.84 | N3 = 1.80518 | v3 = 25.4 |
| R6 = 40.89 | D6 = Variable | | |
| R7 = 52.66 | D7 = 1.90 | N4 = 1.60738 | v4 = 56.8 |
| R8 = −36.42 | D8 = 1.24 | | |
| R9 = (Stop) | D9 = 0.46 | | |
| R10 = 17.66 | D10 = 4.58 | N5 = 1.63930 | v5 = 44.9 |
| R11 = −12.85 | D11 = 2.10 | N6 = 1.80610 | v6 = 41.0 |
| R12 = 52.95 | D12 = 0.16 | | |
| R13 = 25.98 | D13 = 3.27 | N7 = 1.69680 | v7 = 55.5 |
| R14 = −29.01 | D14 = 0.85 | N8 = 1.80518 | v8 = 25.4 |
| R15 = 16.70 | D15 = 1.15 | | |
| R16 = 407.90 | D16 = 1.90 | N9 = 1.66680 | v9 = 33.0 |
| R17 = −17.39 | D17 = Variable | | |
| R18 = (Flare Stop) | D18 = Variable | | |
| R19 = −33.35 | D19 = 1.91 | N10 = 1.69895 | v10 = 30.1 |
| R20 = −22.48 | D20 = 3.14 | | |
| R21 = −12.96 | D21 = 0.92 | N11 = 1.71300 | v11 = 53.8 |
| R22 = −30.45 | | | |

| Variable | Focal Length | | |
|---|---|---|---|
| Separation | 24.90 | 29.63 | 34.00 |
| D6 | 6.65 | 4.19 | 2.64 |
| D17 | −0.50 | 2.73 | 5.95 |
| D18 | 12.81 | 8.15 | 3.48 |

| R4: Aspheric | A = 0 | D = 2.15 × 10⁻⁹ |
|---|---|---|
| | B = 1.76 × 10⁻⁵ | E = −8.64 × 10⁻¹² |
| | C = −1.57 × 10⁻⁷ | |

Flare Stop: a stop for cutting off a bundle of rays causing flare

TABLE 2

| | Numerical Examples | | | | | |
|---|---|---|---|---|---|---|
| Conditions | 9 | 10 | 11 | 12 | 13 | 14 |
| (10) $|f_1|/\sqrt{f_W \cdot f_T}$ | 1.09 | 1.07 | 1.02 | 1.17 | 1.03 | 0.94 |
| (11) $\sqrt{f_W \cdot f_T}/Y$ | 0.58 | 0.58 | 0.58 | 0.58 | 0.58 | 0.67 |
| (12) $|f_1|/Y$ | 0.63 | 0.62 | 0.59 | 0.68 | 0.60 | 0.63 |
| (13) $|f_2/f_3|$ | 0.41 | 0.42 | 0.62 | 0.56 | 0.33 | 0.39 |

A further embodiment is next described where the zooming range is extended.

(A) A zoom lens is provided, comprising, from front to rear, a first lens unit of negative refractive power, a second lens unit of positive refractive power and a third lens unit of negative refractive power, wherein two lens units of the first, second and third lens units are made to axially move in unison to perform a first zooming operation from a wide-angle end to a medium focal length position and, after that, the two lens units are isolated from each other and at least one lens unit of the two lens units is made to axially move to perform a second zooming operation from the medium focal length position to a telephoto end.

(B) A zoom lens is provided, comprising, from front to rear, a first lens unit of negative refractive power, a second lens unit of positive refractive power and a third lens unit of negative refractive power, wherein as zooming is performed by moving the first, second and third lens units, two lens units of the first, second and third lens units are made to axially move in unison to perform a first zooming operation from a wide-angle end to a medium focal length position and, after that, the two lens units are isolated from each other and made to move in differential relation to perform a second zooming operation from the medium focal length position to a telephoto end.

In particular, the first zooming operation is performed by moving either the first lens unit and the third lens unit in unison, or the first lens unit and the second lens unit in unison, or the second lens unit and the third lens unit in unison, and the first, second and third lens units are moved all forward when the first zooming operation and the second zooming operation are carried out.

For the event of transition from the first zooming operation to the second zooming operation, there are determined the principal point interval e1M between the first lens unit and the second lens unit, the principal point interval e2M between the second lens unit and the third lens unit and the focal length fM of the entire system; and for the telephoto end, there are determined the principal point interval e1T between the first lens unit and the second lens unit, the principal point interval e2T between the second lens unit and the third lens unit and the focal length fT of the entire system. The zoom lens then satisfies at least one of the following condition:

$$-0.5<(e1T-e1M)/(fT-fM)<0.1 \quad (14)$$

$$-0.5<(e2T-e2M)/(fT-fM)<0.1 \quad (15)$$

(C) A zoom lens is provided, comprising, from front to rear, a first lens unit of negative refractive power, a second lens unit of positive refractive power, and a third lens unit of negative refractive power, wherein the first, second and third lens units are moved to perform a first zooming operation and, after that, at least one lens unit of the first lens unit and the third lens unit is rendered stationary and the second lens unit is moved to perform a second zooming operation.

In particular, the first zooming operation is performed by moving the first lens unit, the second lens unit and the third lens unit all forward, and the second zooming operation is performed by moving the second lens unit forward.

Also, letting the focal length of the i-th lens unit be denoted by fi, the overall focal length for an arbitrary zooming position of the second lens unit and the third lens unit by f23 and the shortest and longest focal lengths of the entire system by fW and fT, respectively, the following conditions are satisfied:

$$0<fW(1/f1+2/f2+1/f3)<4 \quad (16)$$

$$0<f23/fT<0.9 \quad (17)$$

In addition, for the event of transition from the first zooming operation to the second zooming operation, there are determined the principal point interval e1m between the first lens unit and the second lens unit, the principal point interval e2M between the second lens unit and the third lens unit and the focal length fM of the entire lens; and for the telephoto end, there are determined the principal point interval e1T between the first lens unit and the second lens unit, the principal point interval e2T between the second lens unit and the third lens unit and the focal length fT of the entire system. The zoom lens then satisfies at least one of the following conditions:

$$-0.5<(e1T-e1M)/(fT-fM)<0.1 \quad (18)$$

$$-0.5<(e2T-e2M)/(fT-fM)<0.1 \quad (19)$$

(D) A zoom lens comprises, from front to rear, a first lens unit of negative refractive power, a second lens unit of positive refractive power and a third lens unit of negative refractive power, wherein the second lens unit is moved and at least one of the first lens unit and the third lens unit remains stationary to perform a first zooming operation, and, after that, the first, second and third lens units are moved to perform a second zooming operation.

In particular, the first lens unit and the second lens unit are moved in unison and the third lens unit is moved in differential relation, each forward, to perform the second zooming operation.

Also, letting the focal length of the i-th lens unit be denoted by fi, the overall focal length for an arbitrary zooming position of the second lens unit and the third lens unit by f23 and the shortest and longest focal lengths of the entire system by fW and fT, respectively, the following conditions are satisfied:

$$0<fW(1/f1+2/f2+1/f3)<4 \quad (20)$$

$$0<f23/fT<0.9 \quad (21)$$

In addition, for the event of transition from the first zooming operation to the second zooming operation, there are determined the principal point interval e1m between the first lens unit and the second lens unit, the principal point interval e2M between the second lens unit and the third lens unit and the focal length fM of the entire system; and for the telephoto end, there are determined the principal point interval e1T between the first lens unit and the second lens unit, the principal point interval e2T between the second lens unit and the third lens unit and the focal length fT of the entire system. The zoom lens then satisfies at least one of the following conditions:

$$-0.5<(e1T-e1M)/(fT-fM)<0.1 \quad (22)$$

$$-0.5<(e2T-e2M)/(fT-fM)<0.1 \quad (23)$$

(E) A zoom lens comprises, from front to rear, a first lens unit of negative refractive power, a second lens unit of positive refractive power and a third lens unit of positive or negative refractive power, wherein as zooming is performed by moving the first, second and third lens units, the first, second and third lens units are moved in differential relation to perform a first zooming operation from a wide-angle end to a medium focal length position and, after that, two lens units of the first, second and third lens units are moved in unison to perform a second zooming operation from the medium focal length position to a telephoto position.

In particular, the first zooming operation and the second zooming operation are performed by moving the first, second and third lens units all forward. The second zooming operation is performed by moving either the first lens unit and the third lens unit in unison, or the first lens unit and the second lens unit in unison, or the second lens unit and the third lens unit in unison.

For the event of transition from the first zooming operation to the second zooming operation, there are determined the principal point interval e1m between the first lens unit and the second lens unit, the principal point interval e2M between the second lens unit and the third lens unit and the focal length fM of the entire system; and for the telephoto end, there are determined the principal point interval e1T between the first lens unit and the second lens unit, the principal point interval e2T between the second lens unit and the third lens unit and the focal length fT of the entire system. The zoom lens then satisfies at least one of the following conditions:

$$-0.5 < (e1T - e1M)/(fT - fM) < 0.1 \quad (24)$$

$$-0.5 < (e2T - e2M)/(fT - fM) < 0.1 \quad (25)$$

FIGS. 29(A), 29(B) and 29(C) to FIGS. 31(A), 31(B) and 31(C) show the paraxial refractive power arrangements of numerical examples 15 to 17.

Figure 29A:
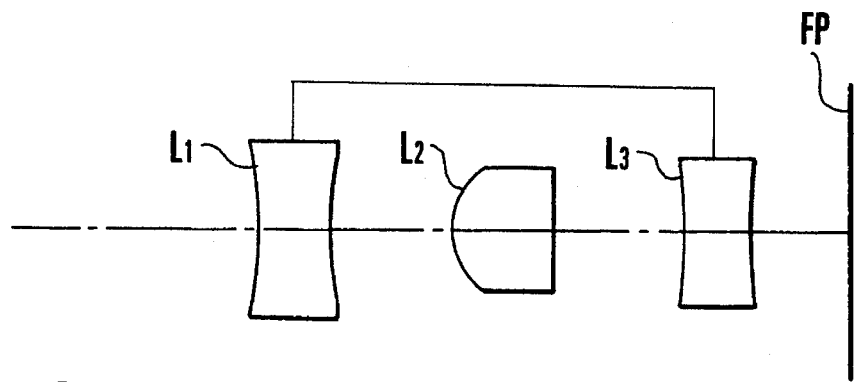
FIGS. 29(A), 29(B) and 29(C) are diagrams of the paraxial refractive power arrangement of the numerical example 15 of the invention.
Figure 29B:
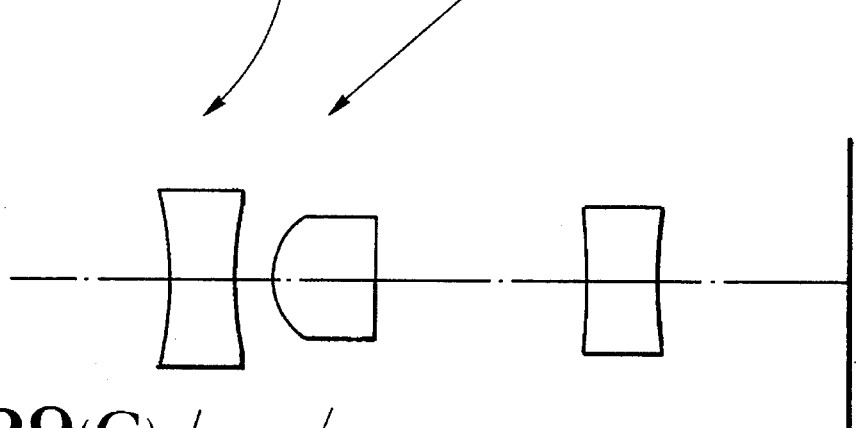

In these figures, L1 denotes the first lens unit of negative refractive power; L2 the second lens unit of positive refractive power; L3 the third lens unit of positive or negative refractive power; and FP the image plane. FIGS. 29(A), 30(A) and 31(A) are in the wide-angle end; FIGS. 29(B), 30(B) and 31(B) in a medium zooming position; and FIGS. 29(C), 30(C) and 31(C) in the telephoto end. The arrows indicate the moving directions of the lens units during zooming.

The numerical examples 15 to 17 each comprise, from front to rear, a first lens unit of negative refractive power, a second lens unit of positive refractive power and a third lens unit of negative refractive power, totaling three lens units, of which two lens units are moved in unison to perform the first zooming operation from the wide-angle end (A) to the medium focal length position (B). After that, the two lens units are taken out of unison and at least one of them is then moved to perform the second zooming operation from the medium focal length position (B) to the telephoto end (C).

Concretely speaking, as the three lens units are moved forward to effect zooming from the wide-angle end to the telephoto end, two of the three lens units are moved in unison to perform the first zooming operation from the wide-angle end to the medium focal length position. After that, the two lens units are taken out of unison and then moved in differential relation to perform the second zooming operation from the medium focal length position to the telephoto end.

Figure 29C:
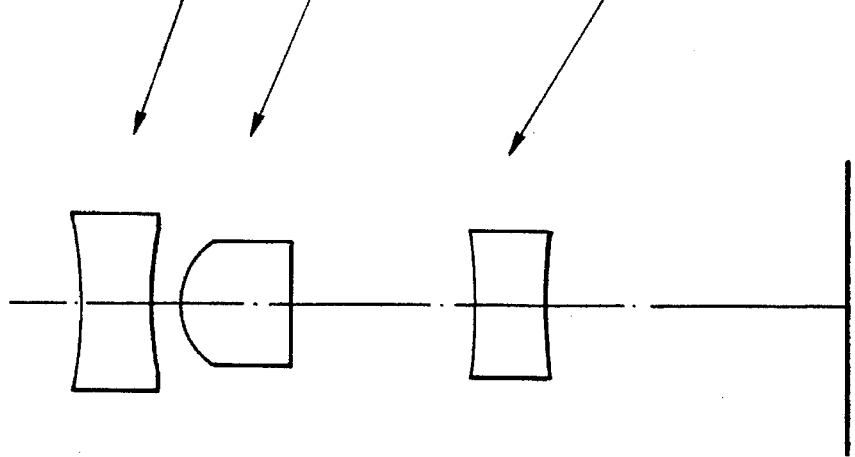
Figure 30A:
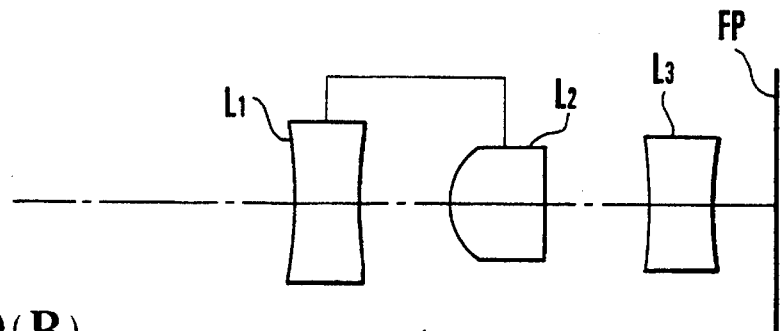
FIGS. 30(A), 30(B) and 30(C) are diagrams of the paraxial refractive power arrangement of the numerical example 16 of the invention.
Figure 30B:
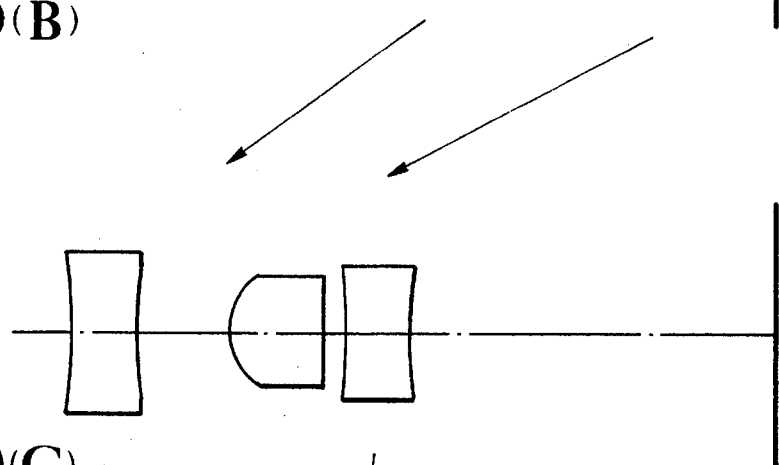
Figure 30C:
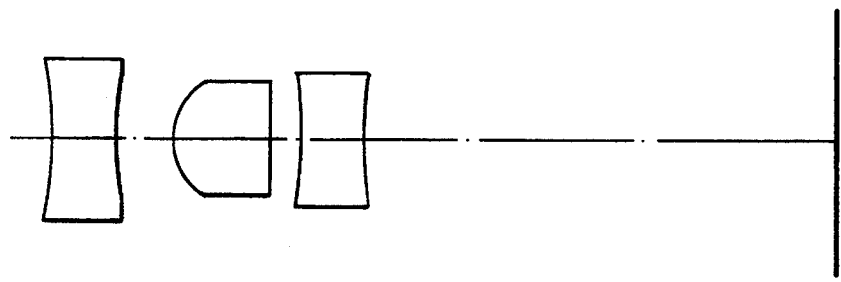
Figure 31A:
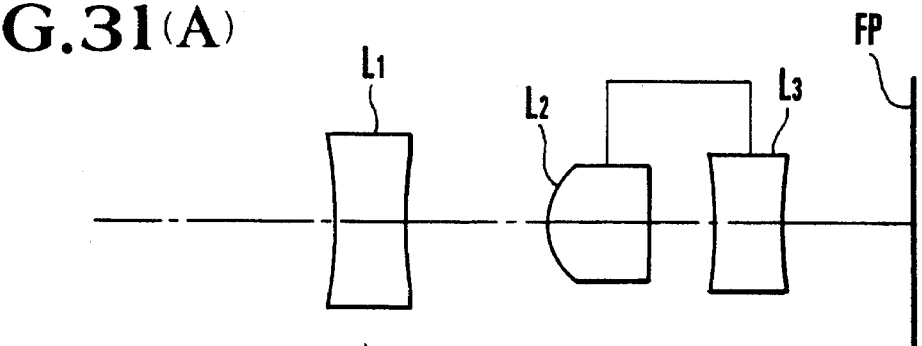
FIGS. 31(A), 31(B) and 31(C) are diagrams of the paraxial refractive power arrangement of the numerical example 17 of the invention.
Figure 31B:
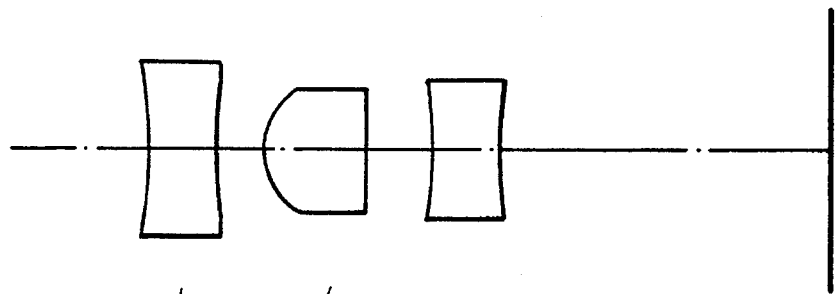
Figure 31C:
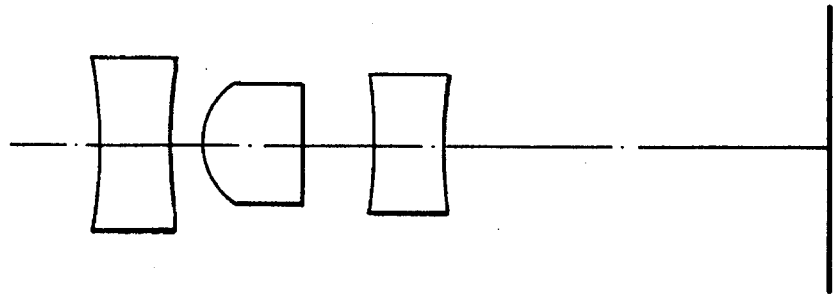

Especially, the first zooming operation is performed by moving forward the first lens unit and the third lens unit in unison for the numerical example 15 of FIGS. 29(A) to 29(C), the first lens unit and the second lens unit in unison for the numerical example 16 of FIGS. 30(A) to 30(C), or the second lens unit and the third lens unit in unison for the numerical example 17 of FIGS. 31(A) to 31(C).

The second zooming operation for each of the numerical examples 15 to 17 is performed by moving the three lens units forward in differential relation.

In the numerical example 15 of FIGS. 29(A) to 29(C), the differential relation is such that, during the first zooming operation, the separation between the first lens unit and the second lens unit decreases and the separation between the second lens unit and the third lens unit increases and that during the second zooming operation, the separation between the first lens unit and the second lens unit decreases and the separation between the second lens unit and the third lens unit decreases.

In the numerical example 16 of FIGS. 30(A) to 30(C), during the first zooming operation, the separation between the second lens unit and the third lens unit decreases. During the second zooming operation, the separation between the first lens unit and the second lens unit decreases and the separation between the second lens unit and the third lens unit increases.

In the numerical example 17 of FIGS. 31(A) to 31(C), during the first zooming operation, the separation between the first lens unit and the second lens unit decreases. During the second zooming operation, the separation between the first lens unit and the second lens unit decreases and the separation between the second lens unit and the third lens unit increases.

In the numerical examples 15 to 17, for the medium focal length position (B) at which to interchange the system between the two zoom types and the telephoto end (C), all the lens units have paraxial refractive power arrangements determined with every parameter satisfying at least one of the conditions (14) and (15).

By this, a predetermined zoom ratio is easy to obtain while still maintaining the lens mounting mechanism to be simplified in structure. Moreover, the maximum image angle is easy to widen. Nonetheless, the zoom lens can be constructed in a compact form.

When the upper limit of the condition (14) or (15) is exceeded, the separations between the lens units in the region of from the medium focal length position to the telephoto end become too wide with the result of increasing the total length of the entire lens objectionably. When the lower limit is exceeded, the ranges of variation with zooming of the separations between the lens units become large. Thus, a long lens barrel is required and the size of the entire system comes to increase greatly.

FIGS. 32(A), 32(B) and 32(C) to FIGS. 34(A), 34(B) and 34(C) show the paraxial refractive power arrangements of the numerical examples 18 to 20 of the invention.

Figure 33A:
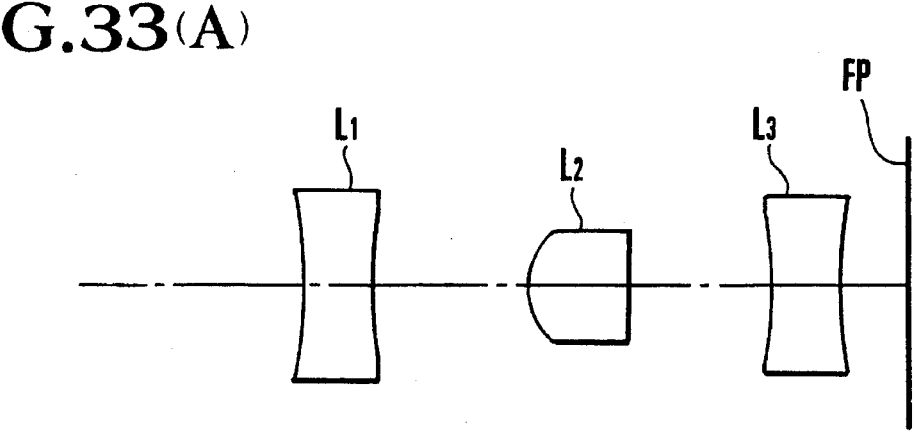
FIGS. 33(A), 33(B) and 33(C) are diagrams of the paraxial refractive power arrangement of the numerical example 19 of the invention.
Figure 33B:
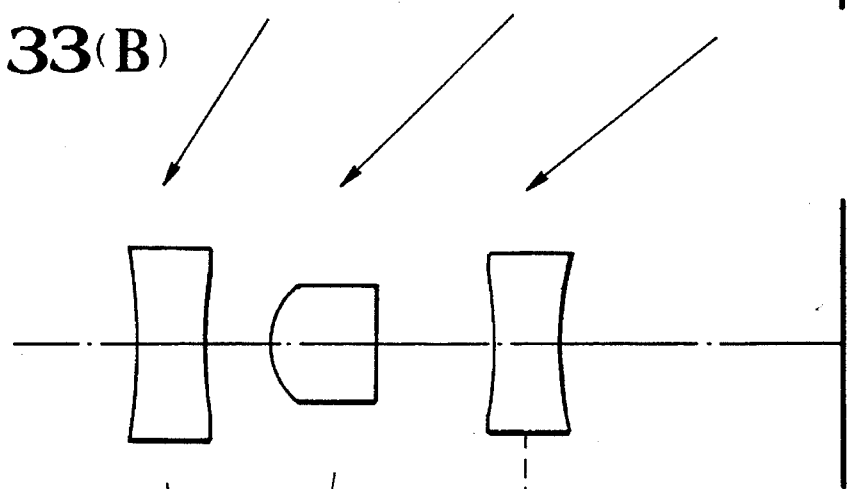

In these figures, L1 denotes the first lens unit of negative refractive power; L2 the second lens unit of positive refractive power; L3 the third lens unit of positive or negative refractive power; and FP the image plane. FIGS. 32(A), 33(A) and 34(A) are in the wide-angle end; FIGS. 32(B), 33(B) and 34(B) in the medium focal length position; and FIGS. 32(C), 33(C) and 34(C) in the telephoto end. The arrows indicate the moving directions of the lens units during zooming.

The numerical examples 18 to 20 each comprise, from front to rear, a first lens unit of negative refractive power, a second lens unit of positive refractive power and a third lens unit of negative refractive power, totaling three lens units, all of which are moved forward to perform a first zooming operation from the wide-angle end (A) to the medium focal length position (B). After that, at least one of the first lens unit and the third lens unit is rendered stationary. Then, the second lens unit is moved forward to perform a second zooming operation from the medium focal length position (B) to the telephoto end (C).

Figure 33C:
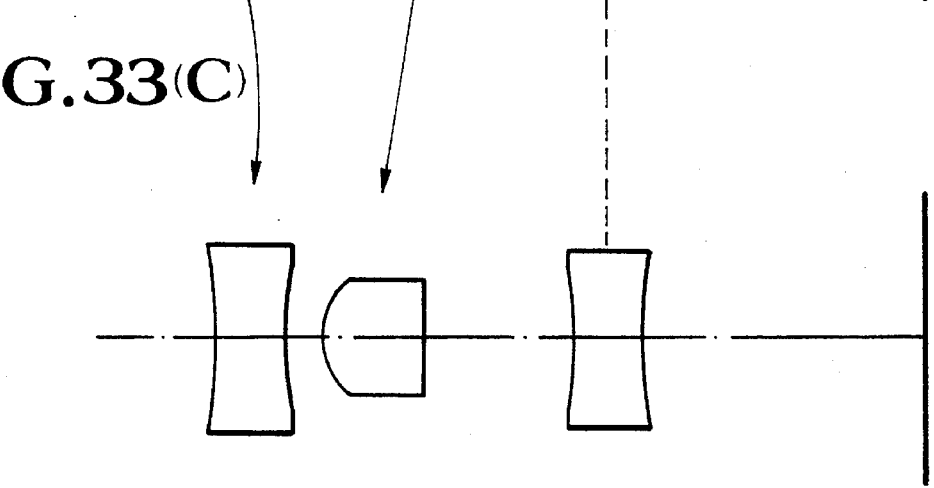
Figure 34A:
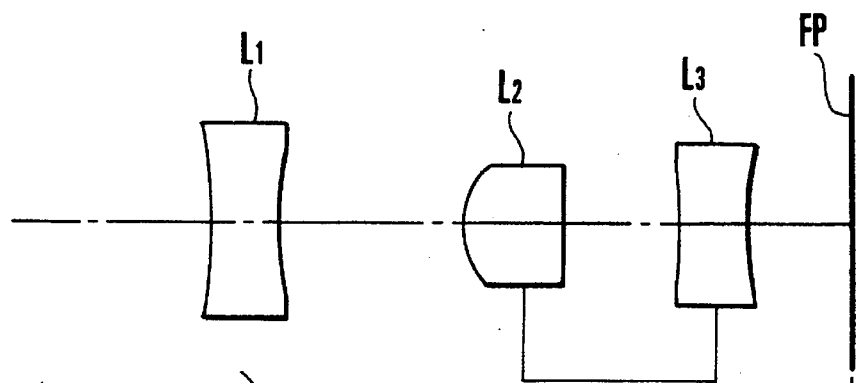
FIGS. 34(A), 34(B) and 34(C) are diagrams of the paraxial refractive power arrangement of the numerical example 20 of the invention.
Figure 34B:
Figure 34C:
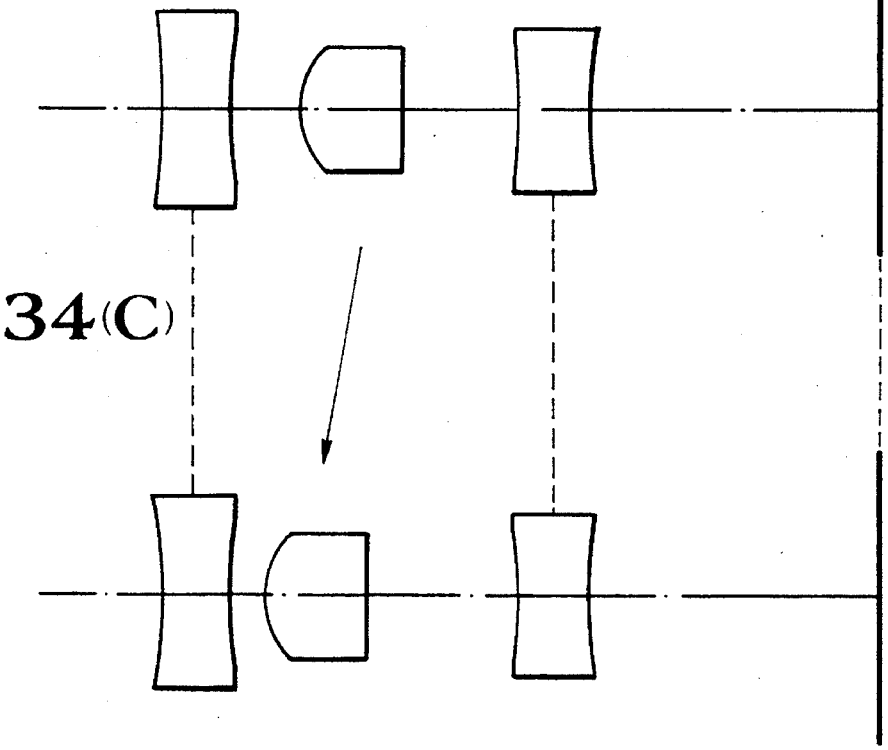

Especially, the first zooming operation is performed for the numerical examples 18 and 19 of FIGS. 32(A) to 32(C) and FIGS. 33(A) to 33(C) by moving the first lens unit, the second lens unit and the third lens unit forward in differential relation, or for the numerical example 20 of FIGS. 34(A) to 34(C) by moving the second lens unit and the third lens unit forward in unison.

During the second zooming operation, for the numerical example 18 of FIGS. 32(A) to 33(C), the first lens unit is rendered stationary, and the second lens unit and the third lens unit move. For the numerical example 19 of FIGS. 33(A) to 33(C), the third lens unit is rendered stationary, and the first lens unit and the second lens unit move. For the numerical example 20 of FIGS. 34(A) to 34(C), the first lens unit and the third lens unit are rendered stationary, and the second lens unit moves.

It should be noted in connection with the numerical example 20 that the second zooming operation works in only two focal length positions, namely, the medium and longest focal length positions, and is not used in their intervening region of the zooming range.

In the numerical example 18 of FIGS. 32(A) to 32(C), the differential relation is such that, during the first zooming operation, the separation between the first lens unit and the second lens unit decreases, and the separation between the second lens unit and the third lens unit decreases. During the second zooming operation, the separation between the first lens unit and the second lens unit decreases and the separation between the second lens unit and the third lens unit increases.

In the numerical example 19 of FIGS. 33(A) to 33(C), during the first zooming operation, the separation between the first lens unit and the second lens unit decreases and the separation between the second lens unit and the third lens unit decreases. During the second zooming operation, the separation between the first lens unit and the second lens unit decreases and the separation between the second lens unit and the third lens unit increases.

In the numerical example 20 of FIGS. 34(A) to 34(C), during the first zooming operation, the separation between the first lens unit and the second lens unit decreases. During the second zooming operation, the separation between the first lens unit and the second lens unit decreases and the separation between the second lens unit and the third lens unit increases.

In the numerical examples 18 to 20, the lens units are made up by determining their refractive powers so as to satisfy the above-stated conditions (16) and (17). By this, all the aberrations become easy to correct, while still permitting the entire lens system to be minimized in size.

When the lower limit of the condition (16) is exceeded, as this means that the negative refractive powers of the first lens unit and the third lens unit are too strong, or that the positive refractive power of the second lens unit comes to be weak, curvature of field becomes over-corrected. Conversely when the upper limit is exceeded, under-correction of field curvature results.

The inequalities of condition (17) give a proper range for the overall positive refractive power of the second lens unit and the third lens unit and have an aim to make the image good in the angular field coverage characteristic, while still permitting the total length of the entire lens to be shortened.

When the upper limit of the condition (17) is exceeded, as this means that the positive refractive power is too weak, the total length in the wide-angle end of the entire lens becomes long. When the lower limit is exceeded, as this means that the overall refractive power of the second lens unit and the third lens unit changes to the negative, the curvature of field increases objectionably.

Again, in the numerical examples 18 to 20, similarly to the numerical examples 15 to 17, for the medium focal length position (B) at which to interchange the system between the two zoom types and the telephoto end, all the lens units have paraxial refractive power arrangements determined with every parameter satisfying at least one of the conditions (18) and (19).

By this, a predetermined zoom ratio is easily obtained, while still permitting the lens mounting mechanism to be simplified in structure. Moreover, the maximum image angle is easy to widen. Nonetheless, the size of the entire lens system can be minimized.

The technical significances of the conditions (18) and (19) are similar to those of the above-stated conditions (14) and (15).

FIGS. 35(A), 35(B) and 35(C) to FIGS. 37(A), 37(B) and 37(C) are schematic diagrams of the paraxial refractive power arrangements of the numerical examples 21 to 23 of the invention.

Figure 35A:
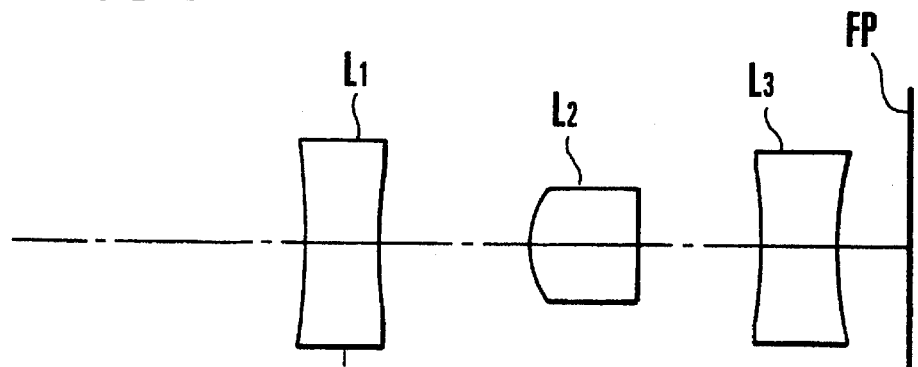
FIGS. 35(A), 35(B) and 35(C) are diagrams of the paraxial refractive power arrangement of the numerical example 21 of the invention.
Figure 35B:
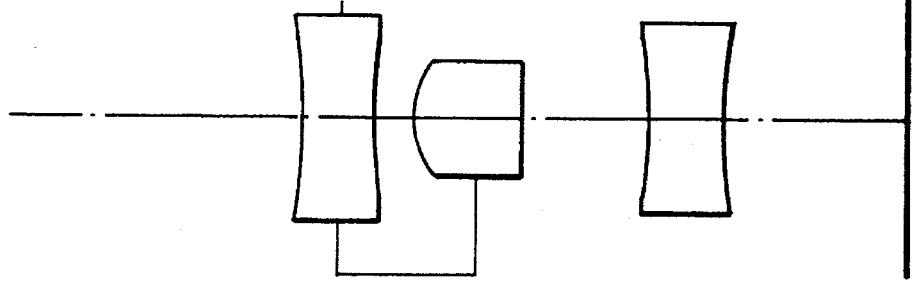
Figure 35C:
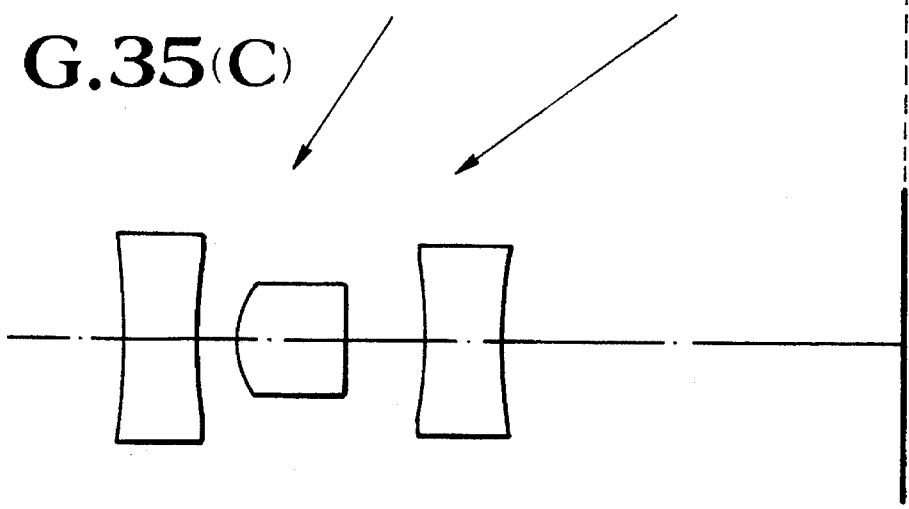
Figure 36A:
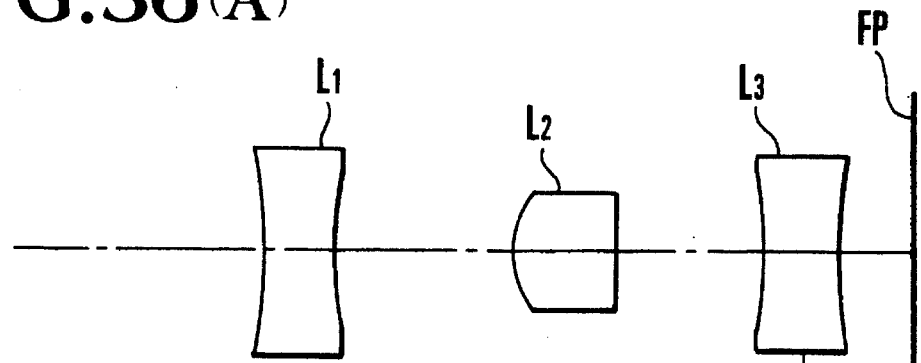
FIGS. 36(A), 36(B) and 36(C) are diagrams of the paraxial refractive power arrangement of the numerical example 22 of the invention.
Figure 36B:
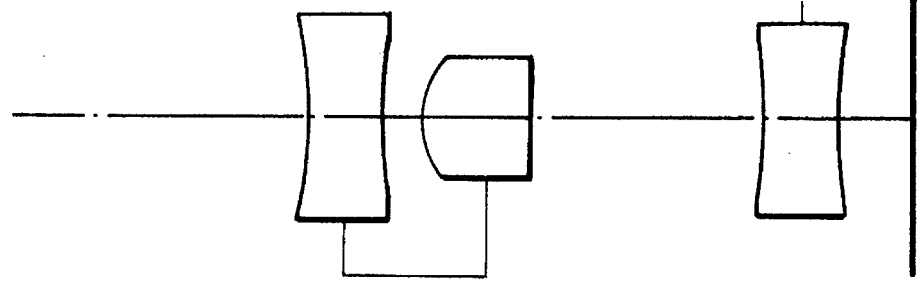
Figure 36C:
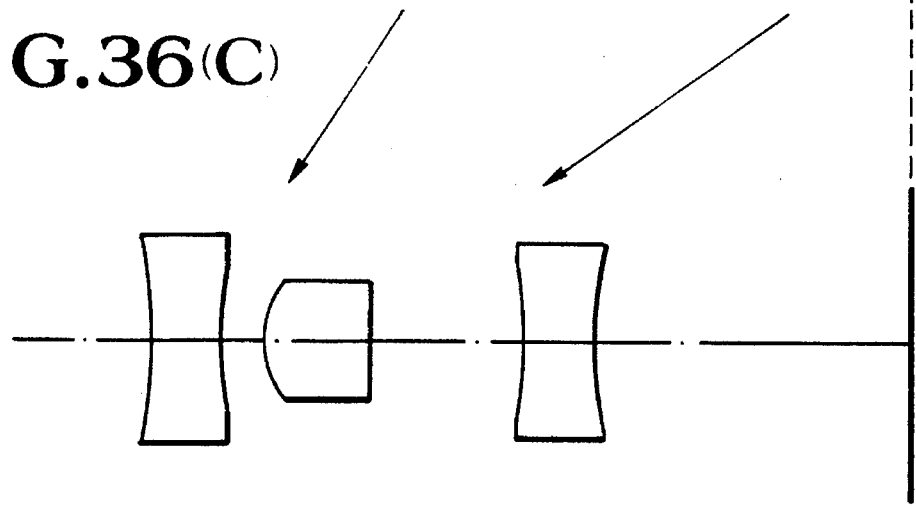
Figure 37A:
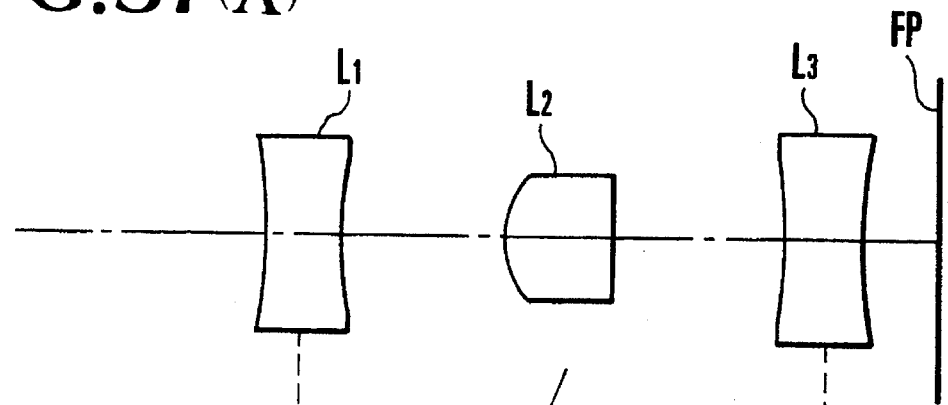
FIGS. 37(A), 37(B) and 37(C) are diagrams of the paraxial refractive power arrangement of the numerical example 23 of the invention.
Figure 37B:
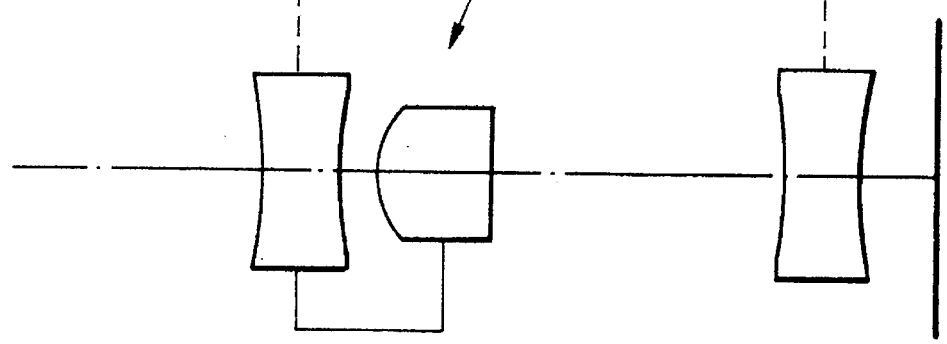
Figure 37C:
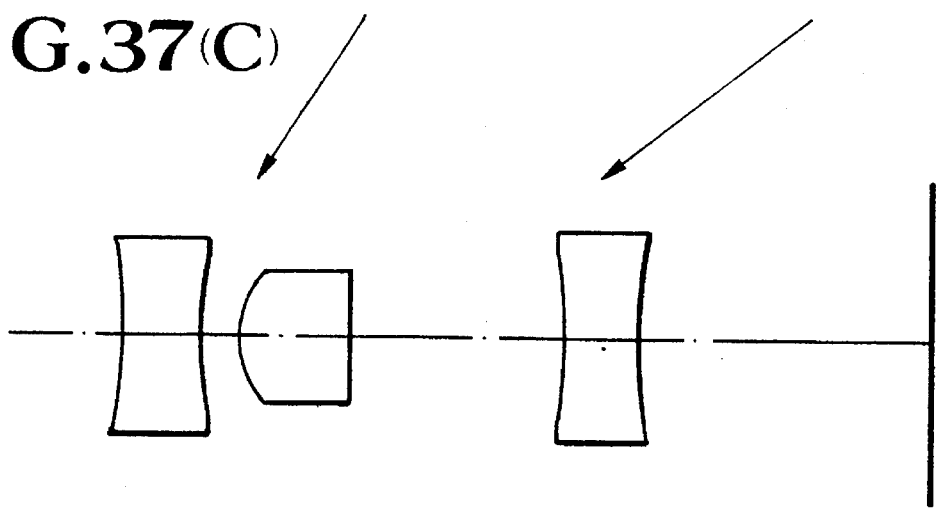

In these figures, L1 denotes the first lens unit of negative refractive power; L2 the second lens unit of positive refractive power; L3 the third lens unit of positive or negative refractive power; and FP the image plane. Again, FIGS. 35(A), 36(A) and 37(A) are in the wide-angle end; FIGS. 35(B), 36(B) and 37(B) are in a medium focal length position; and FIGS. 35(C), 36(C) and 37(C) are in the telephoto end. The arrows indicate the moving directions of the lens units during zooming.

The numerical examples 21 to 23 each comprise, from front to rear, a first lens unit of negative refractive power, a second lens unit of positive refractive power and a third lens unit of negative refractive power, totaling three lens units, wherein the second lens unit is moved forward, and at least one of the first lens unit and the third lens unit is made stationary to perform a first zooming operation from the wide-angle end (A) to the medium focal length position (B), and, after that, the three lens units are moved forward to perform a second zooming operation from the medium focal length position (B) to the telephoto end (C).

Especially, the first zooming operation is performed by moving forward the second lens unit and the third lens unit for the numerical example 21 of FIGS. 35(A) to 35(C), the first lens unit and the second lens unit for the numerical example 22 of FIGS. 36(A) to 36(C), or only the second lens unit for the numerical example 23 of FIGS. 37(A) to 37(C).

The second zooming operation is performed for each of the numerical examples 21 to 23 by moving forward the first lens unit and the second lens unit in unison and the third lens unit in differential relation.

It should be noted in connection with the numerical example 23 of FIGS. 37((A) to 37(C) that the first zooming operation works at only two focal length positions, namely, the shortest and medium focal length positions, and is not used in their intervening region of the zooming range.

In the numerical example 21 of FIGS. 35(A) to 35(C), the differential relation is such that during the first zooming operation, the first lens unit remains stationary, the separation between the first lens unit and the second lens unit decreases and the separation between the second lens unit and the third lens unit slightly increases. During the second zooming operation, the separation between the second lens unit and the third lens unit decreases.

In the numerical example 22 of FIGS. 36(A) to 36(C), during the first zooming operation, the third lens unit remains stationary, the separation between the first lens unit and the second lens unit decreases and the separation between the second lens unit and the third lens unit increases. During the second zooming operation, the separation between the second lens unit and the third lens unit decreases.

In the numerical example 23 of FIGS. 37(A) to 37(C), during the first zooming operation, the first lens unit and the third lens unit remain stationary and the separation between the first lens unit and the second lens unit decreases and the separation between the second lens unit and the third lens unit increases. During the second zooming operation, the separation between the second lens unit and the third lens unit decreases.

In the numerical examples 21 to 23, the refractive powers of the lens units, similarly to the numerical examples 18 to 20, satisfy the above-stated conditions (20) and (21). By this, all the aberrations are made easy to correct, while still permitting the size of the entire lens system to be minimized.

The technical significances of the conditions (20) and (21) are similar to those of the above-stated conditions (16) and (17).

Again, in the numerical examples 21 to 23, similarly to the numerical examples 15 to 17, for the medium focal length position (B) at which to interchange the system between the zoom types and the telephoto end, the lens systems have their paraxial refractive power arrangements determined with every parameter satisfying at least one of the conditions (22) and (23).

By this, a predetermined zoom ratio can be easily obtained while still permitting the lens mounting mechanism to be simplified in structure. This also leads to the realization of a zoom lens which is amenable to much-desired increase of the maximum image angle while still permitting the size of the entire system to be minimized.

The technical significances of the conditions (22) and (23) are similar to those of the above-stated conditions (14) and (15).

FIGS. 38(A), 38(B) and 38(C) to FIGS. 40(A), 40(B) and 40(C) are schematic diagrams of the paraxial refractive power arrangements of the numerical examples 24 to 26 of the invention.

Figure 38A:
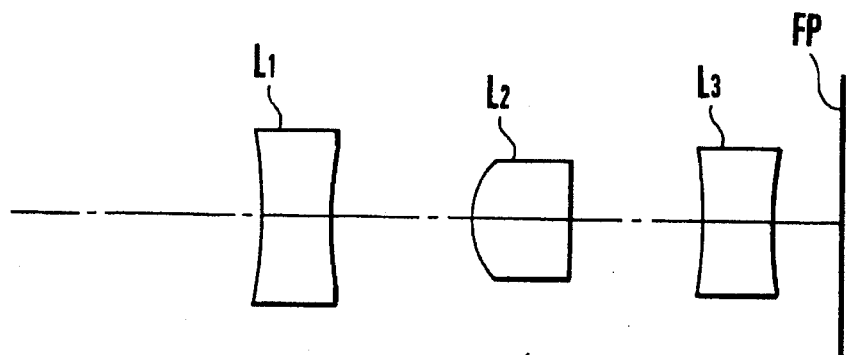
FIGS. 38(A), 38(B) and 38(C) are diagrams of the paraxial refractive power arrangement of the numerical example 24 of the invention.
Figure 38B:
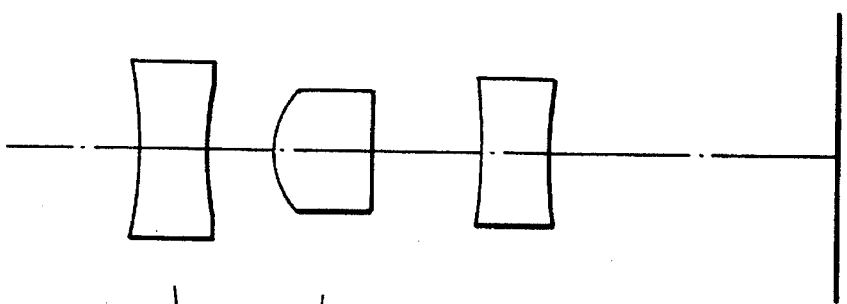
Figure 38C:
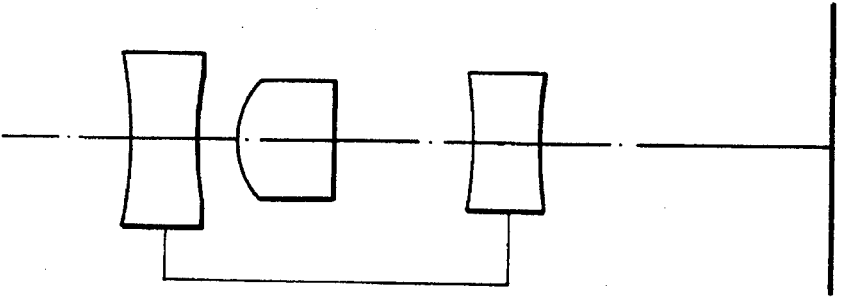
Figure 39A:
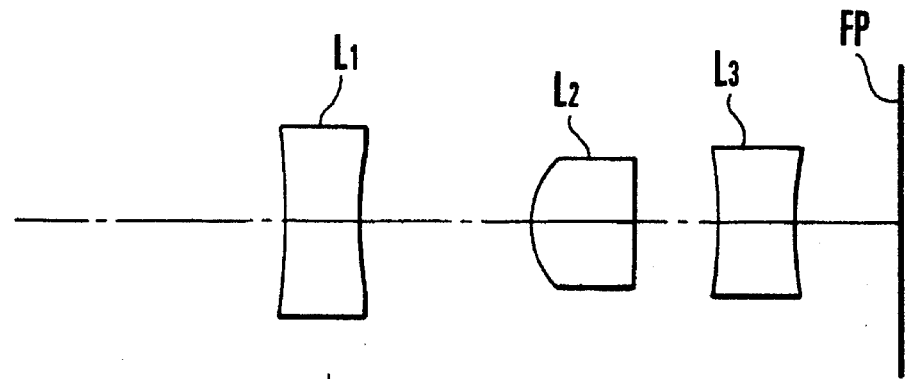
FIGS. 39(A), 39(B) and 39(C) are diagrams of the paraxial refractive power arrangement of the numerical example 25 of the invention.
Figure 39B:
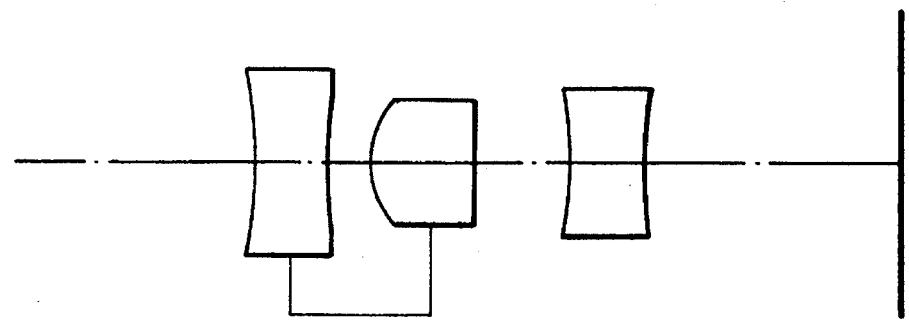
Figure 39C:
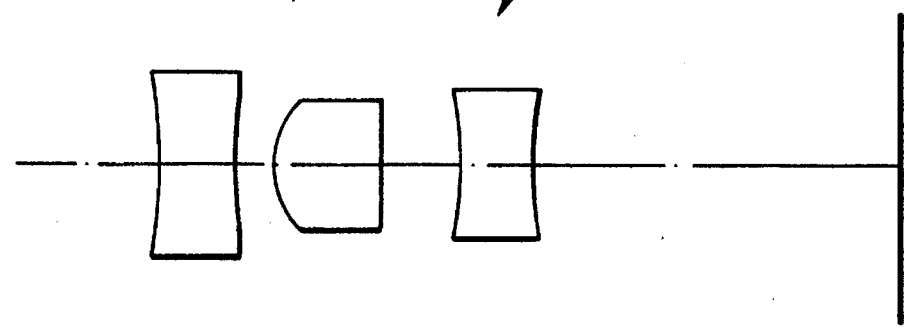
Figure 40A:
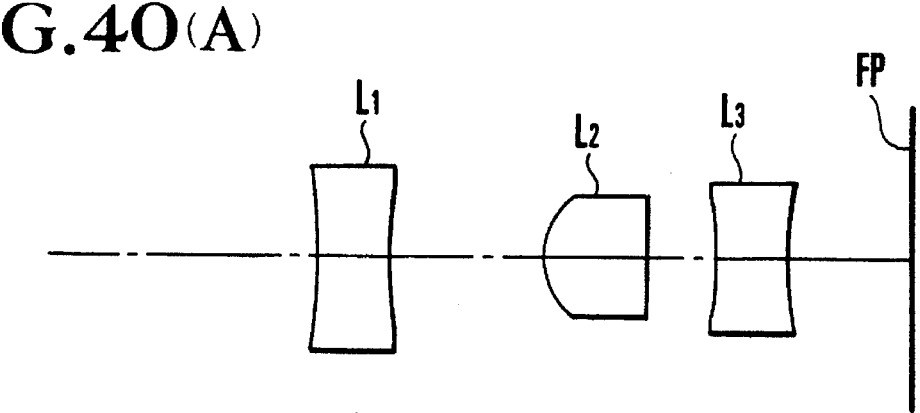
FIGS. 40(A), 40(B) and 40(C) are diagrams of the paraxial refractive power arrangement of the numerical example 26 of the invention.
Figure 40B:
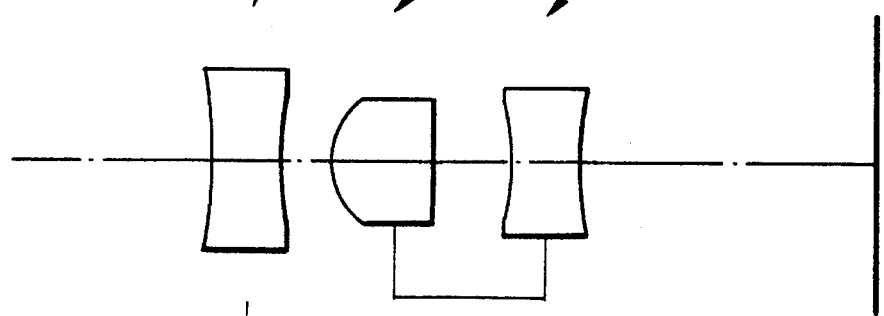
Figure 40C:
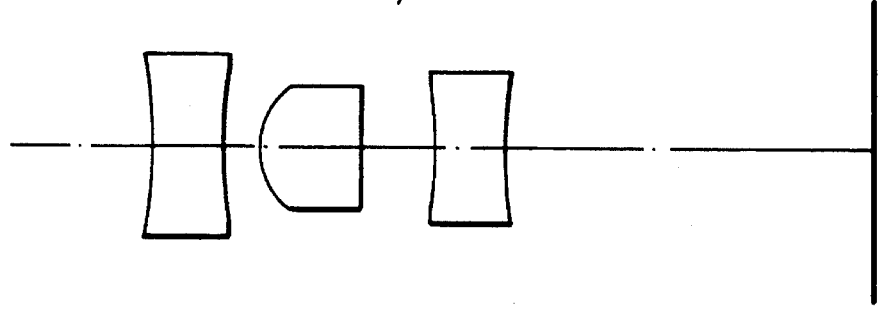

In these figures, L1 denotes the first lens unit of negative refractive power; L2 the second lens unit of positive power; L3 the third lens unit of positive or negative refractive power; and FP the image plane. Again, FIGS. 38(A), 39(A) and 40(A) are in the wide-angle end; FIGS. 38(B), 39(B) and 40(B) are in the medium focal length position; and FIGS. 38(C), 39(C) and 40(C) are in the telephoto end. The arrows indicate the moving directions of the lens units during zooming.

The numerical examples 24 to 26 each comprise, from front to rear, a first lens unit of negative refractive power, a second lens unit of positive refractive power and a third lens unit of negative refractive power, totaling three lens units, wherein all the three lens units are moved forward in differential direction to perform a first zooming operation from the wide-angle end (A) to the medium focal length position (B). After that, two of the three lens units are brought into unison, and the two lens units and the other lens unit are moved forward in differential relation to perform a second zooming operation from the medium focal length position (B) to the telephoto end (C).

Especially, the first zooming operation is performed for each of the numerical examples 24 to 26 of FIGS. 38(A) to 38(C) to FIGS. 40(A) to 40(C) by moving the first to third lens units forward in differential relation.

The second zooming operation is performed by moving forward the first lens unit and the third lens unit in unison for the numerical example 24 of FIGS. 38(A) to 38(C), the first lens unit and the second lens unit in unison for the numerical example 25 of FIGS. 39(A) to 39(C), or the second lens unit and the third lens unit in unison for the numerical example 26 of FIGS. 40(A) to 40(C).

In the numerical example 24 of FIGS. 38(A) to 38(C), the differential relation is such that, during the first zooming operation, the separation between the first lens unit and the second lens unit decreases and the separation between the second lens unit and the third lens unit decreases, and that during the second zooming operation, the separation between the first lens unit and the second lens unit decreases and the separation between the second lens unit and the third lens unit increases.

In the numerical example 25 of FIGS. 39(A) to 39(C), during the first zooming operation, the separation between the first lens unit and the second lens unit decreases and the separation between the second lens unit and the third lens unit increases. During the second zooming operation, the separation between the second lens unit and the third lens unit decreases.

In the numerical example 26 of FIGS. 40(A) to 40(C), during the first zooming operation, the separation between the first lens unit and the second lens unit decreases and the separation between the second lens unit and the third lens unit increases. During the second zooming operation, the separation between the first lens unit and the second lens unit decreases.

Again, in the numerical examples 24 to 26, similarly to the numerical examples 15 to 17, for the medium focal length position (B) at which to interchange the system between the two zoom types and the telephoto end, all the lens units have their paraxial refractive power arrangements determined with every parameter satisfying at least one of the conditions (24) and (25).

By this, a predetermined zoom ration can be easily obtained while still permitting the lens mounting mechanism to be simplified in structure. This also leads to the realization of a zoom lens which is amenable to much desired increase of the maximum image angle, while still permitting the size of the entire lens system to be minimized.

The technical significances of the conditions (24) and (25) are similar to those of the above-stated conditions (14) and (15).

Next, the numerical data of the paraxial refractive power arrangements for the numerical examples 15 to 26 of the invention are shown, where fi is the focal length of the i-th lens unit; ei is the principal point interval between the i-th lens unit and the (i+1)st lens unit; and sk is the back focal distance. The values of the factors in the above-stated conditions for the numerical examples 15 to 26 are listed in Table 3.

| | Numerical Example 15 | | |
|---|---|---|---|
| | $f_1 = -29.25$ | | |
| | $f_2 = 23.10$ | | |
| | $f_3 = -43.08$ | | |
| Focal length of entire system | 36.00 | 82.90 | 101.99 |
| $e_1$ | 20.15 | 7.81 | 7.59 |
| $e_2$ | 31.03 | 43.37 | 39.59 |
| sk | 17.31 | 30.72 | 46.30 |
| | Numerical Example 16 | | |
| | $f_1 = -38.16$ | | |
| | $f_2 = 22.63$ | | |
| | $f_3 = -35.00$ | | |
| Focal length of entire system | 36.02 | 72.54 | 101.99 |
| $e_1$ | 17.07 | 17.07 | 11.85 |
| $e_2$ | 29.08 | 16.12 | 17.16 |
| sk | 12.60 | 60.85 | 78.16 |
| | Numerical Example 17 | | |
| | $f_1 = -38.26$ | | |
| | $f_2 = 22.71$ | | |
| | $f_3 = -35.00$ | | |
| Focal length of entire system | 36.01 | 84.84 | 101.99 |
| $e_1$ | 23.83 | 9.76 | 7.61 |
| $e_2$ | 22.25 | 22.25 | 22.85 |
| sk | 22.12 | 51.50 | 60.16 |
| | Numerical Example 18 | | |
| | $f_1 = -40.68$ | | |
| | $f_2 = 25.43$ | | |
| | $f_3 = -36.87$ | | |

| | | | |
|---|---|---|---|
| Focal length of entire system | 36.01 | 85.07 | 102.00 |
| $e_1$ | 23.29 | 12.22 | 7.61 |
| $e_2$ | 32.80 | 28.41 | 33.19 |
| sk | 12.61 | 46.42 | 46.25 |

Numerical Example 19

$f_1 = -42.44$
$f_2 = 26.29$
$f_3 = -37.91$

| | | | |
|---|---|---|---|
| Focal length of entire system | 36.00 | 85.01 | 102.00 |
| $e_1$ | 25.38 | 12.38 | 7.63 |
| $e_2$ | 33.30 | 30.03 | 34.87 |
| sk | 12.90 | 44.52 | 44.52 |

Numerical Example 20

$f_1 = -42.09$
$f_2 = 25.99$
$f_3 = -37.33$

| | | | |
|---|---|---|---|
| Focal length of entire system | 36.01 | 85.06 | 102.00 |
| $e_1$ | 28.45 | 12.35 | 7.63 |
| $e_2$ | 29.26 | 29.26 | 33.98 |
| sk | 17.43 | 45.27 | 45.27 |

Numerical Example 21

$f_1 = -49.45$
$f_2 = 25.32$
$f_3 = -36.04$

| | | | |
|---|---|---|---|
| Focal length of entire system | 36.04 | 69.43 | 101.96 |
| $e_1$ | 22.74 | 7.63 | 7.63 |
| $e_2$ | 29.66 | 29.91 | 23.38 |
| sk | 12.59 | 27.45 | 57.20 |

Numerical Example 22

$f_1 = -43.53$
$f_2 = 26.24$
$f_3 = -37.17$

| | | | |
|---|---|---|---|
| Focal length of entire system | 36.13 | 62.04 | 101.97 |
| $e_1$ | 25.49 | 7.62 | 7.62 |
| $e_2$ | 32.62 | 44.15 | 33.40 |
| sk | 13.14 | 13.14 | 45.53 |

Numerical Example 23

$f_1 = -37.34$
$f_2 = 25.87$
$f_3 = -40.52$

| | | | |
|---|---|---|---|
| Focal length of entire system | 36.01 | 66.31 | 101.96 |
| $e_1$ | 23.58 | 7.61 | 7.61 |
| $e_2$ | 35.36 | 51.33 | 40.51 |
| sk | 12.57 | 12.57 | 41.12 |

Numerical Example 24

$f_1 = -40.03$
$f_2 = 25.15$
$f_3 = -36.39$

| | | | |
|---|---|---|---|
| Focal length of entire system | 36.00 | 85.03 | 101.99 |
| $e_1$ | 23.07 | 11.72 | 7.62 |
| $e_2$ | 32.24 | 28.74 | 32.84 |
| sk | 13.00 | 45.35 | 46.55 |

Numerical Example 25

$f_1 = -45.19$
$f_2 = 23.61$
$f_3 = -30.29$

| | | | |
|---|---|---|---|
| Focal length of entire system | 36.00 | 83.00 | 101.99 |
| $e_1$ | 25.38 | 7.63 | 7.63 |
| $e_2$ | 24.30 | 25.73 | 23.24 |
| sk | 17.71 | 38.54 | 54.29 |

Numerical Example 26

$f_1 = -39.43$
$f_2 = 22.16$
$f_3 = -28.99$

| | | | |
|---|---|---|---|
| Focal length of entire system | 36.00 | 83.11 | 101.99 |
| $e_1$ | 24.11 | 9.52 | 7.62 |
| $e_2$ | 22.03 | 22.87 | 22.87 |
| sk | 20.45 | 44.89 | 55.25 |

TABLE 3

| Numerical Examples | $\frac{e1T - e1M}{fT - fM}$ | $\frac{e2T - e2M}{fT - fM}$ | fW(1/f1 + 1/f2 + 1/f3) | f23/fT |
|---|---|---|---|---|
| 15 | −0.012 | −0.198 | — | — |
| 16 | −0.177 | 0.035 | — | — |
| 17 | −0.125 | 0.035 | — | — |
| 18 | −0.272 | 0.282 | 0.97 | 0.21–0.23 |
| 19 | −0.280 | 0.285 | 0.94 | 0.21–0.24 |
| 20 | −0.279 | 0.279 | 0.95 | 0.21–0.23 |
| 21 | 0 | −0.201 | 1.12 | 0.22–0.26 |
| 22 | 0 | −0.269 | 0.95 | 0.17–0.22 |
| 23 | 0 | −0.304 | 0.93 | 0.16–0.21 |
| 24 | −0.242 | −0.242 | — | — |
| 25 | 0 | −0.131 | — | — |
| 26 | −0.101 | 0 | — | — |

According to this embodiment, as is understandable from the foregoing, in the 3-unit zoom lens preceded by the lens unit of negative refractive power, the zooming range from the wide-angle end to the telephoto end is divided into two regions of different zoom types, i.e., the first zooming operation and the second zooming operation. In each of the zooming regions, proper conditions for the movements of all the lens units are set forth. Thus, a zooming method for the zoom lens is obtained that makes it possible to form a lens mounting mechanism with the backlash lessened and easily get the predetermined zoom ratio and to widen the maximum image angle with ease.

What is claimed is:

1. A zoom lens comprising:

a front lens unit of negative refractive power;

an intermediate lens unit of positive refractive power; and a rear lens unit of negative refractive power, zooming being performed by varying a separation between said front lens unit and said intermediate lens unit and a separation between said intermediate lens unit and said rear lens unit, and said zoom lens satisfying the following conditions:

$$0.5 < |f_1|/\sqrt{f_W \cdot f_T} < 0.9$$

$$0.40 < f_2/\sqrt{f_W \cdot f_T} < 0.51$$

$$0.7 < |f_3|/\sqrt{f_W \cdot f_T} < 1.1$$

where $f_W$ is the overall focal length of the entire lens system in a wide-angle end, $f_T$ is the overall focal length of the entire lens system in a telephoto end, $f_1$ is the focal length of said front lens unit, $f_2$ is the focal length of said intermediate lens unit, and $f_3$ is the focal length of said rear lens unit.

2. A zoom lens according to claim 1, wherein during zooming from the wide-angle end to the telephoto end, at least said intermediate lens unit and said rear lens unit move forward.

3. A zoom lens according to claim 1, satisfying the following conditions:

$0.4 < l_{1W}/f_W < 0.8$ $0.21 < l_{2W}/f_W < 0.37$ $0.55 < f_{12W}/f_W < 0.92$ where $l_{1W}$ is an axial air separation between said front lens unit and said intermediate lens unit in the wide-angle end, $l_{2W}$ is an axial air separation between said intermediate lens unit and said rear lens unit in the wide-angle end, and $f_{12W}$ is the overall focal length of said front lens unit and said intermediate lens unit in the wide-angle end.

4. A zoom lens according to claim 1 or 3, wherein said front lens unit includes, from front to rear, at least one negative lens having a concave surface facing an image side and at least one positive lens having a convex surface facing an object side, and said intermediate lens unit includes at least two lens surfaces of convex curvature facing the object side and at least one lens surface of convex curvature facing the image side, a frontmost lens in said intermediate lens unit being a positive lens, and said rear lens unit includes at least one lens surface of concave curvature facing the object side.

5. A zoom lens comprising:

a front lens unit of negative refractive power, an intermediate lens unit of positive refractive power and a rear lens unit of negative refractive power, zooming being performed by varying a separation between said front lens unit and said intermediate lens unit and a separation between said intermediate lens unit and said rear lens unit, and said zoom lens satisfying the following conditions:

$0.4 < l_{1W}/f_W < 0.8$ $0.21 < l_{2W}/f_W < 0.37$ $0.55 < f_{12W}/f_W < 0.92$ where $f_W$ is the overall focal length in a wide-angle end of the entire lens system, $l_{1W}$ is an axial air separation between said front lens unit and said intermediate lens unit in the wide-angle end, $l_{2W}$ is an axial air separation between said intermediate lens unit and said rear lens unit in the wide-angle end, and $f_{12W}$ is the overall focal length of said front lens unit and said intermediate lens unit in the wide-angle end.

6. A zoom lens according to claim 5, wherein during zooming from the wide-angle end to a telephoto end, said intermediate lens unit and said rear lens unit move forward.

7. A zoom lens comprising:

a front lens unit of negative refractive power, an intermediate lens unit of positive refractive power and a rear lens unit of negative refractive power in order from an object side, zooming being performed by varying a separation between said front lens unit and said intermediate lens unit and a separation between said intermediate lens unit and said rear lens unit, and said zoom lens satisfying the following condition:

$1.0 < |f_3|/|f_1| < 2.0$ where $f_1$ is the focal length of said front lens unit and $f_3$ is the focal length of said rear lens unit.

8. A zoom lens according to claim 7, wherein during zooming from a wide-angle end to a telephoto end, said intermediate lens unit and said rear lens unit move forward.

9. A zoom lens according to claim 7, satisfying the following condition:

$0 < (e_{1W} - e_{1T})/(e_{2W} - e_{2T}) < 10$ where $e_{1W}$ and $e_{1T}$ are intervals between a principal point of said front lens unit and a principal point of said intermediate lens unit in a wide-angle end and a telephoto end, respectively, and $e_{2W}$ and $e_{2T}$ are intervals between the principal point of said intermediate lens unit and a principal point of said rear lens unit in the wide-angle end and the telephoto end, respectively.

10. A zoom lens according to claim 7 or 9, satisfying the following condition:

$$1.0 < (f_{12T}/f_{12W})/\sqrt{f_T/f_W} < 2.0$$

where $f_{12W}$ and $f_{12T}$ are the overall focal lengths of said front lens unit and said intermediate lens unit in the wide-angle end and the telephoto end, respectively, and $f_W$ and $f_T$ are the focal lengths of the entire system in the wide-angle end and the telephoto end, respectively.

11. A zoom lens comprising:

a front lens unit of negative refractive power, an intermediate lens unit of positive refractive power and a rear lens unit of negative refractive power, zooming being performed by varying a separation between said front lens unit and said intermediate lens unit and a separation between said intermediate lens unit and said rear lens unit, and said zoom lens satisfying the following condition:

$$1.0 < (f_{12T}/f_{12W})/\sqrt{f_T/f_W} < 3.0$$

where $f_{12W}$ and $f_{12T}$ are the overall focal lengths of said front lens unit and said intermediate lens unit in a wide-angle end and a telephoto end, respectively, and $f_W$ and $f_T$ are the focal lengths of the entire system in the wide-angle end and the telephoto end, respectively.

12. A zoom lens according to claim 11, wherein during zooming from the wide-angle end to the telephoto end, said intermediate lens unit and said rear lens unit move forward.

13. A zoom lens comprising:

a front lens unit of negative refractive power, an intermediate lens unit of positive refractive power and a rear lens unit of negative refractive power, zooming being performed by varying a separation between said front lens unit and said intermediate lens unit and a separation between said intermediate lens unit and said rear lens unit, and said zoom lens satisfying the following conditions:

$$0.8 < |f_1|/\sqrt{f_W \cdot f_T} < 1.3$$

$$0.4 < \sqrt{f_W \cdot f_T}/Y < 0.8$$

where $f_1$ is the focal length of said front lens unit, $f_W$ and $f_T$ are the focal lengths of the entire system in a wide-angle end and a telephoto end, respectively, and $Y$ is the diagonal length of an effective image frame.

14. A zoom lens according to claim 13, wherein during zooming from the wide-angle end to the telephoto end, said intermediate lens unit and said rear lens unit move forward in such relation that the separation between said front lens unit and said intermediate lens unit decreases and the separation between said intermediate lens unit and said rear lens unit decreases.

15. A zoom lens according to claim 13 or 14, satisfying the following condition:

$$0.4<|f_1|/Y<0.7.$$

16. A zoom lens according to claim 15, satisfying the following condition:

$$0.2<|f_2/f_3|<0.8$$

where $f_2$ is the focal length of said intermediate lens unit, and $f_3$ is the focal length of said rear lens unit.

17. A zoom lens according to claim 13, wherein said intermediate lens unit has a stop arranged therein, and asphere is applied to at least one lens surface on the object side of said stop.

18. A zooming method for a zoom lens, said zoom lens having, from front to rear, a first lens unit of negative refractive power, a second lens unit of positive refractive power and a third lens unit, comprising the steps of moving two lens units of said first, second and third lens units in unison to perform a first zooming operation from a wide-angle end to a medium focal length position, and, after that, taking said two lens units out of unison and moving at least one lens unit of said two lens units to perform a second zooming operation from the medium focal length position to a telephoto end, said method satisfying at least one of the following conditions:

$$-0.5<(e1T-e1M)/(fT-fM)<0.1$$

$$-0.5<(e2T-e2M)/(fT-fM)<0.1$$

where, as said first zooming operation shifts to said second zooming operation, e1M is a principal point interval between said first lens unit and said second lens unit, e2M is a principal point interval between said second lens unit and said third lens unit, and fM is the focal length of the entire system; e1T is a principal point interval in the telephoto end between said first lens unit and said second lens unit, e2T is a principal point interval in the telephoto end between said second lens unit and said third lens unit and fT is the focal length of the entire system in the telephoto end.

19. A zooming method for a zoom lens, said zoom lens having, from front to rear, a first lens unit of negative refractive power, a second lens unit of positive refractive power and a third lens unit, in which, as zooming is performed by moving said first, second and third lens unit, two lens units of said first, second and third lens units are moved in unison to perform a first zooming operation from a wide-angle end to a medium focal length position and, after that, said two lens units are taken out of unison and moved in differential relation to perform a second zooming operation from the medium focal length position to a telephoto end, said method satisfying at least one of the following conditions:

$$-0.5<(e1T-e1M)/(fT-fM)<0.1$$

$$-0.5<(e2T-e2M)/(fT-fM)<0.1$$

where, as said first zooming operation shifts to said second zooming operation, e1M is a principal point interval between said first lens unit and said second lens unit, e2M is a principal point interval between said second lens unit and said third lens unit, and fM is the focal length of the entire system; e1T is a principal point interval in the telephoto end between said first lens unit and said second lens unit, e2T is a principal point interval in the telephoto end between said second lens unit and said third lens unit and fT is the focal length of the entire system in the telephoto end.

20. A zooming method for the zoom lens according to claim 19, wherein said first zooming operation is performed by moving either said first lens unit and said third lens unit in unison, or said first lens unit and said second lens unit in unison, or said second lens unit and said third lens unit in unison.

21. A zooming method for the zoom lens according to claim 20, wherein said first lens unit, said second lens unit and said third lens unit are moved all forward to perform said first zooming operation and said second zooming operation.

22. A zooming method for a zoom lens, said zoom lens having, from front to rear, a first lens unit of negative refractive power, a second lens unit of positive refractive power and a third lens unit, comprising the steps of moving said first, second and third lens units to perform a first zooming operation and, after that, while keeping stationary at least one lens unit of said first lens unit and said third lens unit, moving said second lens unit to perform a second zooming operation, said method satisfying the following conditions:

$$0<fW(1/f1+2/f2+1/f3)<4$$

$$0<f23/fT<0.9$$

where fi is the focal length of the i-th lens unit, f23 is the overall focal length of said second lens unit and said third lens unit in an arbitrary zooming position, and fW and fT are the focal lengths of the entire system in a wide-angle end and a telephoto end, respectively.

23. A zooming method for the zoom lens according to claim 22, wherein said first lens unit, said second lens unit and said third lens unit are moved all forward to perform the first zooming operation, and said second lens unit is moved forward to perform the second zooming operation.

24. A zooming method for the zoom lens according to claim 23, satisfying at least one of the following conditions:

$$-0.5<(e1T-e1M)/(fT-fM)<0.1$$

$$-0.5<(e2T-e2M)/(fT-fM)<0.1$$

where, as said first zooming operation shifts to said second zooming operation, e1M is a principal point interval between said first lens unit and said second lens unit, e2M is a principal point interval between said second lens unit and said third lens unit, and fT is the focal length of the entire system; e1T is a principal point interval in the telephoto end between said first lens unit and said second lens unit, e2T is a principal point interval in the telephoto end between said second lens unit and said third lens unit, fT is the focal length of the entire system in the telephoto end.

25. A zooming method for a zoom lens, said zoom lens having, from front to rear, a first lens unit of negative refractive power, a second lens unit of positive refractive power and a third lens unit, comprising the steps of moving said second lens unit, while keeping stationary at least one lens unit of said first lens unit and said third lens unit, to perform a first zooming operation, and after that, moving said first, second and third lens units to perform a second zooming operation, said method satisfying the following conditions:

$0 < fW(1/f1+2/f2+1/f3) < 4$ said method satisfying the following conditions:

$0 < fW(1/f1+2/f2+1/f3) < 4$ $0 < f23/fT < 0.9$ where fi is the focal length of the i-th lens unit, f23 is the overall focal length of said second lens unit and said third lens unit in an arbitrary zooming position, fW and fT are the focal lengths of the entire system in a wide-angle end and a telephoto end, respectively.

26. A zooming method for the zoom lens according to claim 25, wherein said first lens unit and said second lens unit in unison and said third lens unit in differential relation move all forward to perform the second zooming operation.

27. A zooming method for the zoom lens according to claim 26, satisfying at least one of the following conditions:

$-0.5 < (e1T-e1M)/(fT-fM) < 0.1$ $-0.5 < (e2T-e2M)/(fT-fM) < 0.1$ where as said first zooming operation shifts to said second zooming operation, e1M is a principal point interval between said first lens unit and said second lens unit, e2M is a principal point interval between said second lens unit and said third lens unit, and fM is the focal length of the entire system; e1T is a principal point interval in the telephoto end between said first lens unit and said second lens unit, e2T is a principal point interval in the telephoto end between said second lens unit and said third lens unit, and fT is the focal length of the entire system in the telephoto end.

28. A zooming method for a zoom lens, said zoom lens having, from front to rear, a first lens unit of negative refractive power, a second lens unit of positive refractive power and a third lens unit, comprising the steps of, as zooming is performed by moving said first, second and third lens units, performing a first zooming operation from a wide-angle end to a medium focal length position by moving said first, second and third lens units in differential relation, and after that, performing a second zooming operation from the medium focal length position to a telephoto end by moving two lens units of said first, second and third lens units in unison, said method satisfying at least one of the following conditions:

$-0.5 < (e1T-e1M)/(fT-fM) < 0.1$ $-0.5 < (e2T-e2M)/(fT-fM) < 0.1$ where, as said first zooming operation shifts to said second zooming operation, e1M is a principal point interval between said first lens unit and said second lens unit, e2M is a principal point interval between said second lens unit and said third lens unit, and fM is the focal length of the entire system; e1T is a principal point interval in the telephoto end between said first lens unit and said second lens unit, e2T is a principal point interval in the telephoto end between said second lens unit and said third lens unit, and fT is the focal length of the entire system in the telephoto end.

29. A zooming method for the zoom lens according to claim 28, wherein said first, second and third lens units move all forward to perform the first zooming operation and the second zooming operation.

30. A zooming method for the zoom lens according to claim 29, wherein said second zooming operation is performed by moving either said first lens unit and said third lens unit in unison, or said first lens unit and said second lens unit in unison, or said second lens unit and said third lens unit in unison.

31. A zoom lens comprising:

a front lens unit of negative refractive power;

an intermediate lens unit of positive refractive power; and a rear lens unit of negative refractive power, zooming being performed by varying a separation between said front lens unit and said intermediate lens unit and a separation between said intermediate lens unit and said rear lens unit, and said zoom lens satisfying the following conditions:

$0.5 < |f_1|/\sqrt{f_W \cdot f_T} < 0.9$ $0.4 < l_{1W}/f_W < 0.8$ $1.0 < |f_3|/|f_1|$ where $f_W$ is the overall focal length of the entire lens system in a wide-angle end, $f_T$ is the overall focal length of the entire lens system in a telephoto end, $f_1$ is the focal length of said front lens unit, $f_3$ is the focal length of said rear lens unit, and $l_{1W}$ is an axial air separation between said front lens unit and said intermediate lens unit in the wide-angle end.

32. A zoom lens comprising:

a front lens unit of negative refractive power;

an intermediate lens unit of positive refractive power; and a rear lens unit of negative refractive power including a positive single lens and a negative single lens disposed just behind said positive single lens, zooming being performed by varying a separation between said front lens unit and said intermediate lens unit and a separation between said intermediated lens unit and said rear lens unit, and said zoom lens satisfying the following conditions:

$0.5 < |f_1|/\sqrt{f_W \cdot f_T} < 0.9$ $0.4 < l_{1W}/f_W < 0.8$ where $f_W$ is the overall focal length of the entire lens system in a wide-angle end, $f_T$ is the overall focal length of the entire lens system in a telephoto end, $f_1$ is the focal length of said front lens unit, and $l_{1W}$ is an axial air separation between said front lens unit and said intermediate lens unit in the wide-angle end.

33. A zoom lens comprising:

a front lens unit of negative refractive power including a plurality of lenses separated from each other by respective air spaces;

an intermediate lens unit of positive refractive power; and a rear lens unit of negative refractive power, zooming being performed by varying a separation between said front lens unit and said intermediate lens unit and a separation between said intermediate lens unit and said rear lens unit, and said zoom lens satisfying the following conditions:

$$0.5 < |f_1|/\sqrt{f_W \cdot f_T} < 0.9$$

$$0.4 < l_{1W}/f_W < 0.8$$

where $f_W$ is the overall focal length of the entire lens system in a wide-angle end, $f_T$ is the overall focal length of the entire lens system in a telephoto end, $f_1$ is the focal length of said front lens unit, and $l_{1W}$ is an axial air separation between said front lens unit and said intermediated lens unit in the wide-angle end.

34. A zoom lens according to claim 33, wherein said intermediate lens unit consists of four lenses or less.

35. A zoom lens according to claim 33, wherein said intermediate lens unit includes a positive lens sub-unit and a negative lens disposed just behind said positive lens sub-unit.

* * * * *

UNITED STATES PATENT AND TRADEMARK OFFICE
CERTIFICATE OF CORRECTION

PATENT NO. : 5,574,599                Page 1 of 2
DATED      : November 12, 1996
INVENTOR(S): KOUJI HOSHI, ET AL.

It is certified that error appears in the above-indentified patent and that said Letters Patent is hereby corrected as shown below:

COLUMN 2

Line 65, "24(A)(A)(1)" should read --24(A)(1)--.

COLUMN 3

Line 10, "28(B)(1)-28(B)(1)," should read --28(B)(1)-28(B)(4),--; and
    Line 11, "20" should read --28--.

COLUMN 4

Line 31, "unit" should read --units--.

COLUMN 6
    Line 32, "purpose" should read --purposes--.

COLUMN 17

Line 32, "condition:" should read --conditions:--; and, line 62, "elm" should read --e1M--.

COLUMN 18

Line 32, "elm" should read --e1M--; and
    Line 67, "elm" should read --e1M--.

UNITED STATES PATENT AND TRADEMARK OFFICE
CERTIFICATE OF CORRECTION

PATENT NO. : 5,574,599          Page 2 of 2
DATED       : November 12, 1996
INVENTOR(S) : KOUJI HOSHI, ET AL.

It is certified that error appears in the above-indentified patent and that said Letters Patent is hereby corrected as shown below:

<u>COLUMN 22</u>

Line 38, "37((A)" should read --37(A)--.

<u>COLUMN 24</u>

Line 21, "ration" should read --ratio--.

<u>COLUMN 29</u>

Line 51, "and third lens unit," should read --and third lens units,--.

<u>COLUMN 34</u>

Line 2, change "intermediated" to --intermediate--.

Signed and Sealed this

Twenty-ninth Day of July, 1997

Attest:

BRUCE LEHMAN

*Attesting Officer*  *Commissioner of Patents and Trademarks*